US012698054B2

(12) United States Patent
Vigen et al.

(10) Patent No.: US 12,698,054 B2
(45) Date of Patent: Aug. 4, 2026

(54) RUNNING BOARD REAR KICK-UP

(71) Applicant: Arctic Cat Inc., Thief River Falls, MN (US)

(72) Inventors: David Vigen, Thief River Falls, MN (US); Benjamin Taylor Langaas, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 746 days.

(21) Appl. No.: 18/089,165

(22) Filed: Dec. 27, 2022

(65) Prior Publication Data

US 2024/0043091 A1 Feb. 8, 2024

Related U.S. Application Data

(60) Provisional application No. 63/434,382, filed on Dec. 21, 2022, provisional application No. 63/405,016, (Continued)

(51) Int. Cl.
*B62M 27/02* (2006.01)
*B62D 21/15* (2006.01)
(Continued)

(52) U.S. Cl.
CPC ........... *B62M 27/02* (2013.01); *B62D 21/155* (2013.01); *B62D 29/043* (2013.01); *B62J 23/00* (2013.01);
(Continued)

(58) Field of Classification Search
CPC ............ F17C 13/084; F17C 2205/0103; F17C 2205/01; F17C 2205/0305; B62M 2027/028; B60Y 2200/252
(Continued)

(56) References Cited

U.S. PATENT DOCUMENTS 745,862 A 12/1903 Kerr
3,529,494 A 9/1970 Matte
(Continued)

FOREIGN PATENT DOCUMENTS

BR 112020005350 B1 5/2023
CA 2456088 A1 8/2001
(Continued)

OTHER PUBLICATIONS

"2007 Arctic Cat Jaguar Z1 Next Generation Performance 4-Stroke", Snowtech Magazine, retrieved May 26, 2022 from https://www.snowtechmagazine.com/2007-arctic-cat-jaguar-z1-next-generation-performance-4-stroke/, Sep. 20, 2006.
(Continued)

*Primary Examiner* — Valentin Neacsu
*Assistant Examiner* — Tyler Jay Stanley
(74) *Attorney, Agent, or Firm* — Billion & Armitage

(57) ABSTRACT

A rear member of a running board assembly for a snow vehicle. The rear member includes a transition body positionable adjacent a side wall of a tunnel of the snow vehicle. The transition body comprises a forward end and a rearward end extending upward and rearward therefrom. The rear member further includes a flange extending downward and rearward from the transition body. The flange is positionable adjacent the side wall of the tunnel. The rear member further includes a bumper arm mount positioned at the rearward end of the transition body. The bumper arm mount is engageable with a bumper arm of the snow vehicle.

20 Claims, 86 Drawing Sheets

Related U.S. Application Data filed on Sep. 9, 2022, provisional application No. 63/405,121, filed on Sep. 9, 2022, provisional application No. 63/405,033, filed on Sep. 9, 2022, provisional application No. 63/404,992, filed on Sep. 9, 2022, provisional application No. 63/405,176, filed on Sep. 9, 2022, provisional application No. 63/404,731, filed on Sep. 8, 2022, provisional application No. 63/404,617, filed on Sep. 8, 2022, provisional application No. 63/404,856, filed on Sep. 8, 2022, provisional application No. 63/404,822, filed on Sep. 8, 2022, provisional application No. 63/404,171, filed on Sep. 6, 2022, provisional application No. 63/402,768, filed on Aug. 31, 2022, provisional application No. 63/400,056, filed on Aug. 23, 2022, provisional application No. 63/344,165, filed on May 20, 2022, provisional application No. 63/310,983, filed on Feb. 16, 2022, provisional application No. 63/310,951, filed on Feb. 16, 2022, provisional application No. 63/310,254, filed on Feb. 15, 2022, provisional application No. 63/310,264, filed on Feb. 15, 2022.

(51) Int. Cl.
| | | |
|---|---|---|
| *B62D 29/04* | (2006.01) | |
| *B62J 23/00* | (2006.01) | |
| *B62K 19/18* | (2006.01) | |

(52) U.S. Cl.
CPC ....... *B62K 19/18* (2013.01); *B62M 2027/026* (2013.01); *B62M 2027/028* (2013.01)

(58) Field of Classification Search
USPC .................. 180/90.6, 190, 191; 280/291, 845
See application file for complete search history.

(56) References Cited

U.S. PATENT DOCUMENTS

| | | | |
|---|---|---|---|
| 3,548,961 | A | 12/1970 | Newman |
| 3,688,604 | A | 9/1972 | Schlosser |
| 3,688,856 | A | 9/1972 | Boehm et al. |
| 3,750,774 | A | 8/1973 | Trapp |
| 3,758,169 | A | 9/1973 | Trapp |
| 3,963,083 | A | 6/1976 | Reese |
| 4,502,353 | A | 3/1985 | Beaudoin |
| 4,602,525 | A | 7/1986 | Moroto et al. |
| 4,667,758 | A | 5/1987 | Tamura |
| 4,892,165 | A | 1/1990 | Yasui et al. |
| 4,940,100 | A | 7/1990 | Ueda |
| 4,987,965 | A | 1/1991 | Bourret |
| 5,000,056 | A | 3/1991 | Crawford et al. |
| 5,152,255 | A | 10/1992 | Fukuda |
| 5,232,066 | A | 8/1993 | Schnelker |
| 5,251,718 | A | 10/1993 | Inagawa et al. |
| 5,660,245 | A | 8/1997 | Marier et al. |
| 5,862,662 | A | 1/1999 | Fukuda et al. |
| 5,924,514 | A | 7/1999 | Bullerdick |
| 5,957,230 | A | 9/1999 | Harano et al. |
| 6,109,217 | A | 8/2000 | Hedlund et al. |
| 6,161,908 | A | 12/2000 | Takayama et al. |
| 6,170,589 | B1 | 1/2001 | Kawano et al. |
| 6,224,134 | B1 | 5/2001 | Johnson et al. |
| 6,270,106 | B1 | 8/2001 | Maki et al. |
| 6,302,232 | B1 | 10/2001 | Forbes |
| 6,419,533 | B2 | 7/2002 | Lecours |
| 6,446,744 | B2 | 9/2002 | Wubbolts et al. |
| 6,561,297 | B2 | 5/2003 | Yatagai et al. |
| 6,561,302 | B2 | 5/2003 | Karpik |
| 6,604,594 | B2 | 8/2003 | Wubbolts et al. |
| 6,644,261 | B2 | 11/2003 | Morii et al. |
| 6,651,764 | B2 | 11/2003 | Fournier et al. |
| 6,651,765 | B1 | 11/2003 | Weinzierl |
| 6,681,724 | B1 | 1/2004 | Berg |
| 6,695,087 | B2 | 2/2004 | Fournier et al. |
| 6,749,036 | B1 | 6/2004 | Schrapp et al. |
| 6,758,497 | B2 | 7/2004 | Bergman |
| 6,808,034 | B2 | 10/2004 | Nakano et al. |
| 6,823,957 | B2 | 11/2004 | Girouard et al. |
| 6,823,960 | B2 | 11/2004 | Shimizu et al. |
| 6,860,352 | B2 | 3/2005 | Mallette et al. |
| 6,860,826 | B1 | 3/2005 | Johnson |
| 6,890,010 | B2 | 5/2005 | Bergman |
| 6,904,990 | B2 | 6/2005 | Etou |
| 6,923,284 | B2 | 8/2005 | Bédard et al. |
| 6,923,287 | B2 | 8/2005 | Morii |
| 6,926,107 | B2 | 8/2005 | Nishijima |
| 6,941,924 | B2 | 9/2005 | Morii et al. |
| 6,942,050 | B1 | 9/2005 | Honkala et al. |
| 6,942,052 | B1 | 9/2005 | Blakely |
| 6,951,523 | B1 | 10/2005 | Dieter et al. |
| 6,955,237 | B1 | 10/2005 | Przekwas et al. |
| 6,966,395 | B2 | 11/2005 | Schuehmacher et al. |
| 6,976,550 | B2 | 12/2005 | Vaisanen |
| 6,981,564 | B2 | 1/2006 | Bédard et al. |
| 7,011,173 | B2 | 3/2006 | Cadotte et al. |
| 7,025,161 | B2 | 4/2006 | Bertrand et al. |
| 7,032,561 | B2 | 4/2006 | Morii et al. |
| 7,036,619 | B2 | 5/2006 | Yatagai et al. |
| 7,048,293 | B2 | 5/2006 | Bédard |
| 7,063,178 | B2 | 6/2006 | Etou |
| 7,080,704 | B1 | 7/2006 | Kerner et al. |
| 7,083,024 | B2 | 8/2006 | Bergman et al. |
| 7,096,988 | B2 | 8/2006 | Moriyama |
| 7,104,352 | B2 | 9/2006 | Weinzierl et al. |
| 7,104,355 | B2 | 9/2006 | Hoi |
| 7,124,846 | B2 | 10/2006 | Bédard et al. |
| 7,124,847 | B2 | 10/2006 | Girouard et al. |
| 7,124,848 | B2 | 10/2006 | Girouard et al. |
| 7,128,176 | B1 | 10/2006 | Mills et al. |
| 7,140,463 | B2 | 11/2006 | Morii et al. |
| 7,147,074 | B1 | 12/2006 | Berg et al. |
| 7,150,336 | B2 | 12/2006 | Desmarais |
| 7,152,706 | B2 | 12/2006 | Pichler et al. |
| 7,188,693 | B2 | 3/2007 | Girouard et al. |
| 7,198,126 | B2 | 4/2007 | Vaisanen |
| 7,198,127 | B2 | 4/2007 | Yatagai et al. |
| 7,204,355 | B2 | 4/2007 | Akiyama et al. |
| 7,213,668 | B2 | 5/2007 | Richard et al. |
| 7,213,669 | B2 | 5/2007 | Fecteau et al. |
| 7,249,647 | B2 | 7/2007 | Nietlispach |
| 7,255,068 | B2 | 8/2007 | Ashida |
| 7,255,195 | B2 | 8/2007 | Haruna |
| 7,264,075 | B2 | 9/2007 | Schuemacher et al. |
| 7,281,598 | B2 | 10/2007 | Hoi |
| 7,296,645 | B1 | 11/2007 | Kerner et al. |
| 7,296,657 | B2 | 11/2007 | Ohno et al. |
| 7,300,382 | B2 | 11/2007 | Yamamoto |
| 7,303,037 | B2 | 12/2007 | Yatagai et al. |
| 7,328,765 | B2 | 2/2008 | Ebert et al. |
| 7,353,898 | B1 | 4/2008 | Bates |
| 7,353,899 | B2 | 4/2008 | Abe et al. |
| 7,353,901 | B2 | 4/2008 | Abe et al. |
| 7,357,207 | B2 | 4/2008 | Vaeisaenen |
| 7,360,618 | B2 | 4/2008 | Hibbert et al. |
| 7,370,724 | B2 | 5/2008 | Saito et al. |
| 7,374,016 | B2 | 5/2008 | Yamaguchi et al. |
| 7,377,348 | B2 | 5/2008 | Girouard et al. |
| 7,389,842 | B2 | 6/2008 | Inoguchi et al. |
| 7,401,674 | B1 | 7/2008 | Berg et al. |
| 7,401,816 | B2 | 7/2008 | Abe et al. |
| 7,409,949 | B1 | 8/2008 | Zauner et al. |
| 7,410,182 | B1 | 8/2008 | Giese |
| 7,413,046 | B2 | 8/2008 | Okada et al. |
| 7,451,846 | B2 | 11/2008 | Wubbolts et al. |
| 7,458,593 | B2 | 12/2008 | Saito et al. |
| 7,472,771 | B2 | 1/2009 | Yatagai et al. |
| 7,475,751 | B2 | 1/2009 | Pard et al. |
| 7,484,584 | B1 | 2/2009 | Kerner et al. |
| 7,533,749 | B1 | 5/2009 | Sampson et al. |
| 7,540,511 | B2 | 6/2009 | Saito et al. |
| 7,543,669 | B2 | 6/2009 | Kelahaara |

(56) References Cited

U.S. PATENT DOCUMENTS

| | | |
|---|---|---|
| 7,543,672 B2 | 6/2009 | Codere et al. |
| 7,591,332 B1 | 9/2009 | Bates |
| 7,594,557 B2 | 9/2009 | Polakowski et al. |
| 7,597,069 B2 | 10/2009 | Ashida |
| 7,610,132 B2 | 10/2009 | Yanai et al. |
| 7,708,096 B2 | 5/2010 | Vezina |
| 7,753,154 B2 | 7/2010 | Maltais |
| 7,775,313 B1 | 8/2010 | Sampson et al. |
| 7,779,944 B2 | 8/2010 | Bergman et al. |
| 7,779,946 B2 | 8/2010 | Okada et al. |
| 7,789,184 B2 | 9/2010 | Maltais |
| 7,798,529 B2 | 9/2010 | Sato |
| 7,802,644 B2 | 9/2010 | Brodeur et al. |
| 7,802,645 B2 | 9/2010 | Mallette et al. |
| 7,802,646 B2 | 9/2010 | Matsudo |
| 7,806,215 B2 | 10/2010 | Codere et al. |
| 7,878,293 B2 | 2/2011 | Okada et al. |
| 7,913,785 B2 | 3/2011 | Korsumaki et al. |
| 7,918,299 B2 | 4/2011 | Yoshihara |
| 7,980,629 B2 | 7/2011 | Bedard |
| 7,997,372 B2 | 8/2011 | Maltais |
| 8,001,862 B2 | 8/2011 | Albulushi et al. |
| 8,028,795 B2 | 10/2011 | Hisanaga et al. |
| 8,037,961 B2 | 10/2011 | Fecteau |
| 8,127,877 B2 | 3/2012 | Fredrickson et al. |
| 8,167,073 B2 | 5/2012 | Polakowski et al. |
| 8,191,665 B1 | 6/2012 | Sampson et al. |
| 8,225,896 B2 | 7/2012 | Eichenberger et al. |
| 8,235,164 B2 | 8/2012 | Okada et al. |
| 8,240,417 B2 | 8/2012 | Takata |
| 8,281,889 B2 | 10/2012 | Inoue |
| 8,381,857 B1 | 2/2013 | Sampson et al. |
| 8,408,348 B2 | 4/2013 | Nakamura et al. |
| 8,430,197 B2 | 4/2013 | Matsudo |
| 8,453,779 B2 | 6/2013 | Vezina |
| 8,474,783 B2 | 7/2013 | Hu |
| 8,490,731 B2 | 7/2013 | Eaton et al. |
| 8,528,683 B2 | 9/2013 | Beavis et al. |
| 8,567,546 B2 | 10/2013 | Berg et al. |
| 8,590,654 B2 | 11/2013 | Kerner et al. |
| 8,607,912 B2 | 12/2013 | Mallette et al. |
| 8,657,054 B2 | 2/2014 | Mallette et al. |
| 8,733,773 B2 | 5/2014 | Sampson |
| 8,763,745 B2 | 7/2014 | Nagao et al. |
| 8,881,856 B2 | 11/2014 | Fecteau et al. |
| 8,919,477 B2 | 12/2014 | Conn et al. |
| 8,944,204 B2 | 2/2015 | Ripley et al. |
| 8,994,494 B2 | 3/2015 | Koenig et al. |
| 9,022,156 B2 | 5/2015 | Bedard et al. |
| 9,061,732 B1 | 6/2015 | Vezina |
| 9,073,604 B2 | 7/2015 | Mallette et al. |
| 9,090,313 B2 | 7/2015 | Bedard |
| 9,096,289 B2 | 8/2015 | Hedlund et al. |
| 9,114,852 B2 | 8/2015 | Fecteau et al. |
| 9,139,255 B1 | 9/2015 | Glissmeyer et al. |
| 9,162,731 B2 | 10/2015 | Maltais |
| 9,228,581 B2 | 1/2016 | Bernier et al. |
| 9,327,789 B1 | 5/2016 | Vezina et al. |
| 9,346,508 B1 | 5/2016 | Lemieux |
| 9,346,518 B2 | 5/2016 | Polakowski et al. |
| 9,352,801 B2 | 5/2016 | Makitalo et al. |
| 9,352,802 B2 | 5/2016 | Sampson |
| 9,359,022 B2 | 6/2016 | Bedard et al. |
| 9,387,907 B2 | 7/2016 | Nasca et al. |
| 9,428,232 B2 | 8/2016 | Ripley et al. |
| 9,446,810 B2 | 9/2016 | Ripley |
| 9,481,370 B2 | 11/2016 | Bernier et al. |
| 9,540,072 B2 | 1/2017 | Hedulnd |
| 9,545,844 B2 | 1/2017 | Forty et al. |
| 9,610,986 B2 | 4/2017 | Conn |
| 9,618,071 B2 | 4/2017 | Hirota |
| 9,682,746 B2 | 6/2017 | Yasuda et al. |
| 9,683,492 B2 | 6/2017 | Bernier et al. |
| 9,688,354 B2 | 6/2017 | Nagao et al. |
| 9,694,872 B2 | 7/2017 | Laroche et al. |
| 9,738,301 B2 | 8/2017 | Vezina et al. |
| 9,751,552 B2 | 9/2017 | Mangum et al. |
| 9,789,930 B1 | 10/2017 | Vezina et al. |
| 9,796,437 B2 | 10/2017 | Wilson et al. |
| 9,809,195 B2 | 11/2017 | Giese et al. |
| 9,828,064 B2 | 11/2017 | Pard et al. |
| 9,828,065 B2 | 11/2017 | Pard |
| 9,845,004 B2 | 12/2017 | Hedlund et al. |
| 9,873,485 B2 | 1/2018 | Mangum et al. |
| 9,988,067 B1 | 6/2018 | Mangum et al. |
| 10,001,200 B2 | 6/2018 | Parraga Gimeno et al. |
| 10,029,567 B2 | 7/2018 | Lefebvre et al. |
| 10,035,554 B2 | 7/2018 | Mertens et al. |
| 10,065,708 B2 | 9/2018 | Labbe et al. |
| 10,144,486 B2 | 12/2018 | Yasuda et al. |
| 10,195,999 B1 | 2/2019 | Glickman et al. |
| 10,202,169 B2 | 2/2019 | Mangum et al. |
| 10,215,083 B2 | 2/2019 | Vezina et al. |
| 10,232,910 B2 | 3/2019 | Mangum et al. |
| 10,259,507 B1 | 4/2019 | Johnson et al. |
| 10,293,885 B2 | 5/2019 | Vezina et al. |
| 10,300,989 B2 | 5/2019 | Vezina |
| 10,300,990 B2 | 5/2019 | Vezina |
| 10,358,187 B2 | 7/2019 | Mstad et al. |
| 10,377,446 B2 | 8/2019 | Thibault et al. |
| 10,392,079 B2 | 8/2019 | Vezina et al. |
| 10,406,910 B2 | 9/2019 | Vezina et al. |
| 10,435,059 B2 | 10/2019 | Mallette et al. |
| 10,450,968 B2 | 10/2019 | Bernier et al. |
| 10,513,970 B2 | 12/2019 | Vezina et al. |
| 10,526,045 B2 | 1/2020 | Vezina et al. |
| 10,538,262 B2 | 1/2020 | Mangum et al. |
| 10,543,792 B2 | 1/2020 | Yoshioka et al. |
| 10,597,105 B2 | 3/2020 | Lefebvre et al. |
| 10,619,615 B2 | 4/2020 | Dale et al. |
| 10,675,962 B2 | 6/2020 | Urabe et al. |
| 10,676,157 B2 | 6/2020 | Vigen |
| 10,730,576 B2 | 8/2020 | Labbe et al. |
| 10,766,571 B2 | 9/2020 | Sampson et al. |
| 10,766,572 B2 | 9/2020 | Pard et al. |
| 10,766,573 B2 | 9/2020 | Vezina et al. |
| 10,773,684 B2 | 9/2020 | Koenig et al. |
| 10,773,774 B2 | 9/2020 | Mangum et al. |
| 10,780,949 B2 | 9/2020 | Crain et al. |
| 10,793,226 B2 | 10/2020 | Crain et al. |
| 10,800,490 B2 | 10/2020 | Foxhall et al. |
| 10,814,935 B2 | 10/2020 | Vaisanen et al. |
| 10,822,054 B2 | 11/2020 | Lemieux |
| 10,843,758 B2 | 11/2020 | Hebert et al. |
| 10,870,465 B2 | 12/2020 | Crain et al. |
| 10,875,595 B2 | 12/2020 | Laberge et al. |
| 10,875,605 B2 | 12/2020 | Pard |
| 10,899,415 B2 | 1/2021 | Mangum et al. |
| 10,913,512 B2 | 2/2021 | Thompson et al. |
| 10,960,914 B2 | 3/2021 | Mangum et al. |
| 10,974,790 B2 | 4/2021 | Hosaluk et al. |
| 11,027,794 B2 | 6/2021 | Vigen |
| 11,097,793 B2 | 8/2021 | Marchildon et al. |
| 11,110,994 B2 | 9/2021 | Hedlund et al. |
| 11,142,286 B2 | 10/2021 | Sampson et al. |
| 11,208,168 B2 | 12/2021 | Hedlund et al. |
| 11,214,320 B2 | 1/2022 | Bates et al. |
| 11,220,310 B2 | 1/2022 | Pard et al. |
| 11,225,302 B2 | 1/2022 | Vigen |
| 11,230,351 B2 | 1/2022 | Vezina |
| 11,235,634 B2 | 2/2022 | Lavallee et al. |
| 11,286,019 B2 | 3/2022 | Hedlund et al. |
| 11,358,661 B2 | 6/2022 | Laugen et al. |
| 11,384,679 B2 | 7/2022 | Matsumoto et al. |
| 11,415,207 B2 | 8/2022 | Pard et al. |
| 11,505,263 B2 | 11/2022 | Hedlund et al. |
| 11,524,569 B2 | 12/2022 | Vezina et al. |
| 2001/0027886 A1 | 10/2001 | Ishii |
| 2001/0047900 A1 | 12/2001 | Fecteau et al. |
| 2002/0027028 A1 | 3/2002 | Girouard et al. |
| 2003/0127265 A1 | 7/2003 | Watson et al. |
| 2003/0201637 A1 | 10/2003 | Bergman |
| 2004/0090119 A1 | 5/2004 | Ebert et al. |
| 2005/0016784 A1 | 1/2005 | Fecteau |

(56) References Cited

U.S. PATENT DOCUMENTS

| | | | |
|---|---|---|---|
| 2005/0040707 A1 | 2/2005 | Ebert et al. | |
| 2005/0121876 A1 | 6/2005 | Gaudreau et al. | |
| 2005/0241867 A1 | 11/2005 | Abe et al. | |
| 2006/0162977 A1 | 7/2006 | Etou | |
| 2007/0193715 A1 | 8/2007 | Bergman et al. | |
| 2007/0230198 A1 | 10/2007 | Ohzono | |
| 2008/0277184 A1 | 11/2008 | Marleau | |
| 2011/0132679 A1* | 6/2011 | Kerner | B60R 25/04 |
| | | | 180/190 |
| 2011/0168477 A1 | 7/2011 | Yokomori et al. | |
| 2012/0205902 A1 | 8/2012 | Beavis et al. | |
| 2013/0032418 A1 | 2/2013 | Ripley et al. | |
| 2013/0080007 A1 | 3/2013 | Monfette et al. | |
| 2013/0175106 A1 | 7/2013 | Bédard et al. | |
| 2013/0206494 A1 | 8/2013 | Hedlund et al. | |
| 2015/0021898 A1 | 1/2015 | Serbinski | |
| 2016/0068227 A1 | 3/2016 | Yasuda et al. | |
| 2016/0152304 A1 | 6/2016 | Vezina et al. | |
| 2017/0036604 A1 | 2/2017 | Campbell et al. | |
| 2017/0101142 A1 | 4/2017 | Hedlund et al. | |
| 2018/0141616 A1 | 5/2018 | Pard et al. | |
| 2018/0334211 A1 | 11/2018 | Mertens et al. | |
| 2019/0233055 A1 | 8/2019 | Vezina | |
| 2019/0256170 A1 | 8/2019 | Labbe | |
| 2019/0344657 A1 | 11/2019 | Vezina et al. | |
| 2019/0344859 A1 | 11/2019 | Vistad et al. | |
| 2020/0086940 A1 | 3/2020 | Sturgeon et al. | |
| 2020/0148056 A1 | 5/2020 | Forty et al. | |
| 2020/0224628 A1 | 7/2020 | Dale et al. | |
| 2020/0398785 A1 | 12/2020 | Koenig et al. | |
| 2021/0053652 A1 | 2/2021 | Fuchs et al. | |
| 2021/0053653 A1 | 2/2021 | Mangum et al. | |
| 2021/0115835 A1 | 4/2021 | Diehl et al. | |
| 2021/0122445 A1 | 4/2021 | Thompson et al. | |
| 2021/0129943 A1 | 5/2021 | Mangum et al. | |
| 2021/0163086 A1 | 6/2021 | Mallette et al. | |
| 2021/0188182 A1 | 6/2021 | Edwards et al. | |
| 2021/0188185 A1 | 6/2021 | Hedlund et al. | |
| 2021/0188376 A1 | 6/2021 | Laugen et al. | |
| 2021/0188382 A1 | 6/2021 | Hedlund | |
| 2021/0213899 A1 | 7/2021 | Yotsuyanagi et al. | |
| 2021/0214044 A1 | 7/2021 | Krings et al. | |
| 2021/0229731 A1 | 7/2021 | Stoxen et al. | |
| 2021/0245837 A1 | 8/2021 | Vigen | |
| 2021/0323629 A1 | 10/2021 | Blackburn et al. | |
| 2021/0347432 A1 | 11/2021 | Halvorson | |
| 2021/0362807 A1 | 11/2021 | Hedlund et al. | |
| 2022/0024541 A1 | 1/2022 | Korsumaki | |
| 2022/0097801 A1 | 3/2022 | Vigen | |
| 2022/0111929 A1 | 4/2022 | Matsushita | |
| 2022/0119049 A1 | 4/2022 | Bates et al. | |
| 2022/0177077 A1 | 6/2022 | Mstad et al. | |
| 2022/0212754 A1 | 7/2022 | Stock et al. | |
| 2022/0349339 A1 | 11/2022 | Schuehmacher et al. | |
| 2023/0052282 A1 | 2/2023 | Hedlund et al. | |
| 2023/0257049 A1 | 8/2023 | Vigen et al. | |
| 2023/0257067 A1 | 8/2023 | Langaas et al. | |
| 2024/0124096 A1 | 4/2024 | Crosby et al. | |
| 2025/0256809 A1 | 8/2025 | Christian et al. | |

FOREIGN PATENT DOCUMENTS

| | | |
|---|---|---|
| CA | 2456088 C | 3/2005 |
| CA | 2411964 C | 7/2005 |
| CA | 2371477 C | 7/2006 |
| CA | 2363856 C | 1/2008 |
| CA | 2639857 A1 | 6/2009 |
| CA | 2877554 A1 | 1/2014 |
| CA | 2987534 A1 | 12/2016 |
| CA | 2925800 A1 | 10/2017 |
| CA | 2925822 A1 | 10/2017 |
| CA | 3117886 A1 | 5/2020 |
| CA | 2863952 C | 6/2020 |
| CA | 3030691 C | 10/2020 |
| CA | 3103308 A1 | 6/2021 |
| CN | 105422273 A | 3/2016 |
| JP | S55125312 A | 9/1980 |
| JP | H10217921 A | 8/1998 |
| JP | 2005193788 A | 7/2005 |
| JP | 4840406 B2 | 10/2011 |
| JP | 2019172095 A | 10/2019 |
| WO | 8607423 A1 | 12/1986 |
| WO | 2009114414 A1 | 9/2009 |
| WO | 2019064912 A1 | 4/2019 |

OTHER PUBLICATIONS

"Cooling Assembly Arctic Cat, Snowmobile, 1997 ZR 440 [97ZRA-1997-22-25]", https://www.countrycat.com/arctic-cat-parts?gclid=EAlalQobChMI7O-P-JzGgAMVdqtaBR1Dbg33EAAYASABEgKGPvD_BWE#/Arctic_Cat/1997_ZR_440_%5b97ZRA-1997-22-25%5d/COOLING_ASSEMBLY_%5b65743%5d/97ZRA-1997-22-25/65743/y.

"Front Frame and Footrest Assembly [65748]", https://www.countrycat.com/arctic-cat-parts? gclid=EAlalQobChMI70-P-JzGgAMVdqtaBR1Dbg33EAAYASABEgKGPvD_BwE#/Arctic_Cat/1997_ZR_440_%5b97ZRA-1997-22-25%5d/FRONT_FRAME_AND_FOOTREST_ASSEMBLY_%5b65748%5d/97ZRA-1997-22-25/65748/y.

"Running Board Support Bracket", https://www.countrycat.com/arctic-cat-parts?gclid=EAlalQobChMI7O-P-JzGgAMVdqtaBR1Dbg33EAAYASABEgKGPvD_BwE#/Arctic_Cat/1992_PANTHER_%5b0650-173-1992-17-02%5d/TUNNEL_AND_REAR_BUMPER %5b59192%5d/0650-173-1992-17-02/59192/y.

"Tunnel and Rear Bumper [65742]—1997 ZR 440 [97ZRA-1997-22-25]", https://www.countrycat.com/arctic-cat-parts?gclid=EAlalQobChMI70-P-JzGgAMVdqtaBR1Dbg33EAAYASABEgKGPvD_BWE#/Arctic_Cat/1997_ZR_440_%5b97ZRA-1997-22-25%5d/TUNNEL_AND_REAR_BUMPER_%5b65742%5d/97ZRA-1997-22-25/65742/y.

"NEW Pro Ride/AXYS Snow Flaps now available!", Dec. 20, 2016 and Dec. 21, 2016 https://www.hardcoresledder.com/threads/new-pro-ride-axys-snow-flaps-now-available.1663618/.

"Ski-Dao New OEM Snow Flap Guard Black/Silver REV 520000704" https://leadersrpmshop.com/ (Accessed: Oct. 31, 2002).

Arctic Cat New OEM Tunnel Snow Flap/Guard CF,CFR.M,Sno Pro, M8 M6 CFR8 M1000 CF8 https://www.amazon.ca/Arctic-Tunnel-Snow-Guard-M1 000/dp/B01 DUY2GCW (Accessed: Apr. 22, 2022).

Van Amburg (VEI) Polaris Pro Short Rear Bumper Install https://www.snowest.com/forum/threads/van-amburg-vei-polaris-pro-short-rear-bumper-install.386413/ (Accessed: J/22/22).

Yamaha SX Viper Mountain—SXV70MH Bumper Diagram https://www.partzilla.com/catalog/yamaha/snowmobile/2003/sx-viper-mountain-sxv70mh/bumper (Accessed: Apr. 22, 22).

"English Translation of CN 102832746", 2025.

Watson, Captain JamesR. , "Fiber-Reinforced Composites", article dated 'Spring' 1997, accessed Jul. 25, 2025 at: https:// www. epoxyworks.com/fiber-reinforced-composites/ (Year: 1997), 1997, 8 Pages.

* cited by examiner

200

202 — ATTACH A SUPPORT MEMBER

204 — ATTACH INBOARD SIDES OF A FOOT SUPPORT MEMBER

206 — ATTACH THE FOOT SUPPORT MEMBER TO THE SUPPORT MEMBER

208 — ATTACH FRONT TOE STOPS

210 — ATTACH REAR KICK UP PANELS

212 — ATTACH BOTTOM-OUT PROTECTORS

490

312

312

490

312

312

650

104

RUNNING BOARD REAR KICK-UP

CROSS-REFERENCE TO RELATED APPLICATION

This application is related to commonly-owned U.S. Provisional Application No. 63/310,264, filed on Feb. 15, 2022 and entitled "Accessory Attachment System", U.S. Provisional Application No. 63/310,254, filed on Feb. 15, 2022 and entitled "Recreational Vehicle Spindle", U.S. Provisional Application No. 63/310,276, filed on Feb. 15, 2022 and entitled "Spindle for Recreational Vehicle", U.S. Provisional Application No. 63/310,232, filed on Feb. 15, 2022 and entitled "Headlight Assembly", U.S. Provisional Application No. 63/310,951, filed on Feb. 16, 2022 and entitled "Clutch Guard with Integrated Torque Control Link", U.S. Provisional Application No. 63/310,983, filed on Feb. 16, 2022 and entitled "Composite Running Board", U.S. Provisional Application No. 63/310,994, filed on Feb. 16, 2022 and entitled "Two-Stroke Engine", U.S. Provisional Application No. 63/342,447, filed on May 16, 2022 and entitled "Off-Road Vehicle", U.S. Provisional Application No. 63/344,165, filed on May 20, 2022 and entitled "Snowmobile Frame", U.S. Provisional Application No. 63/350,553, filed on Jun. 9, 2022 and entitled "Snowmobile with Seat and Gas Tank Assembly", U.S. Provisional Application No. 63/400,056, filed on Aug. 23, 2022 and entitled "Taillight Housing, Snow Flap and Assembly Thereof", U.S. Provisional Application No. 63/402,768, filed on Aug. 31, 2022 and entitled "Snow Vehicle Heat Exchanger Shield", U.S. Provisional Application No. 63/404,171, filed on Sep. 6, 2022 and entitled "Bumper Mount for a Snowmobile", U.S. Provisional Application No. 63/404,167, filed on Sep. 6, 2022 and entitled "Intake, Airbox, and Storage Assembly for Snowmobile", U.S. Provisional Application No. 63/404, 856, filed on Sep. 8, 2022 and entitled "Recreational Vehicle Spindle", U.S. Provisional Application No. 63/404,841, filed on Sep. 8, 2022 and entitled "Spindle for a Recreational Vehicle", U.S. Provisional Application No. 63/404,655, filed on Sep. 8, 2022 and entitled "Snowmobile with Seat Assembly", U.S. Provisional Application No. 63/404,682, filed on Sep. 8, 2022 and entitled "Snowmobile with Seat Assembly", U.S. Provisional Application No. 63/404,822, filed on Sep. 8, 2022 and entitled "Recoil Housing, Engine Assembly, and Method of Assembling Engine Assembly", U.S. Provisional Application No. 63/404,617, filed on Sep. 8, 2022 and entitled "Recreational Vehicle Running Board", U.S. Provisional Application No. 63/404,731, filed on Sep. 8, 2022 and entitled "Muffler Assembly, Snow Vehicle Including a Muffler Assembly, Snow Vehicle Including Electronic Power Steering, and Methods of Assembling Thereof", U.S. Provisional Application No. 63/405,121, filed on Sep. 9, 2022 and entitled "Snowmobile Drive Shaft", U.S. Provisional Application No. 63/405,033, filed on Sep. 9, 2022 and entitled "Recreational Vehicle Toe Stop, Toe Stop Assemblies, and Methods of Assembling a Recreational Vehicle", U.S. Provisional Application No. 63/405, 016, filed on Sep. 9, 2022 and entitled "Skid Plate, Secondary Skid Plate, and Track Drive Protector for a Recreational Vehicle", U.S. Provisional Application No. 63/405,176, filed on Sep. 9, 2022 and entitled "Recreational Vehicle Heat Exchanger End Caps and Assembly", U.S. Provisional Application No. 63/404,992, filed on Sep. 9, 2022 and entitled "Recreational Vehicle Bottom-Out Protector and Assemblies Thereof", and U.S. Provisional Application No. 63/434,382 filed on Dec. 21, 2022 and entitled "Skid Plate, Secondary Skid Plate, and Track Drive Protector for a Recreational Vehicle", and which applications are hereby incorporated by reference in their entirety.

A claim of priority is made to commonly-owned U.S. Provisional Application No. 63/310,264, filed on Feb. 15, 2022 and entitled "Accessory Attachment System", U.S. Provisional Application No. 63/310,254, filed on Feb. 15, 2022 and entitled "Recreational Vehicle Spindle", U.S. Provisional Application No. 63/310,951, filed on Feb. 16, 2022 and entitled "Clutch Guard with Integrated Torque Control Link", U.S. Provisional Application No. 63/310, 983, filed on Feb. 16, 2022 and entitled "Composite Running Board", U.S. Provisional Application No. 63/344,165, filed on May 20, 2022 and entitled "Snowmobile Frame", U.S. Provisional Application No. 63/400,056, filed on Aug. 23, 2022 and entitled "Taillight Housing, Snow Flap and Assembly Thereof", U.S. Provisional Application No. 63/402,768, filed on Aug. 31, 2022 and entitled "Snow Vehicle Heat Exchanger Shield", U.S. Provisional Application No. 63/404,171, filed on Sep. 6, 2022 and entitled "Bumper Mount for a Snowmobile", U.S. Provisional Application No. 63/404,856, filed on Sep. 8, 2022 and entitled "Recreational Vehicle Spindle", U.S. Provisional Application No. 63/404, 822, filed on Sep. 8, 2022 and entitled "Recoil Housing, Engine Assembly, and Method of Assembling Engine Assembly", U.S. Provisional Application No. 63/404,617, filed on Sep. 8, 2022 and entitled "Recreational Vehicle Running Board", U.S. Provisional Application No. 63/404, 731, filed on Sep. 8, 2022 and entitled "Muffler Assembly, Snow Vehicle Including a Muffler Assembly, Snow Vehicle Including Electronic Power Steering, and Methods of Assembling Thereof", U.S. Provisional Application No. 63/405,121, filed on Sep. 9, 2022 and entitled "Snowmobile Drive Shaft", U.S. Provisional Application No. 63/405,033, filed on Sep. 9, 2022 and entitled "Recreational Vehicle Toe Stop, Toe Stop Assemblies, and Methods of Assembling a Recreational Vehicle", U.S. Provisional Application No. 63/405,016, filed on Sep. 9, 2022 and entitled "Skid Plate, Secondary Skid Plate, and Track Drive Protector for a Recreational Vehicle", U.S. Provisional Application No. 63/405,176, filed on Sep. 9, 2022 and entitled "Recreational Vehicle Heat Exchanger End Caps and Assembly", U.S. Provisional Application No. 63/404,992, filed on Sep. 9, 2022 and entitled "Recreational Vehicle Bottom-Out Protector and Assemblies Thereof", and U.S. Provisional Application No. 63/434,382 filed on Dec. 21, 2022 and entitled "Skid Plate, Secondary Skid Plate, and Track Drive Protector for a Recreational Vehicle", and which applications are hereby incorporated by reference in their entirety.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. One or more skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handle-bars. The snowmobile also includes a footrest for the rider while riding.

SUMMARY

According to one or more aspects of the present disclosure, a rear member of a running board assembly for a snow vehicle. The rear member includes a transition body positionable adjacent a side wall of a tunnel of the snow vehicle. The transition body comprises a forward end and a rearward end extending upward and rearward therefrom. The rear member further includes a flange extending downward and rearward from the transition body. The flange is positionable adjacent the side wall of the tunnel. The rear member further includes a bumper arm mount positioned at the rearward end of the transition body. The bumper arm mount is engageable with a bumper arm of the snow vehicle.

According to one or more embodiments of the present disclosure, a snow vehicle includes a tunnel, a track positioned in the tunnel, and a rear bumper. The tunnel includes a first end, a second end extending rearward from the first end, and a side wall. The rear bumper is positioned at the second end of the tunnel, the rear bumper including a bumper arm extending forward along the side wall. The snow vehicle further includes a running board and a rear member. The running board is positioned along the side wall and includes a first end and a second end extending rearward from the first end. The rear member includes a first end secured to the second end of the running board. The rear member further includes a second end that extends upward and rearward from the first end of the rear member. The second end of the rear member is secured to the bumper arm.

According to one or more embodiments of the present disclosure, a snow vehicle includes a forward frame, a tunnel, a track positioned in the tunnel, and a skid frame. The tunnel includes a first end secured to the forward frame, a second end extending rearward from the first end, and a side wall. The skid frame includes a rear suspension operably connected to the tunnel. The snow vehicle includes a rear bumper, a running board support member, and a rear member. The rear bumper includes a bumper arm extending forward of the second end along the side wall. The running board support member includes a first end secured to the forward frame, a second end secured to a rear suspension component, and a length extending between the first end and the second end of the running board support member that is positioned apart from the side wall of the tunnel. The rear member includes a first end positioned on the running board support member and a second end that extends upward and rearward from the first end of the rear member. The second end of the rear member is secured to the bumper arm.

BRIEF DESCRIPTION OF THE DRAWINGS

This written disclosure describes illustrative embodiments that are non-limiting and non-exhaustive. Reference is made to illustrative embodiments that are depicted in the figures, in which.

DETAILED DESCRIPTION

Figure 1:
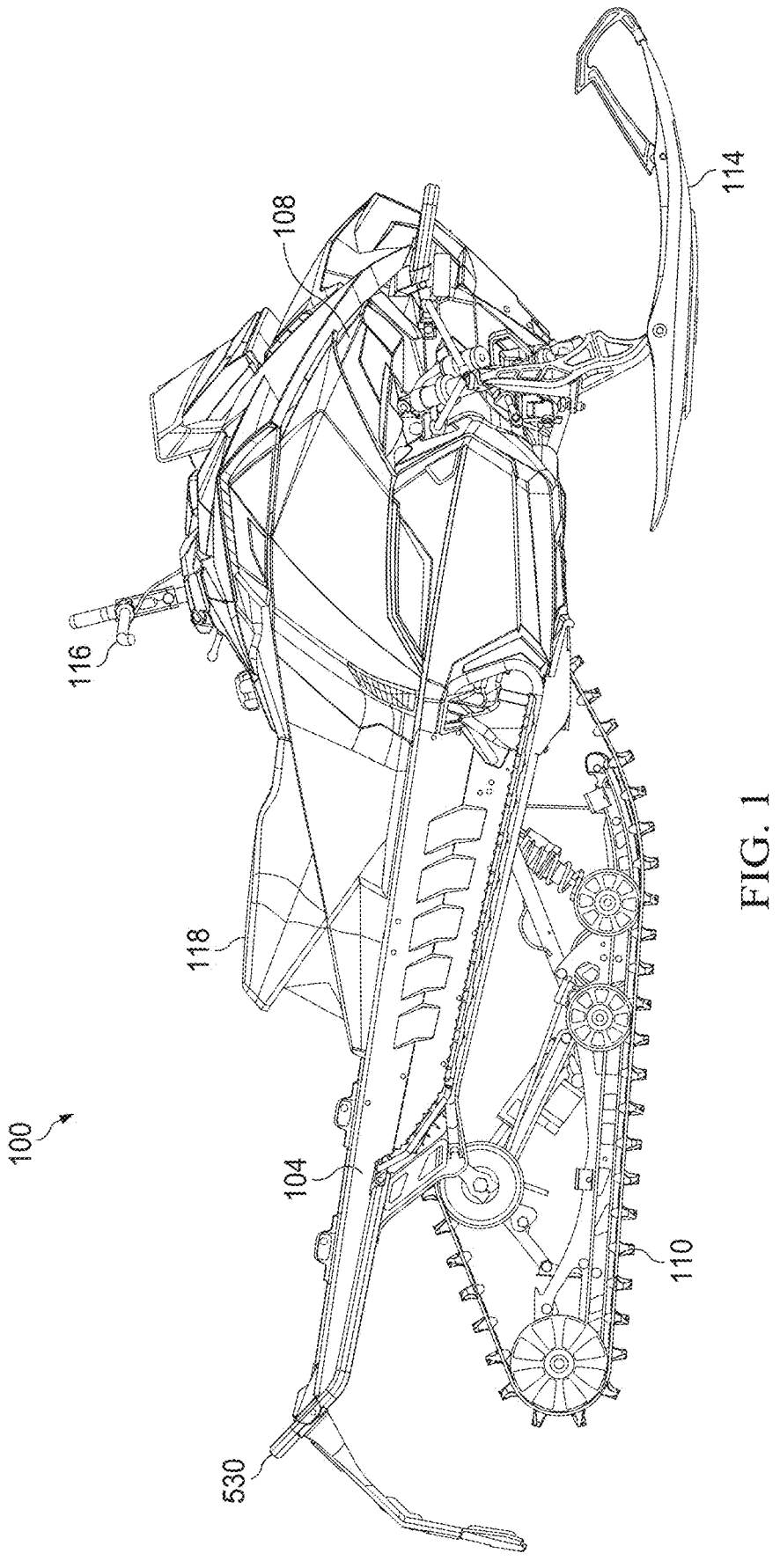
FIG. 1 illustrates a side view of a first snowmobile, according to some embodiments.
Figure 2:
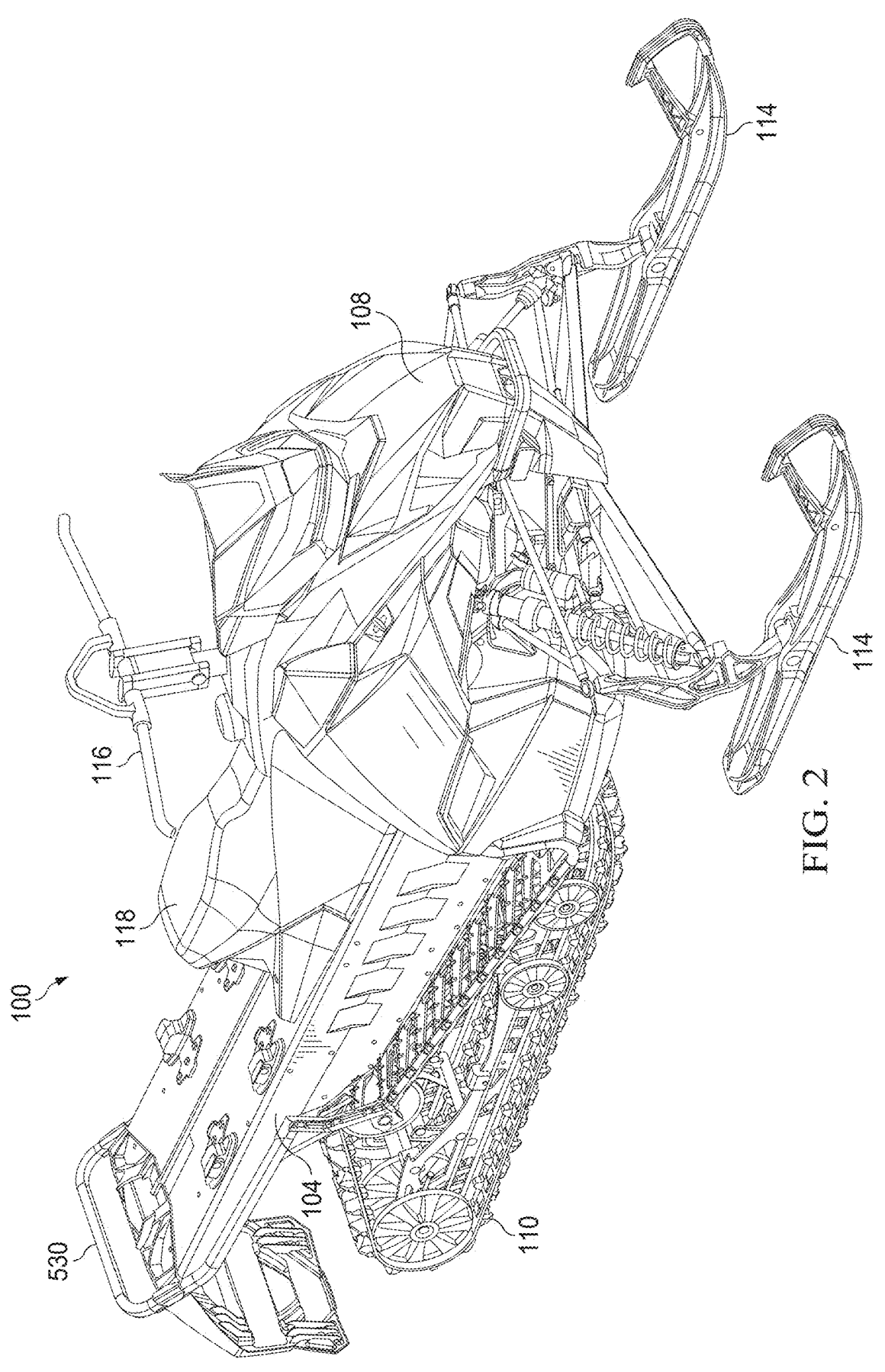
FIG. 2 illustrates a perspective of the snowmobile of FIG. 1, according to some embodiments.

Embodiments of the present disclosure describe one or more components of a running board assembly, a toe stop, a bottom-out protector, and an accessory skid plate assembly, and combinations thereof, that can be removably secured to one or more vehicles, such as snowmobiles 100. The snowmobiles 100 are generally shown in FIGS. 1-10 and may include a chassis 102, a tunnel 104, a motor or engine 106 (hereinafter referred to as "the engine 106") attached to the chassis 102 and disposed within an engine bay 108, a drive track 110 disposed within the tunnel 104, and a drivetrain 112 configured to provide motive power from the engine 106 to the drive track 110. The snowmobile 100 further includes one or more skis 114 operably connected to handlebars 116 that are used to turn the snowmobile 100 and a seat 118 for the snowmobile driver/passenger.

Figure 8:
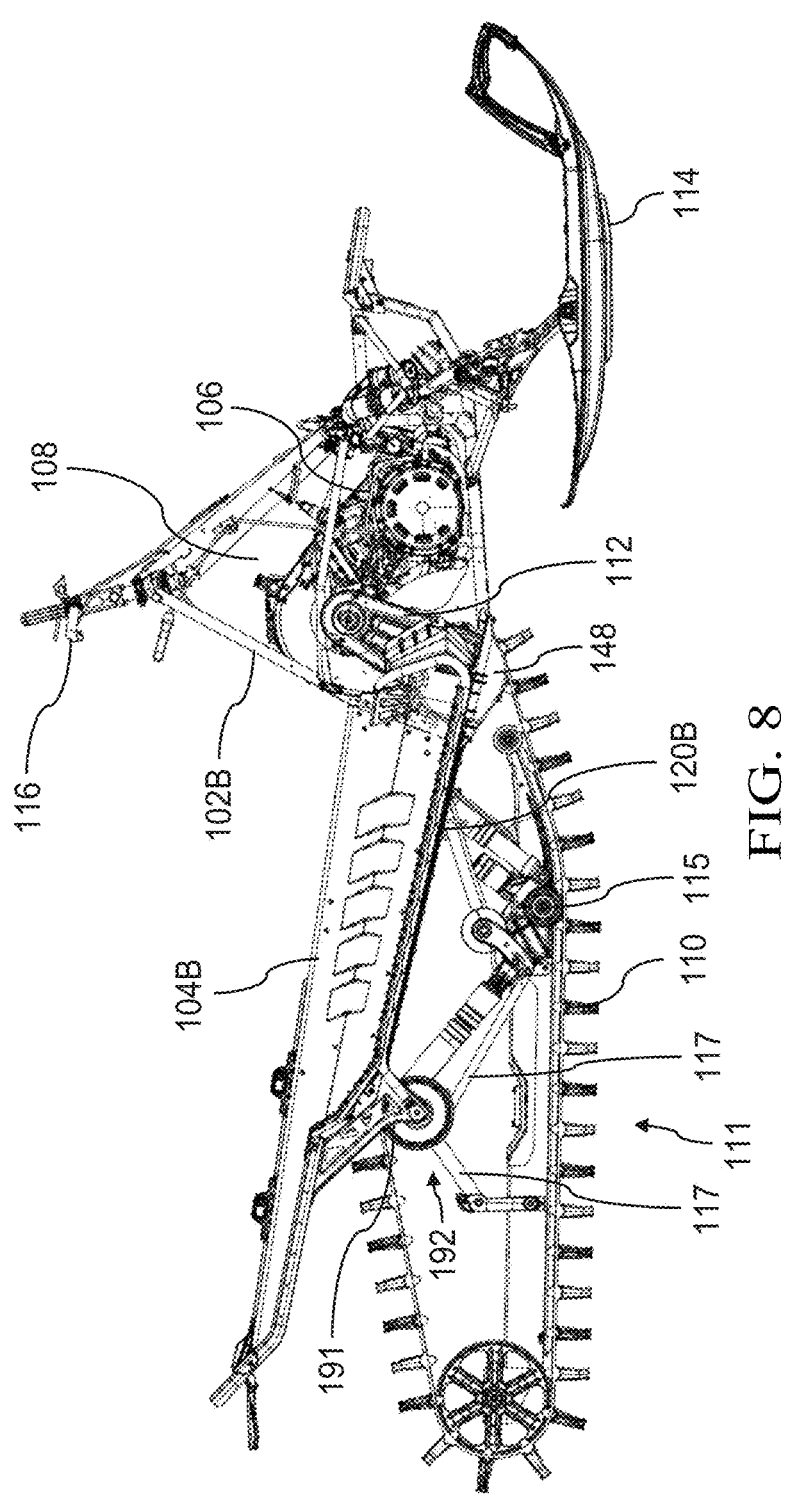
FIG. 8 illustrates a right side view of a second snowmobile with portions of the engine cover removed, according to some embodiments.
Figure 9:
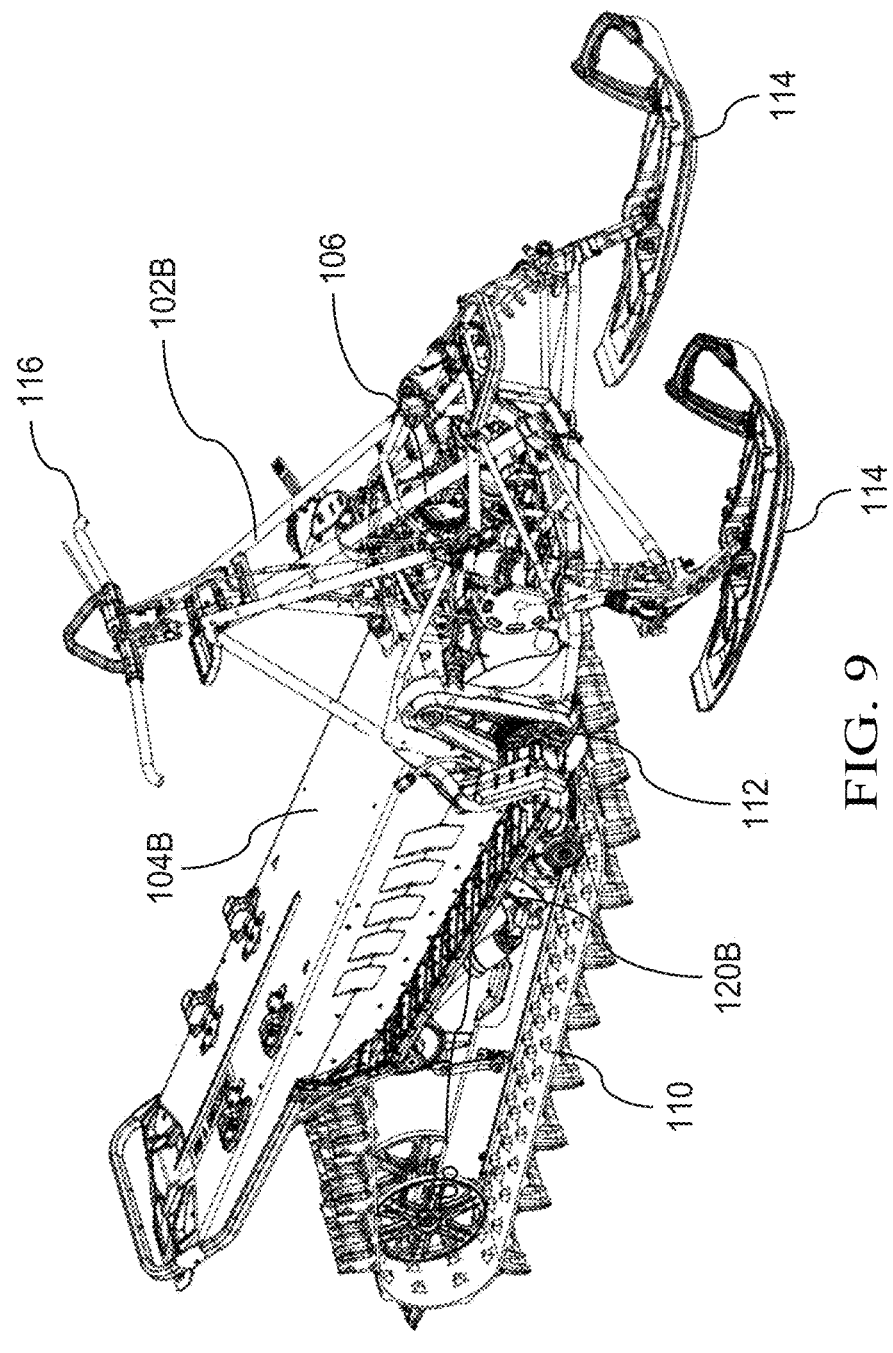
FIG. 9 illustrates a right side perspective view of the snowmobile of FIG. 8 with portions of the engine cover removed, according to some embodiments.
Figure 11:
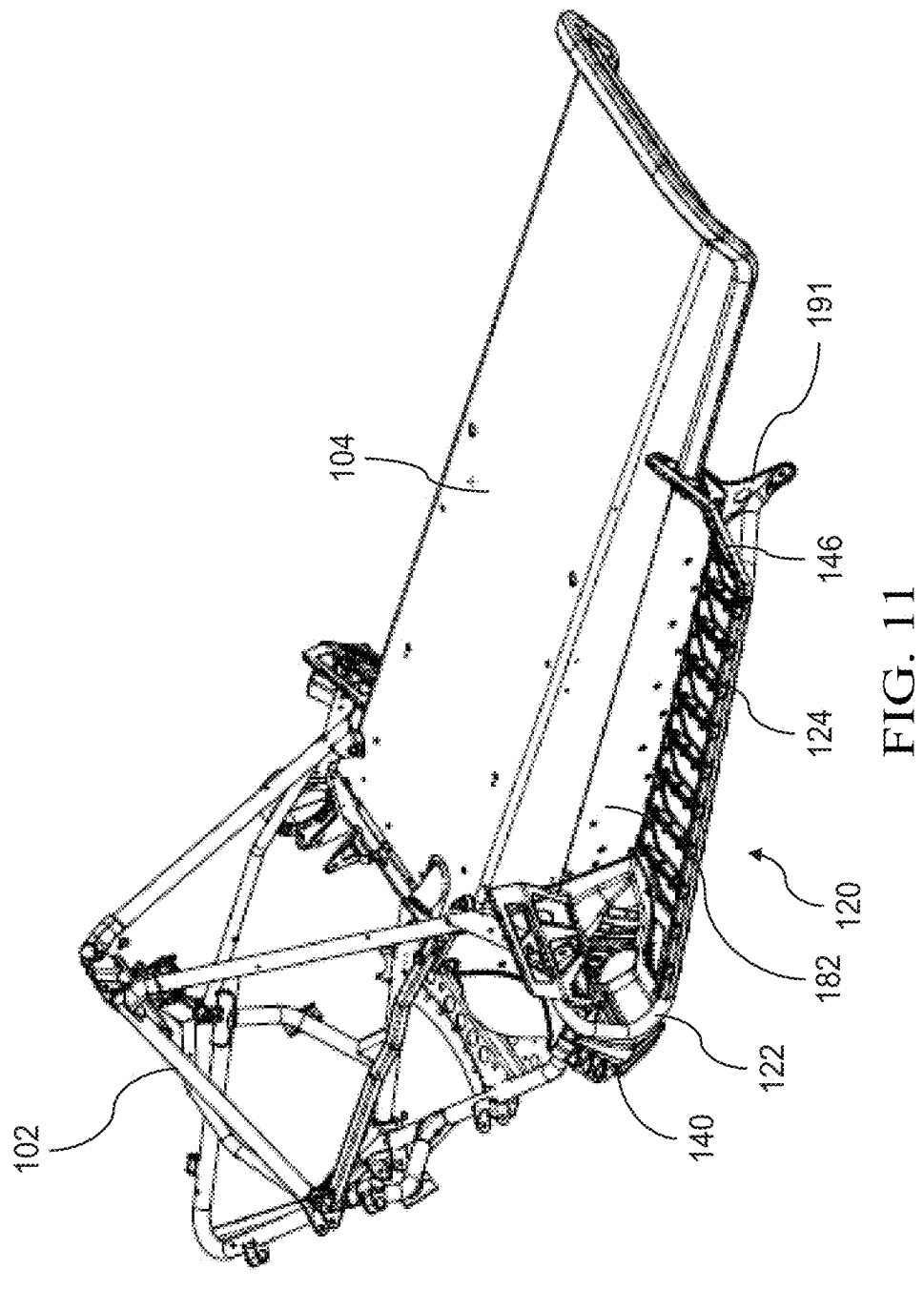
FIG. 11 illustrates a perspective top view of the snowmobile chassis having a running board assembly connected thereto, according to some embodiments.
Figure 12:
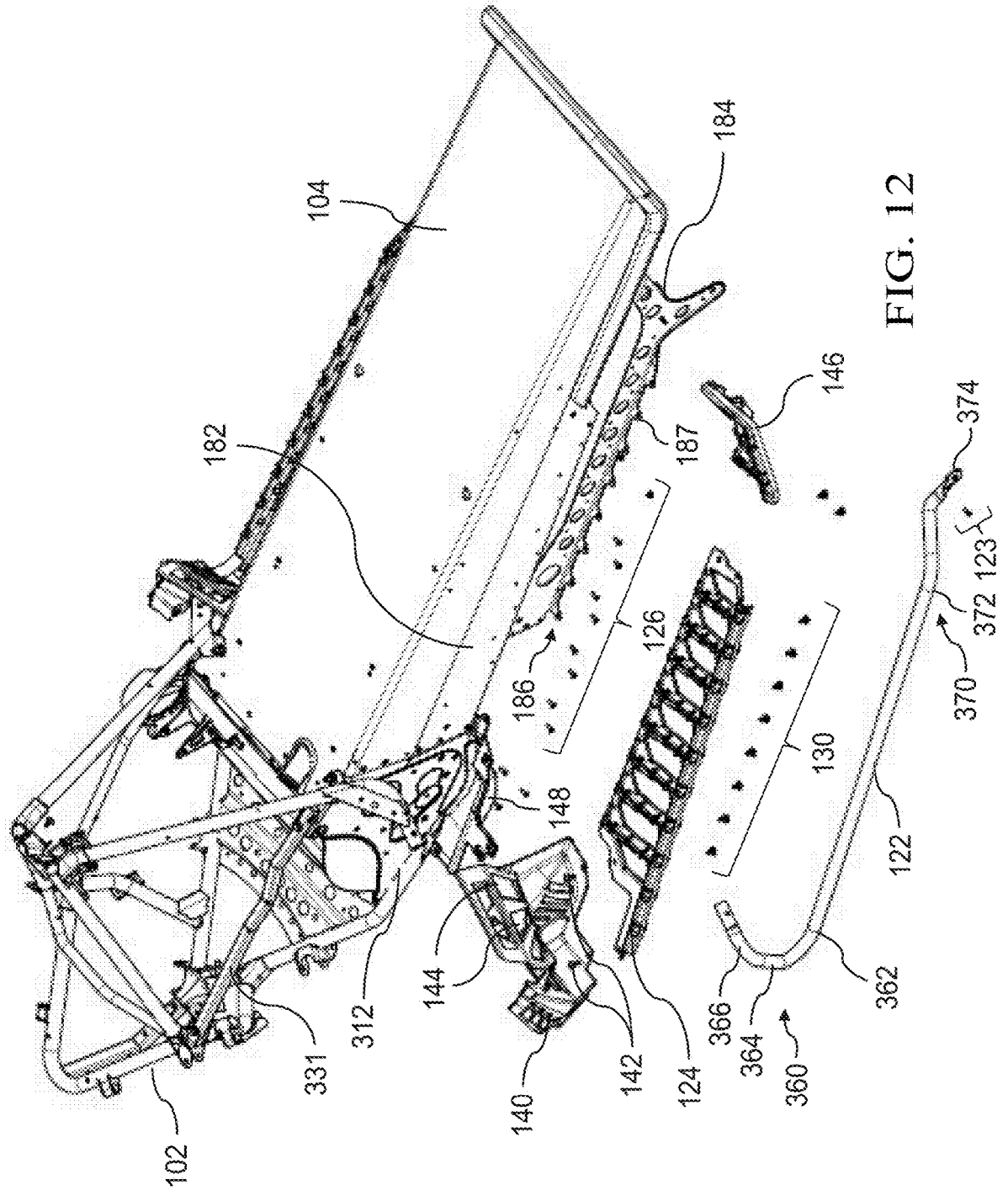
FIG. 12 illustrates an exploded top view of the running board assembly of FIG. 11, according to some embodiments.
Figure 28:
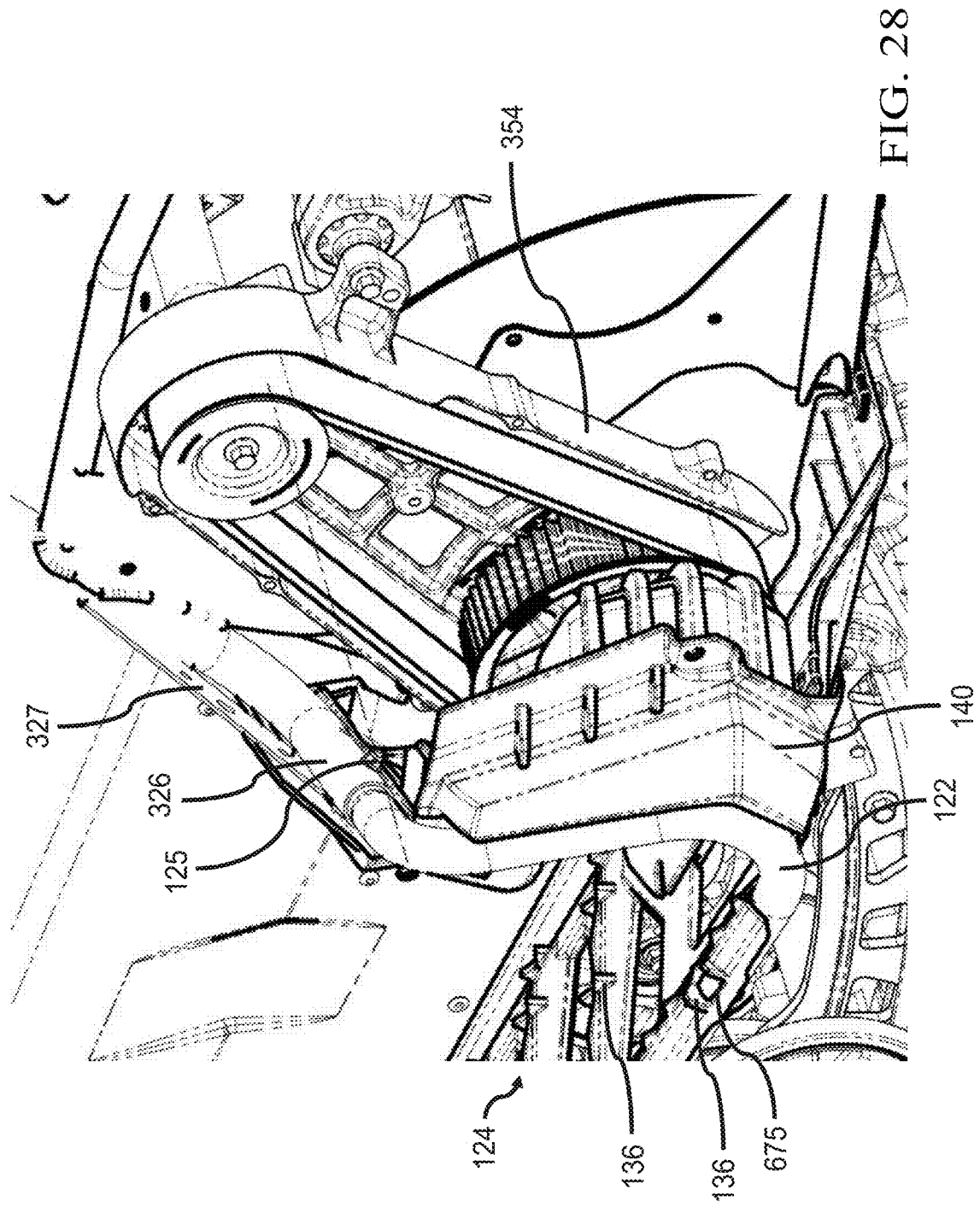
FIG. 28 illustrates a front perspective view of the front toe stop, the foot support member, the support member of the running board assembly, and bottom-out protector, with a belt housing assembly in a first position associated with the first snowmobile of FIG. 1, according to some embodiments.
Figure 29:
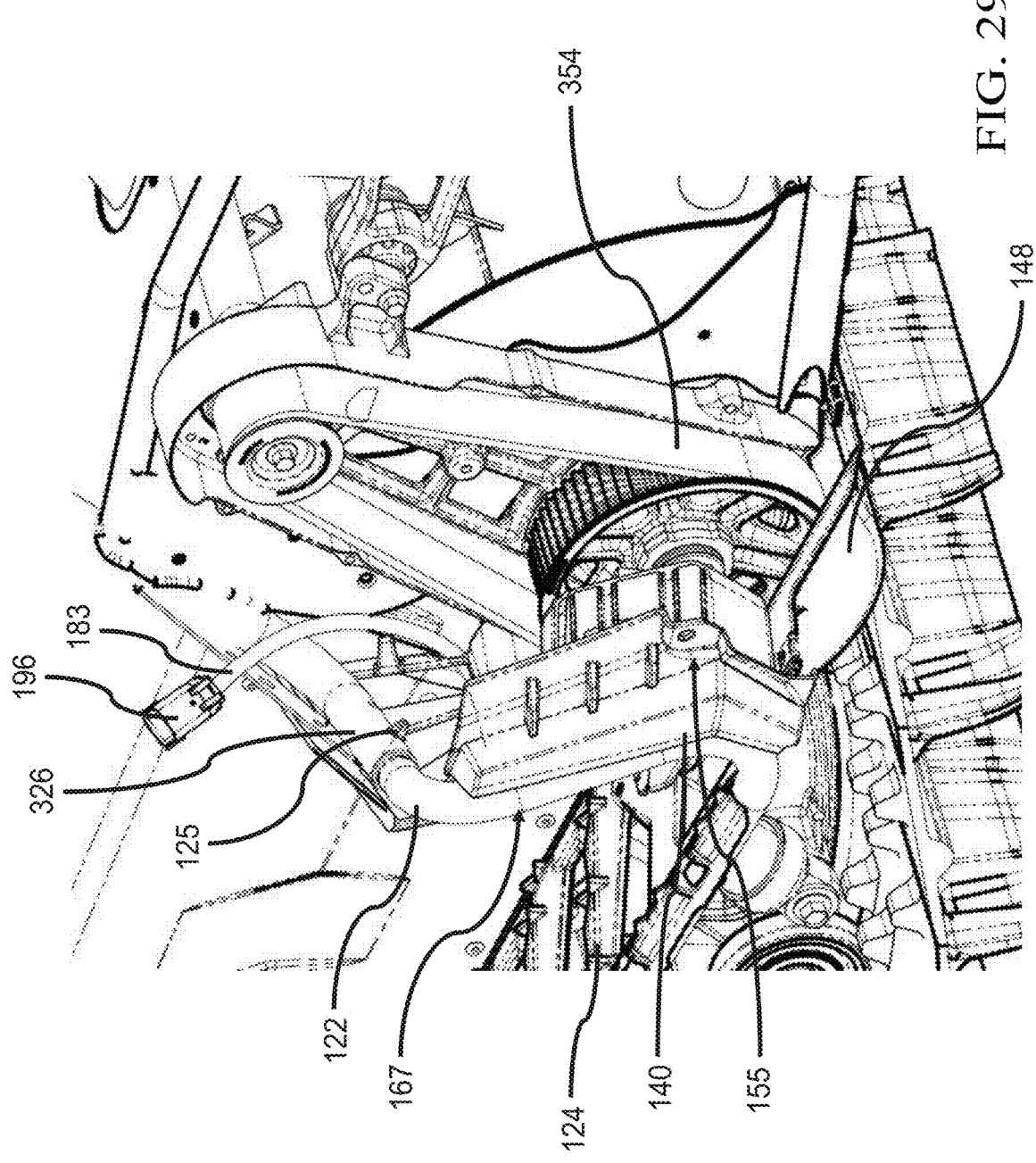
FIG. 29 illustrates an alternative front perspective view of the front toe stop, the foot support member, the support member of the running board assembly, and bottom-out protector, with the belt housing assembly in a second position associated with the second snowmobile of FIG. 8, according to some embodiments.

As shown in FIGS. 11-26B, a running board assembly 120 may include a support member 122 and a running board or foot support member 124 (hereinafter referred to as "the foot support member 124"). The support member 122 may be a tube, may be hollow, and may be comprised of a metal, a metal alloy, a polymeric material, or a fiber reinforced polymer composite. In a non-limiting example, the support member 122 is a steel tube. The rearward end of the support member 122 is removably securable to the tunnel 104, or to a support bracket 184 that is secured to an interior surface of a side panel 182 of the tunnel 104 by a first plurality of screws or threaded fasteners 126. As shown in FIGS. 8 and 11, the rearward end of the support member 122 may extend downwardly from an outboard side 127 of the foot support member 124 and inward to where it is removably attached to a rearward portion 191 of the support bracket 184 that extends below the adjacent portion of the tunnel side panel 182. As shown in FIGS. 5, 8, 70A and 70B, the rearward portion 191 may also provide a common mounting point for a rear suspension component 192 positioned in or below the tunnel 104. In a non-limiting example, a fastener 123 may be inserted through an aperture 194 in the support member 122 and an aperture 193 in the rearward portion 191 to secure the support member 122 to an outward facing surface of the rearward portion 191, and into an aperture in the rear suspension component 192 to secure the rear suspension component 192 to an inward facing surface of the rearward portion 191. In an illustrative example, the rear suspension component 192 may be an upper horizontal member of a rear idler arm that is connected to a rear arm of a rear suspension on a skid frame assembly, or a component operably coupled thereto. An example of such an upper horizonal member is shown in U.S. Pat. No. 9,771,130, entitled "Snowmobile Skid Frame Assembly", the contents of which are hereby incorporated by reference in its entirety. A forward end 632 of the support member 122 may be removably secured to the snowmobile by, for example, inserting within a tubular rearward leg 326/338 of a forward frame 312 and securing the two tubes together with a removable fastener 125 as best shown in FIGS. 28 and 29. It is also to be understood that the end of the rearward leg 326/338 may be inserted in the forward end of the support member 122 to secure the two together. The forward frame 312 may be the forward frame assembly described in U.S. Provisional Patent Application No. 63/344,165 filed on May 20, 2022, and entitled "Snowmobile Frame," the contents of which are incorporated by reference in its entirety. The forward end 632 of the support member 122 extends outward, forward, and downward from the rearward leg 326 and transitions into a rearward extending portion that provides an outboard support platform for the foot support member 124. This provides a continuous tubular member comprised of the support member 122 and the rearward leg 326, 338 of the forward frame 312. The continuous tubular member extends from a steering column mount component 328, shown in FIGS. 41B and 41C, located at the top of the forward frame 312 forward of the tunnel 104 and the track drive shaft 352. One or more fasteners 123, 125 provide a removable attachment of the support member 122 to the snowmobile 100 in case the support member 122 needs to be removed or replaced. For example, removal of the fastener 123 allows the support member 122 to be decoupled from the rearward leg 326 or 338. It is to be understood that the forward end 632 and rearward ends 634 of the support member 122 may be fastened to the tunnel 104, a support bracket 184, and/or forward frame 312 by removeable threaded fasteners, fir tree fasteners, clips, etc. The support member 122 may alternatively be formed integrally with the tunnel 104, the foot support member 124, and/or the forward frame 312.

Figure 15A:
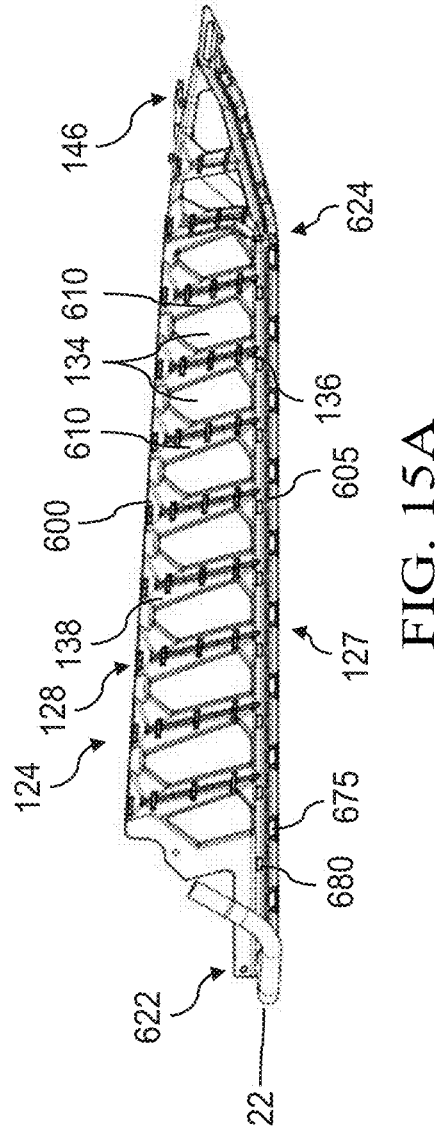
FIG. 15A illustrates an isolated top view of the running board assembly, according to some embodiments.
Figure 15B:
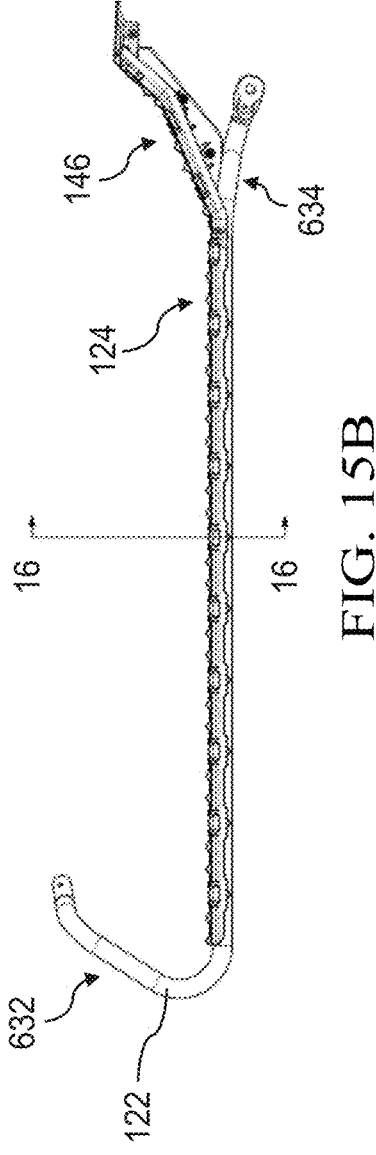
FIG. 15B illustrates an isolated side view of the running board assembly, according to some embodiments.
Figure 15C:
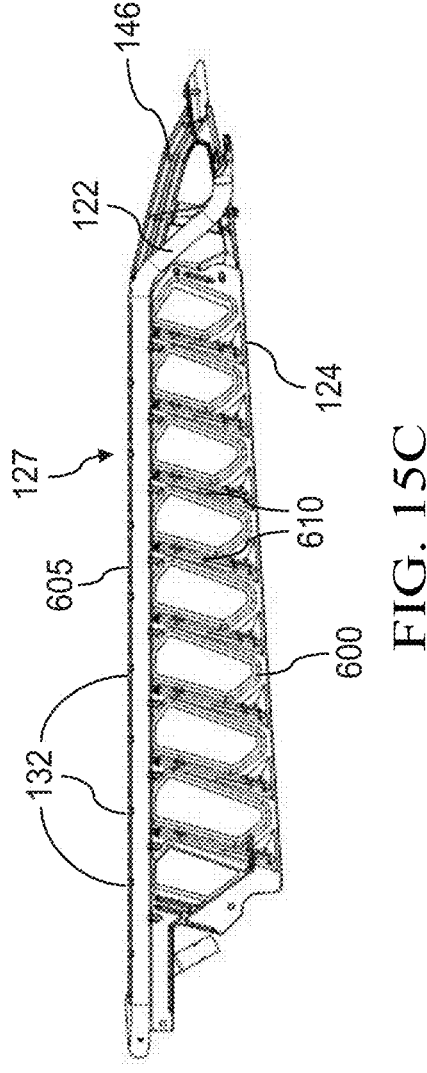
FIG. 15C illustrates an isolated bottom view of the running board assembly, according to some embodiments.
Figure 19:
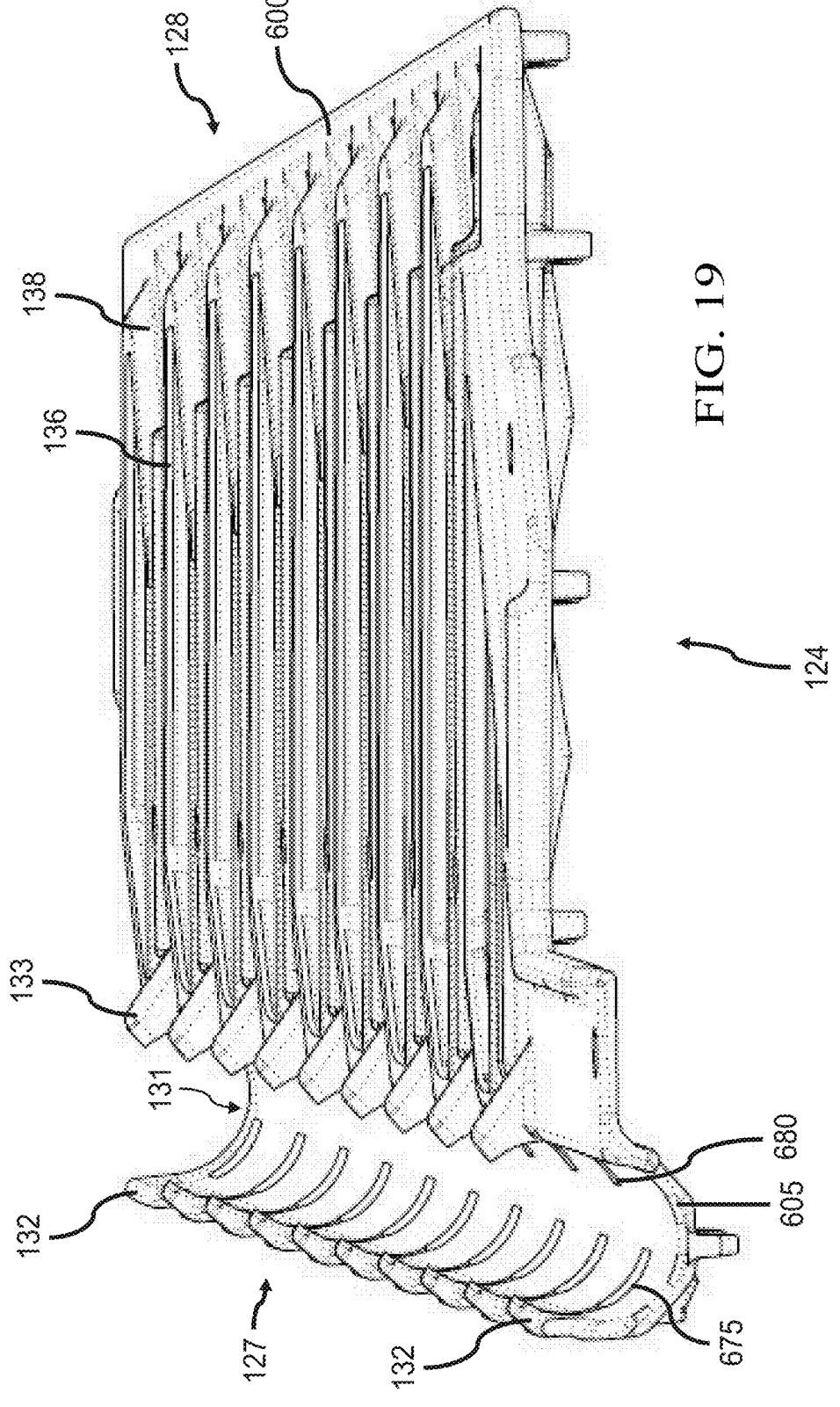
FIG. 19 illustrates a bottom view of a foot support member of the running board assembly, according to some embodiments.
Figure 20:
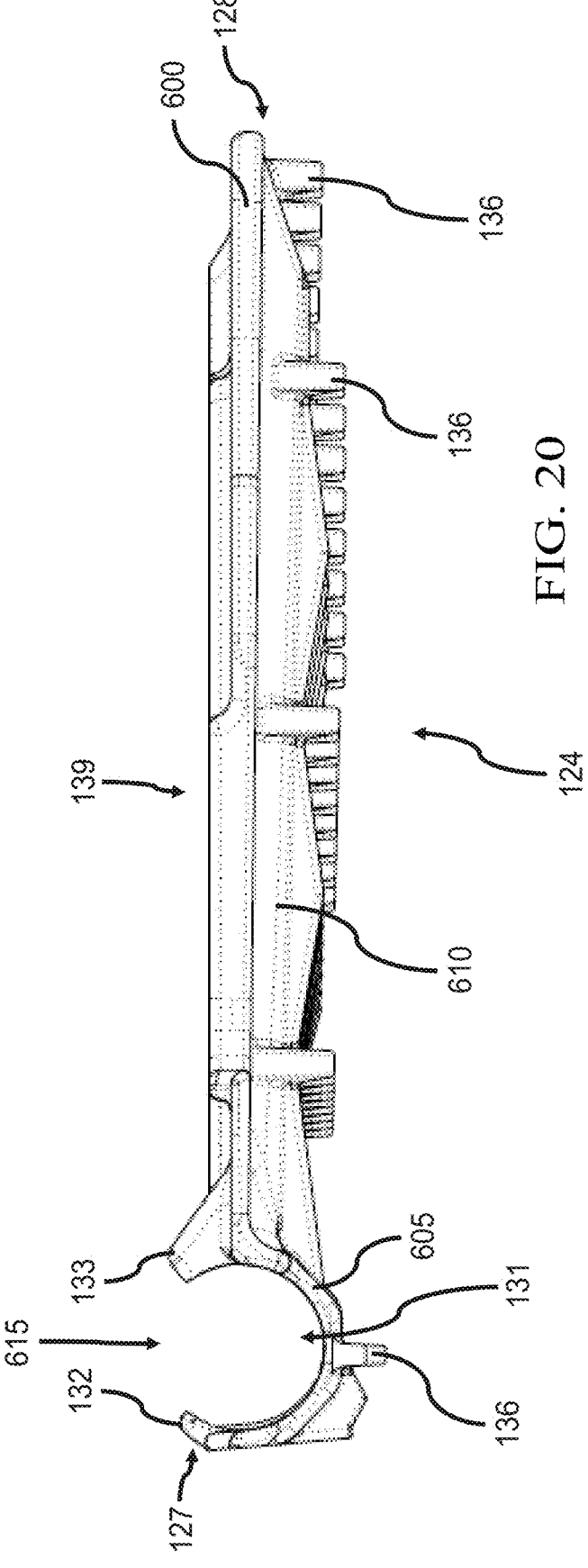
FIG. 20 illustrates a view of the forward end the foot support member of the running board assembly, according to some embodiments.
Figures 21A, 21B:
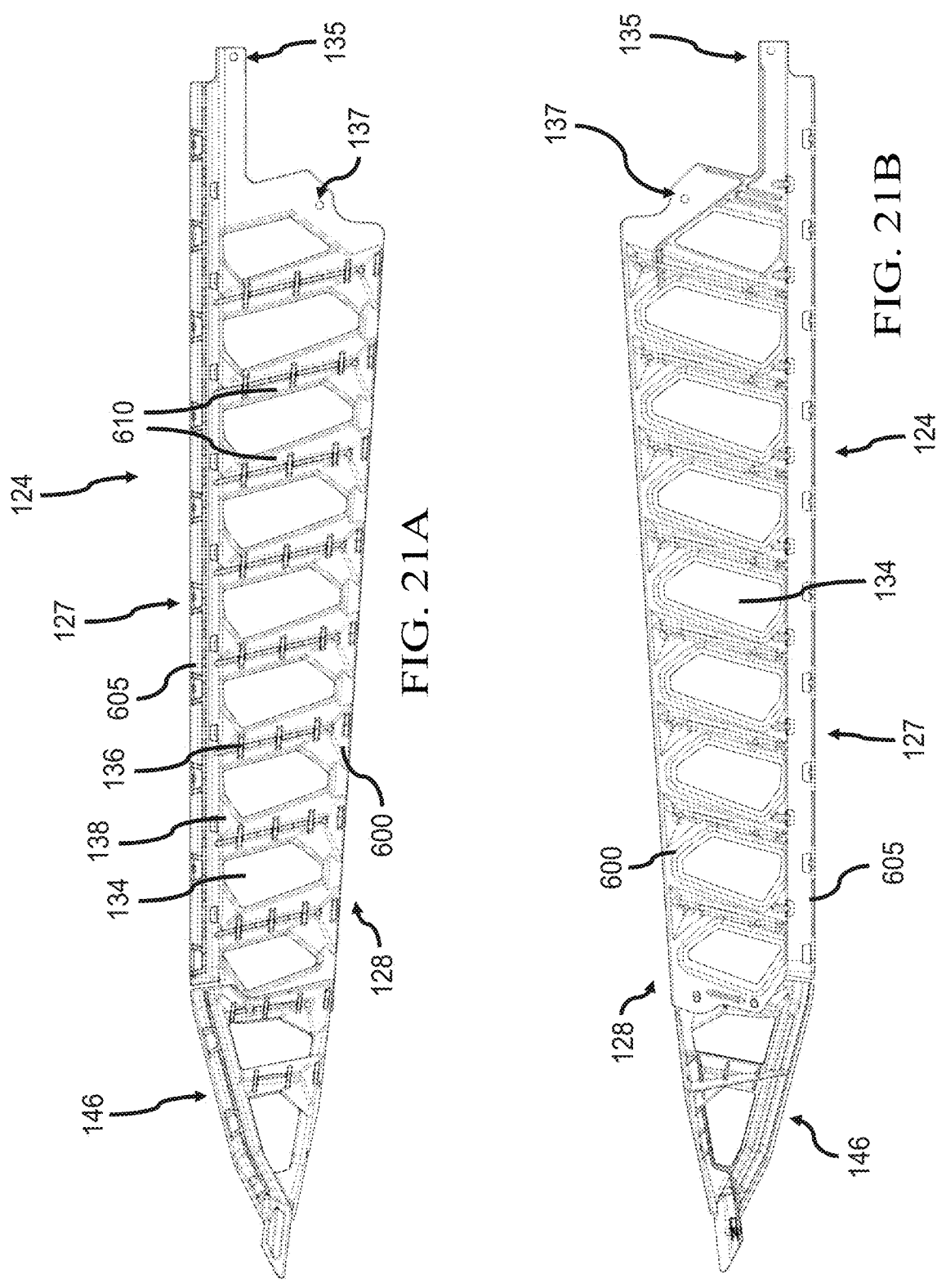
FIG. 21A illustrates a top view of the foot support member and a rear kick-up panel of the running board assembly, according to some embodiments.
FIG. 21B illustrates a bottom view of the foot support member and the rear kick-up panel of the running board assembly, according to some embodiments.
Figure 22:
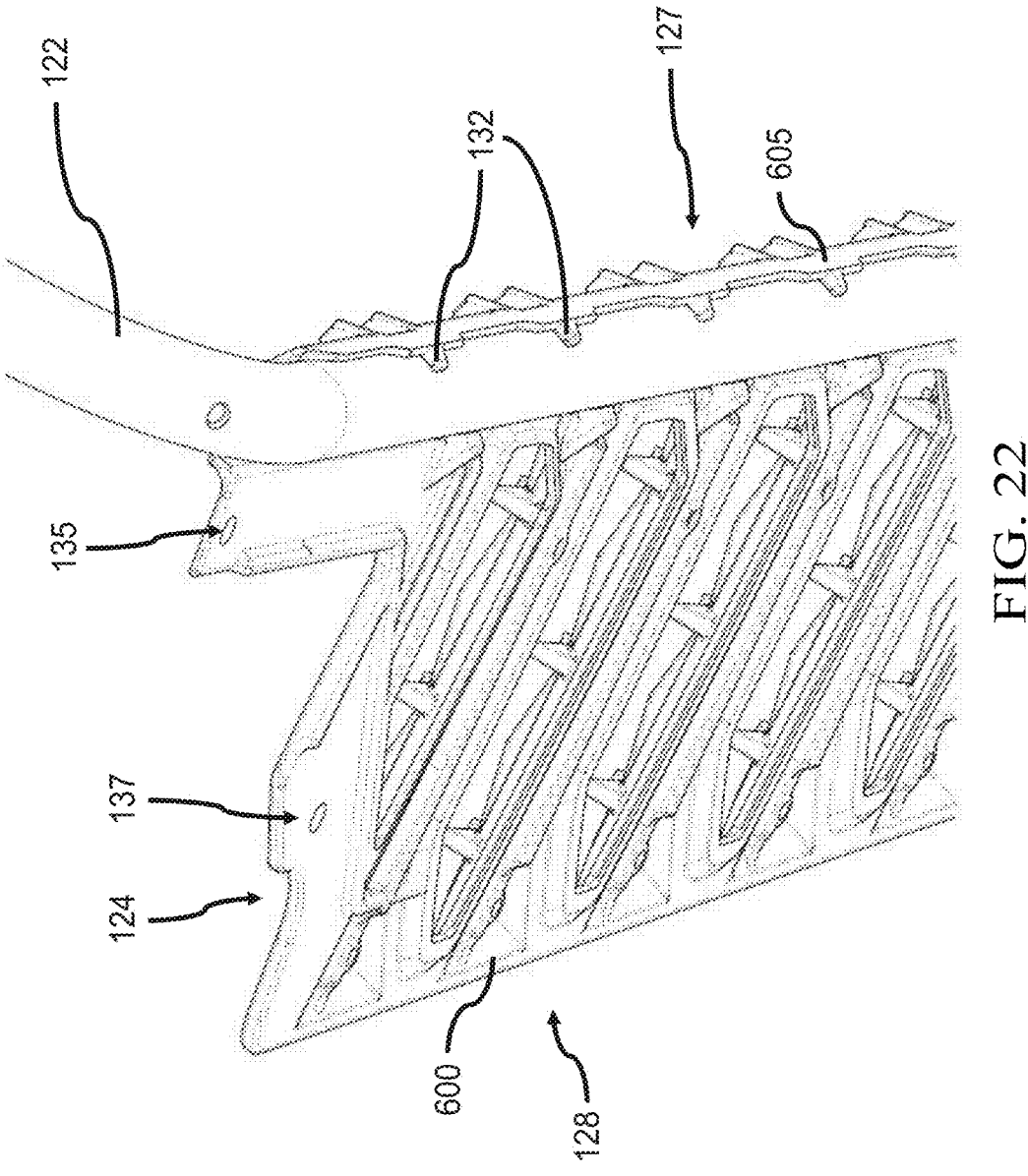
FIG. 22 illustrates a close-up bottom perspective view of a front end of the foot support member and support member of the running board assembly, according to some embodiments.
Figure 23B:
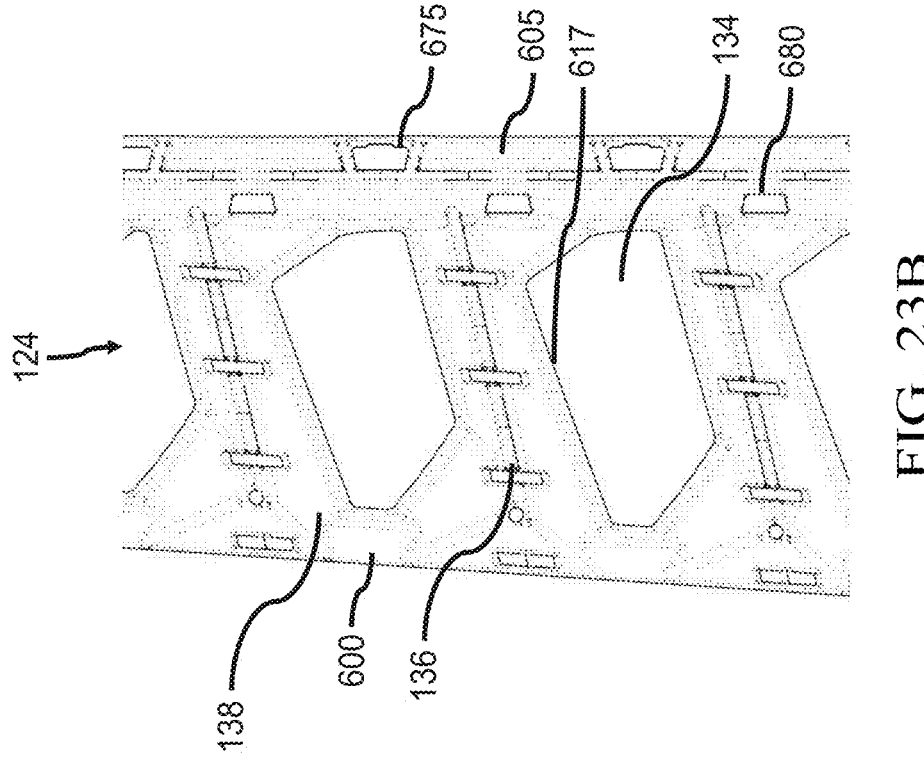
FIG. 23B illustrates a close-up top view of the foot support member and support member of the running board assembly, according to some embodiments.
Figure 23A:
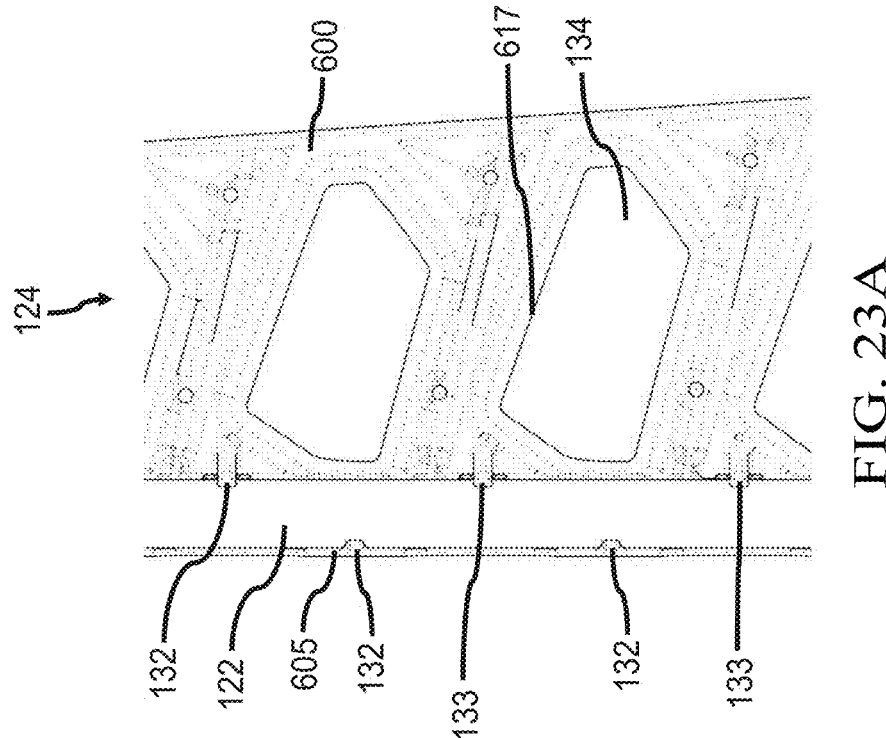
FIG. 23A illustrates a close-up bottom view of the foot support member and support member of the running board assembly, according to some embodiments.
Figure 24:
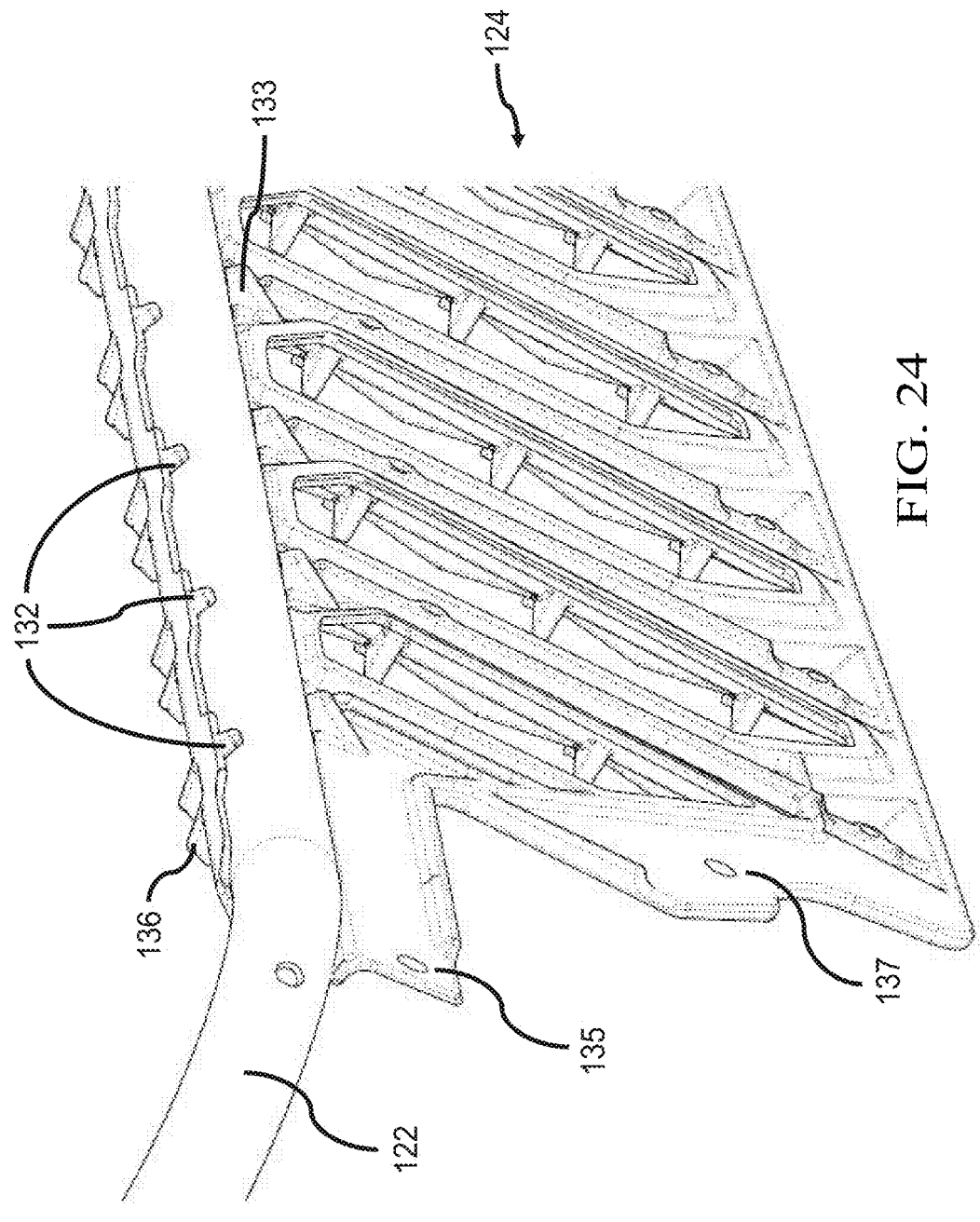
FIG. 24 illustrates another close-up bottom perspective view of the front end of the foot support member and support member of the running board assembly, according to some embodiments.

The foot support member 124 provides a support platform for the rider's feet while mounting and riding the snowmobile 100. In an illustrative example as shown in FIG. 15A, a first rail 600 defines an inboard side 128 of the foot support member 124 that is attached to the tunnel 104 or a mounting surface 186 of the support bracket 184 by a second plurality of screws or threaded fasteners 130. As illustrated in FIGS. 19 and 20, a second rail 605 of the foot support member 124 defines a channel 131 extending along an outboard side 127 of the foot support member 124 that receives the support member 122 therein. The first rail 600 may be positioned a first distance apart from the second rail 605 at the forward end 622 of the foot support member 124, and the first rail 600 may intersect or be positioned a second distance apart from the second rail 605 at a rearward end 624 of the foot support member 124. The second rail 605 may be longer than the first rail 600. As used herein, inboard may refer to a location or direction closer to the longitudinal centerline of the snowmobile and outboard may refer to a location or direction further from the longitudinal centerline of the snowmobile. As best shown in FIGS. 16, 19, 25A and 25B, an interior surface of the channel 131 defines a downward facing opening 615 and has a generally semicircular cross section having a radius that is substantially equal to the radius of an outer surface of the support member 122. The downward facing opening 615 may extend continuously along the length of the channel 131 to allow the support member 122 to be inserted into the channel 131 via the opening 615. The second rail 605 defines a plurality of retaining members including, but not limited to, flexible curved clips 132 extending from an outer side of the channel 131 toward the downward facing opening 615 of the channel 131. The retaining members may be integrally formed with the foot support member 124. A second set of retaining members may be provided, such as clips 133 that are positioned adjacent the cross members 610 and extend from the opposite side of the channel 131 toward the downward facing opening 615 of the channel 131. The clips 132 and 133 may have a radius substantially equal to that of the channel 131. The combination of the channel 131 and the clips 132, and optionally the clips 133, may have a cross section with a circular sector shape having a measurement greater than 1.02n radians and less than 1.5n radians so that the channel 131 and clips 132 (with or without the clips 133) wrap around at least 40% of a circumference of the support member 122, and optionally at least 50% of a circumference of the support member 122, and optionally between 51% and 75% of a circumference of the support member 122. The radius of this circular sector is substantially equal to the radius of an outer surface of the support member 122 and is sized so that the flexible clips 132 apply a compressive force to the support member 122 to removably secure the foot support member 124 to the support member 122. The clips 132 are offset from the clips 133 along the length of the channel 131. Offsetting the clips 132 and 133 along the length of the channel 131 facilitates insertion and removal of the support member 122 in the channel 131 and maintains the strength of the region of the foot support member 124 forming the channel 131. The outboard side 127 of the foot support member 124 may be retained to the support member 122 solely by the clips 132 and 133 to allow the support member to be inserted in or removed from the channel 131 without tools. However, it is to be understood that fasteners may be driven through the foot support member 124 and the support member 122 to removably secure the foot support member 124 to the outboard side of the support member 122. In a non-limiting example, fasteners may be used in combination with the clips 132 and 133 to secure the foot support member 124 to the support member 122.

In some examples, the foot support member 124 is formed of a polymeric material. Illustrative polymeric materials may include, but are not limited to, a polyamide, e.g., NYLON 6/6 OR NYLON 12. In other non-limiting examples, such a polymeric material includes, but is not limited to, polyetheretherketone (PEEK), polypropylene (PP), polyphthalamide (PPA) and/or polybutylene terephthalate (PBT). In some examples, the foot support member 124 may be formed of a composite of a polymer and other materials. For example, the foot support member 124 may comprise a composite including one or more of the above-described polymers and one or more types of reinforcements including, but not limited to, glass and/or carbon fibers, e.g., 30 wt % glass filled polyamide. In a non-limiting example, the fiber % by weight of the composite material may range from 10 wt % to 50 wt %, and may optionally be in the range of 20 wt % to 60 wt %, or optionally in the range of 45 wt % to 55 wt %. In some embodiments, the foot support member 124 includes polymeric material including, but not limited to, Nylon 6/6, Polyetheretherketone (PEEK), Polypropylene (PP), or Polyphthalamide (PPA) as a matrix material with glass, carbon, or ratio of both carbon and fiber material for fiber fill varying in percent volume from 10%-50%, optionally from 40%-60%, and in some embodiments, from 45%-55%. These materials have the advantages of being tough enough to withstand impacts while also being flexible enough to form the flexible clips 132 and 133 so that the flexible clips 132 and 133 may be integrally formed with the foot support member 124. The polymeric composite materials may comprise a thermal conductivity that is less than 10 W/m-° K, and optionally less than 5 W/m-° K, and optionally less than 1 W/m-° K. This thermal conductivity may provide the benefit of reducing conductive heat loss through a rider's boot from contact with the foot support member 124.

The support member 122 and the foot support member 124 are removably attached to the tunnel 104 or to a support bracket 184 that is secured to a side panel 182 of the tunnel 104. The foot support member 124 is removably secured to the support member 122, thereby allowing these components to be separately replaced.

Figure 3:
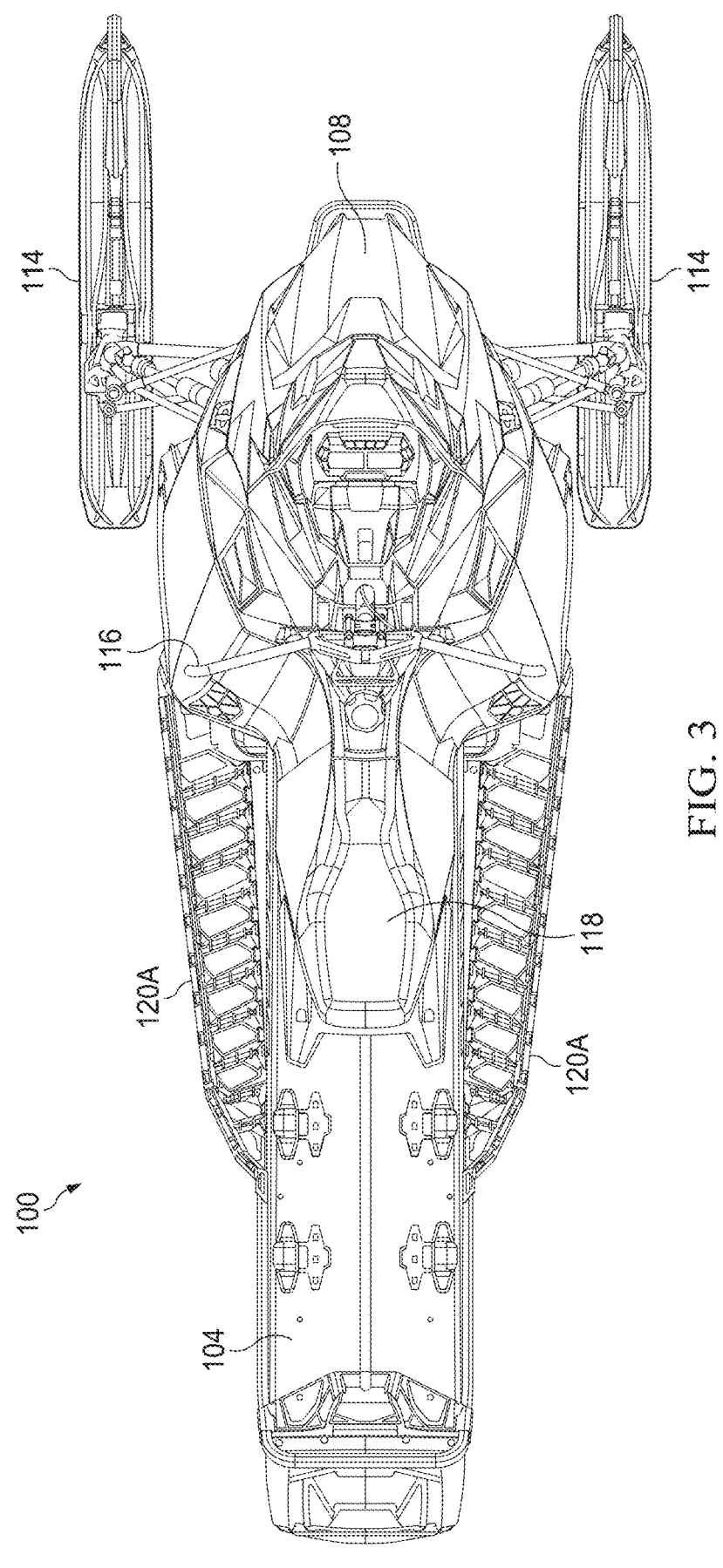
FIG. 3 illustrates a top view of the snowmobile of FIG. 1, according to some embodiments.
Figure 4:
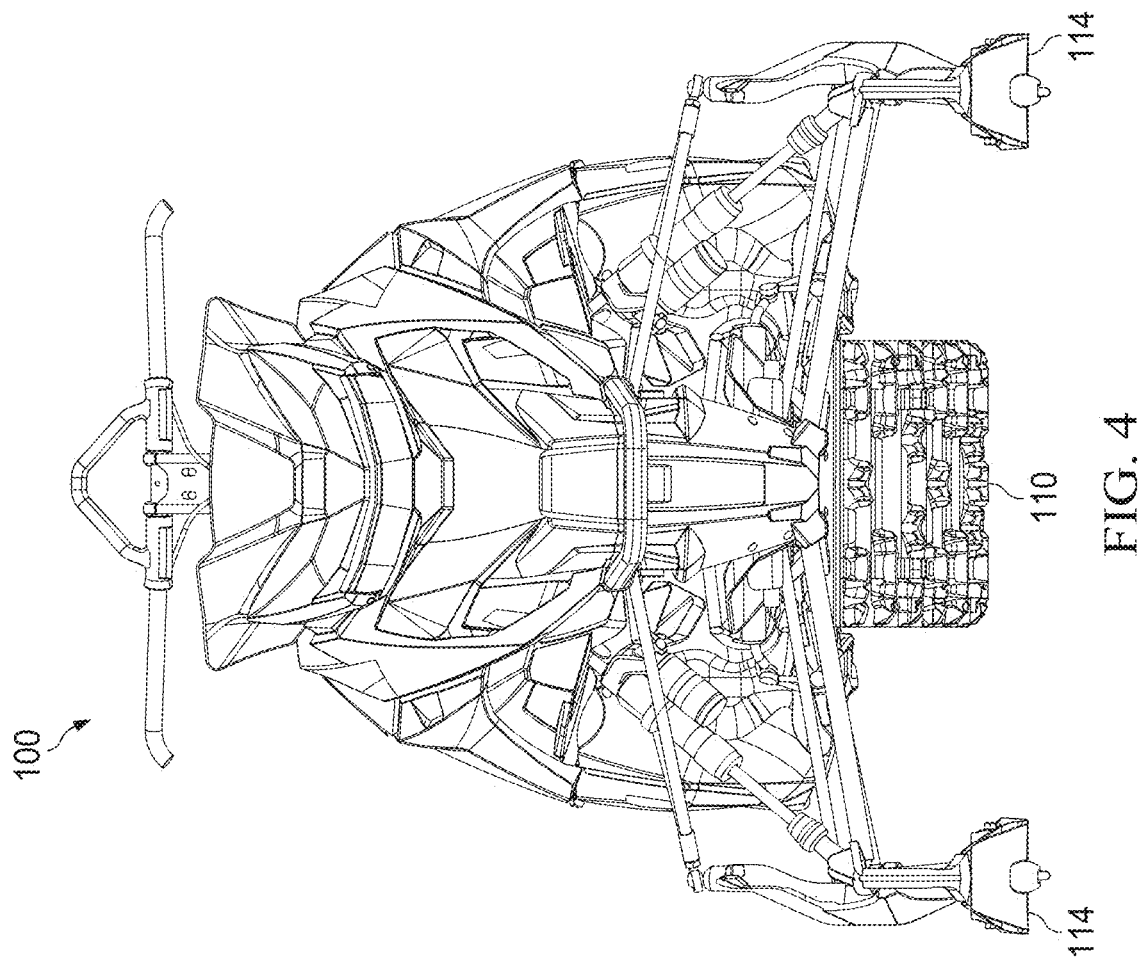
FIG. 4 illustrates a front view of the snowmobile of FIG. 1, according to some embodiments.
Figure 5:
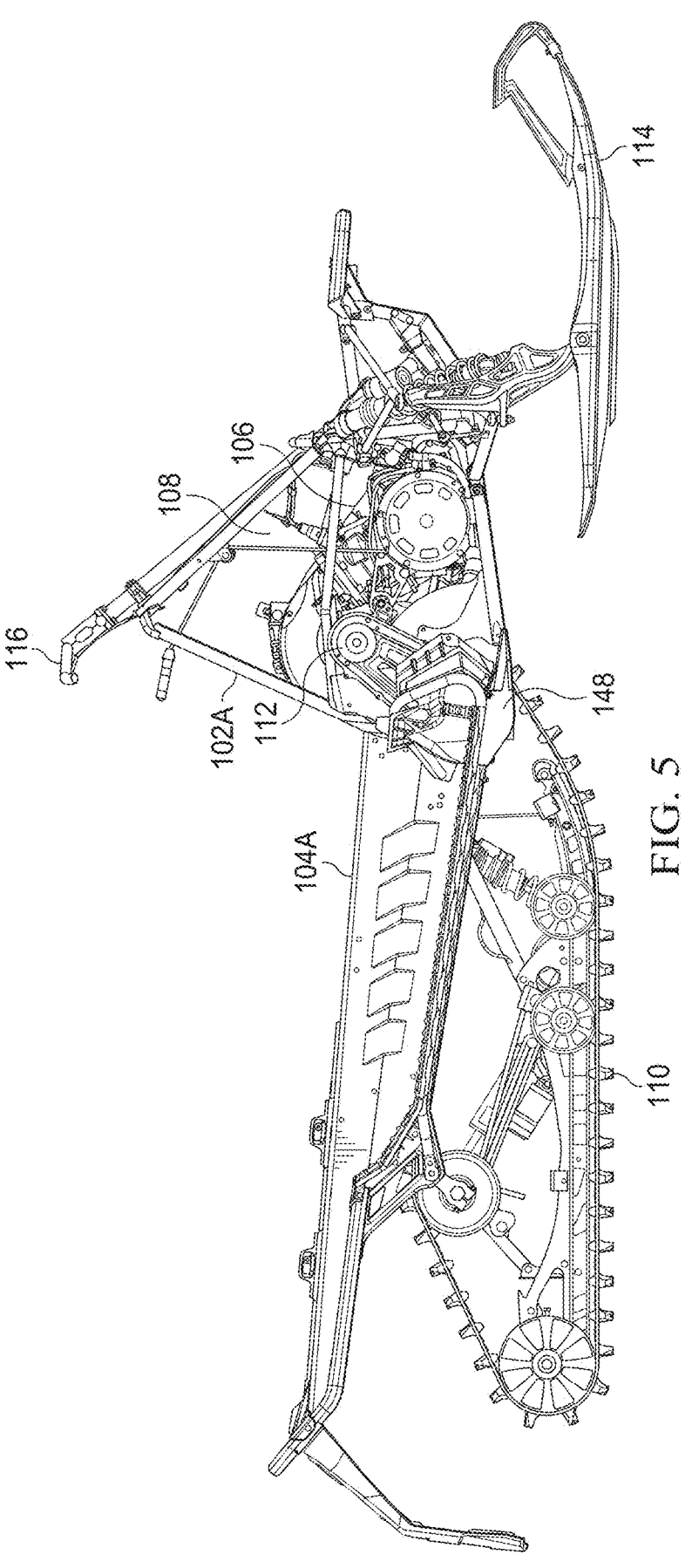
FIG. 5 illustrates a right side view of the snowmobile of FIG. 1 with portions of the engine cover removed, according to some embodiments.
Figure 6:
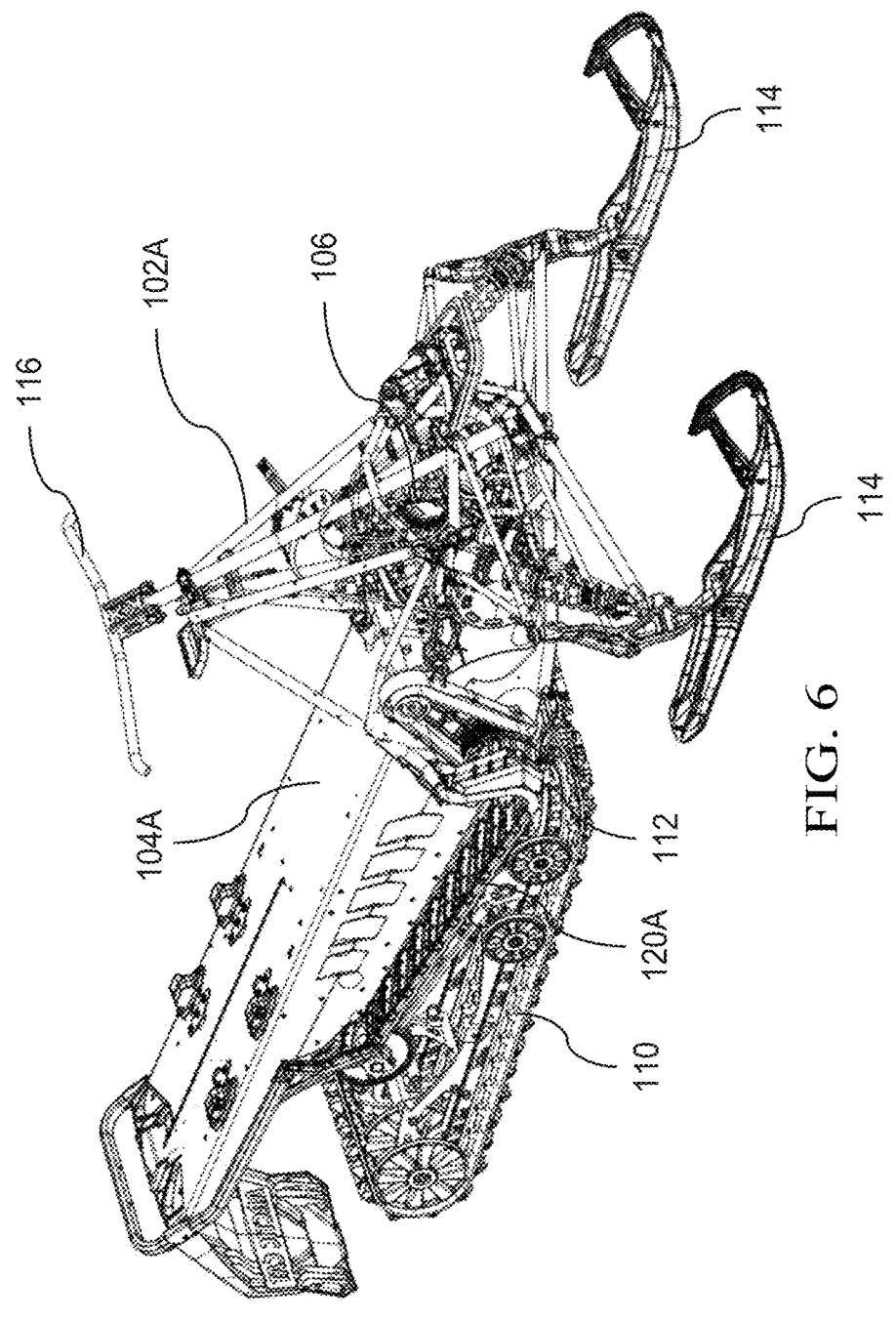
FIG. 6 illustrates a right side perspective view of the snowmobile of FIG. 1 with portions of the engine cover removed, according to some embodiments.
Figure 10:
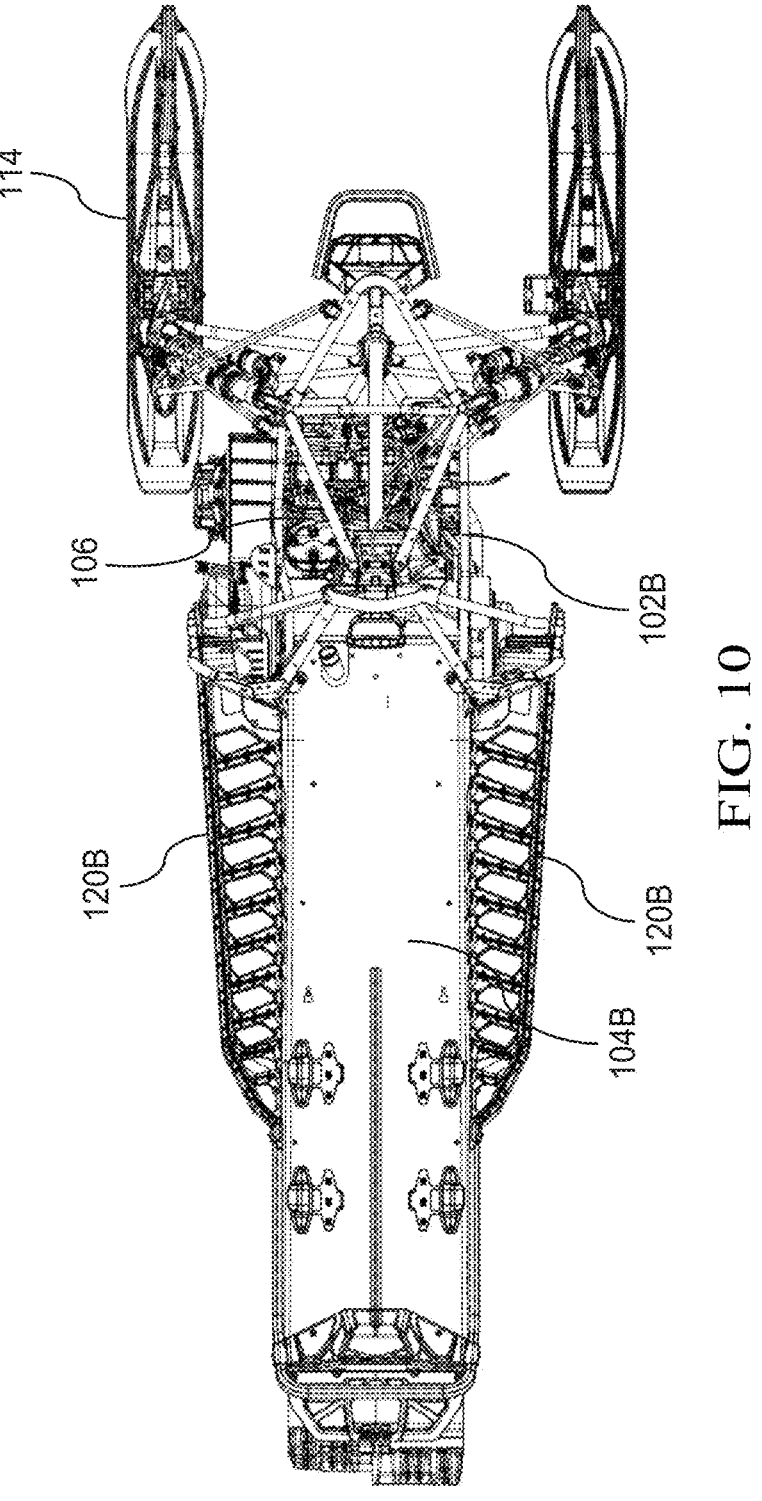
FIG. 10 illustrates a top view of the snowmobile of FIG. 10 with portions of the engine cover removed, according to some embodiments.
Figure 16:
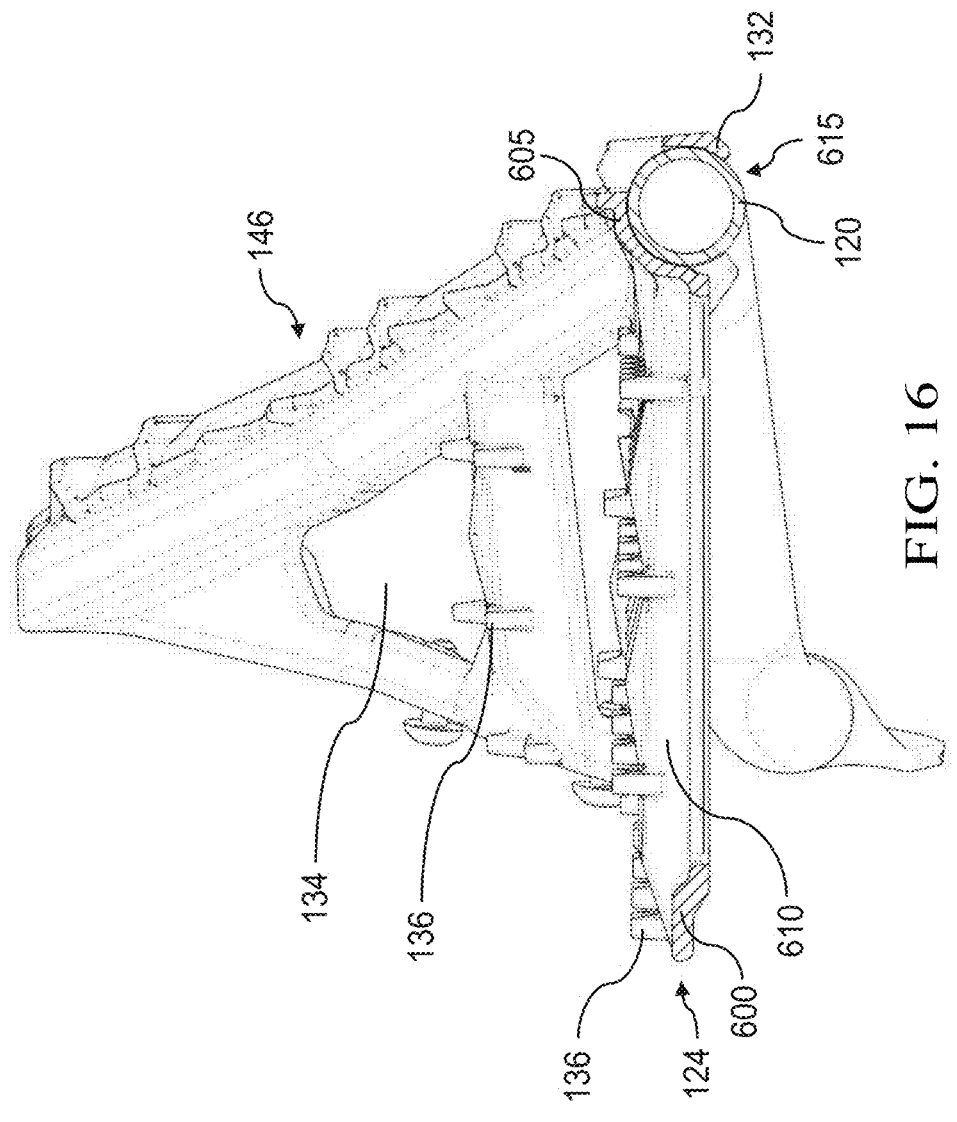
FIG. 16 illustrate a cross section view of the running board assembly from line 16-16 in FIG. 15B, according to some embodiments.
Figure 17A:
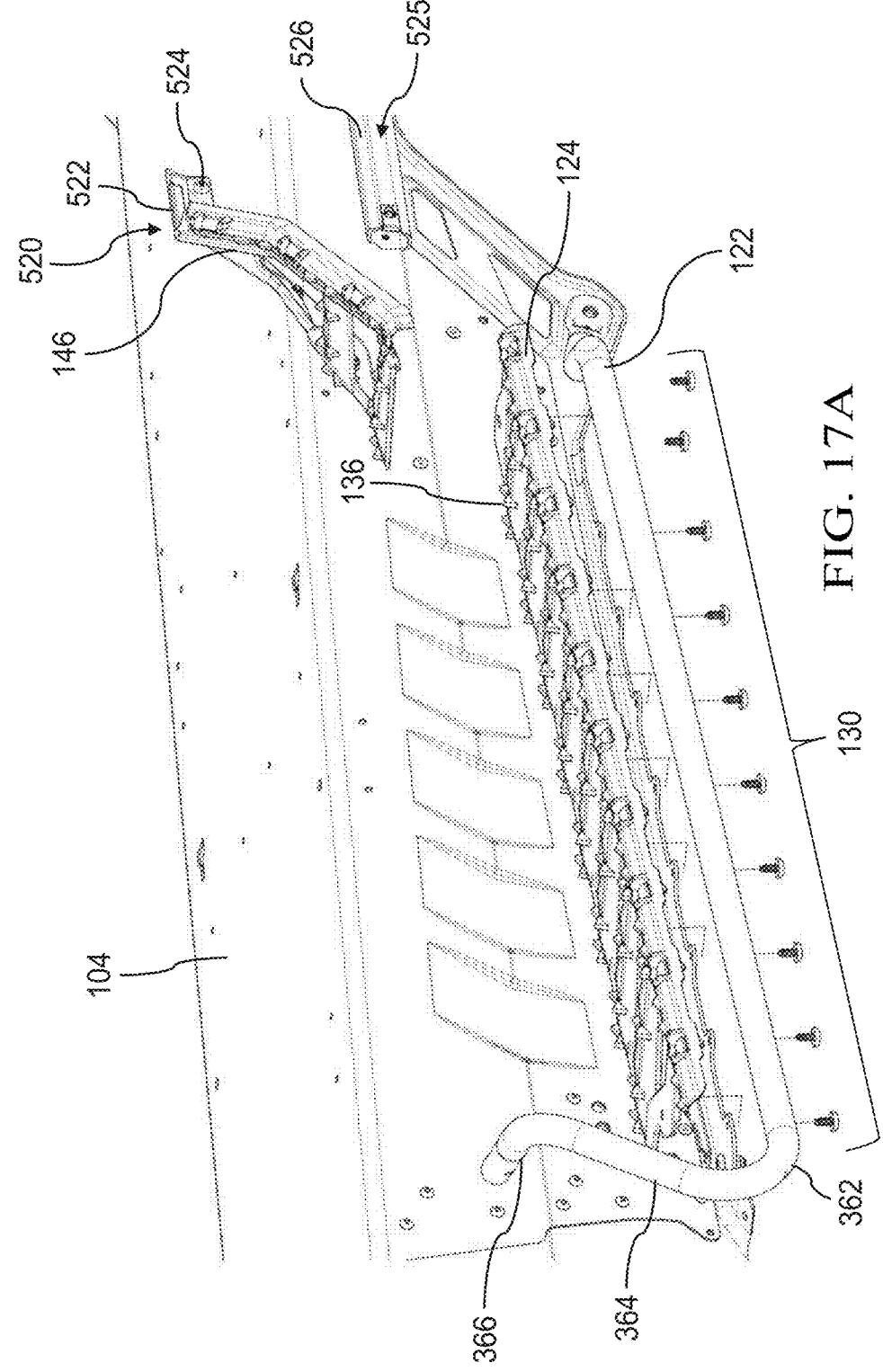
FIG. 17A illustrates an exploded side view of the running board assembly, according to some embodiments.
Figure 17B:
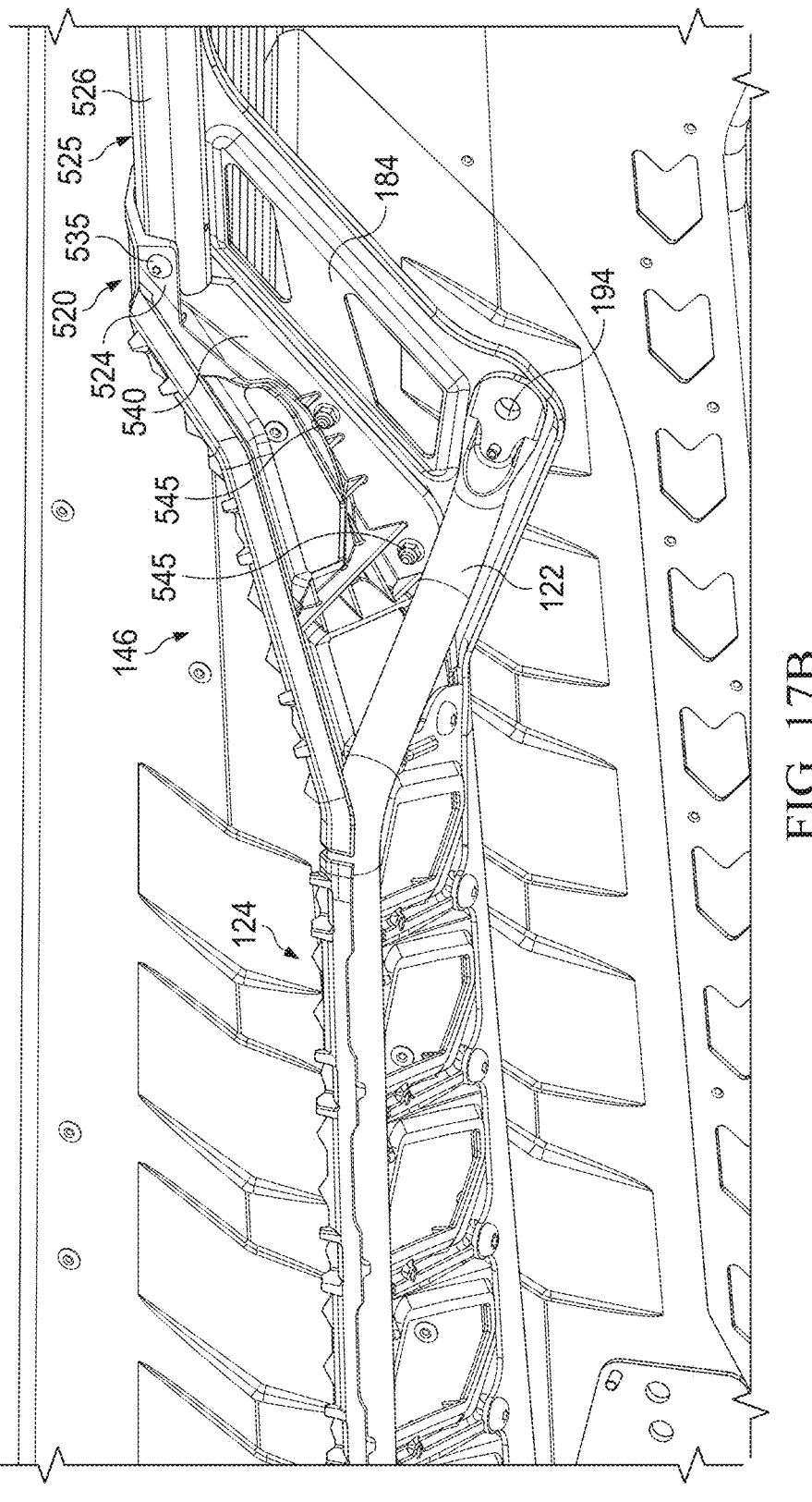
FIG. 17B illustrates an isometric side view of the rear kick up assembly, according to some embodiments.
Figure 18:
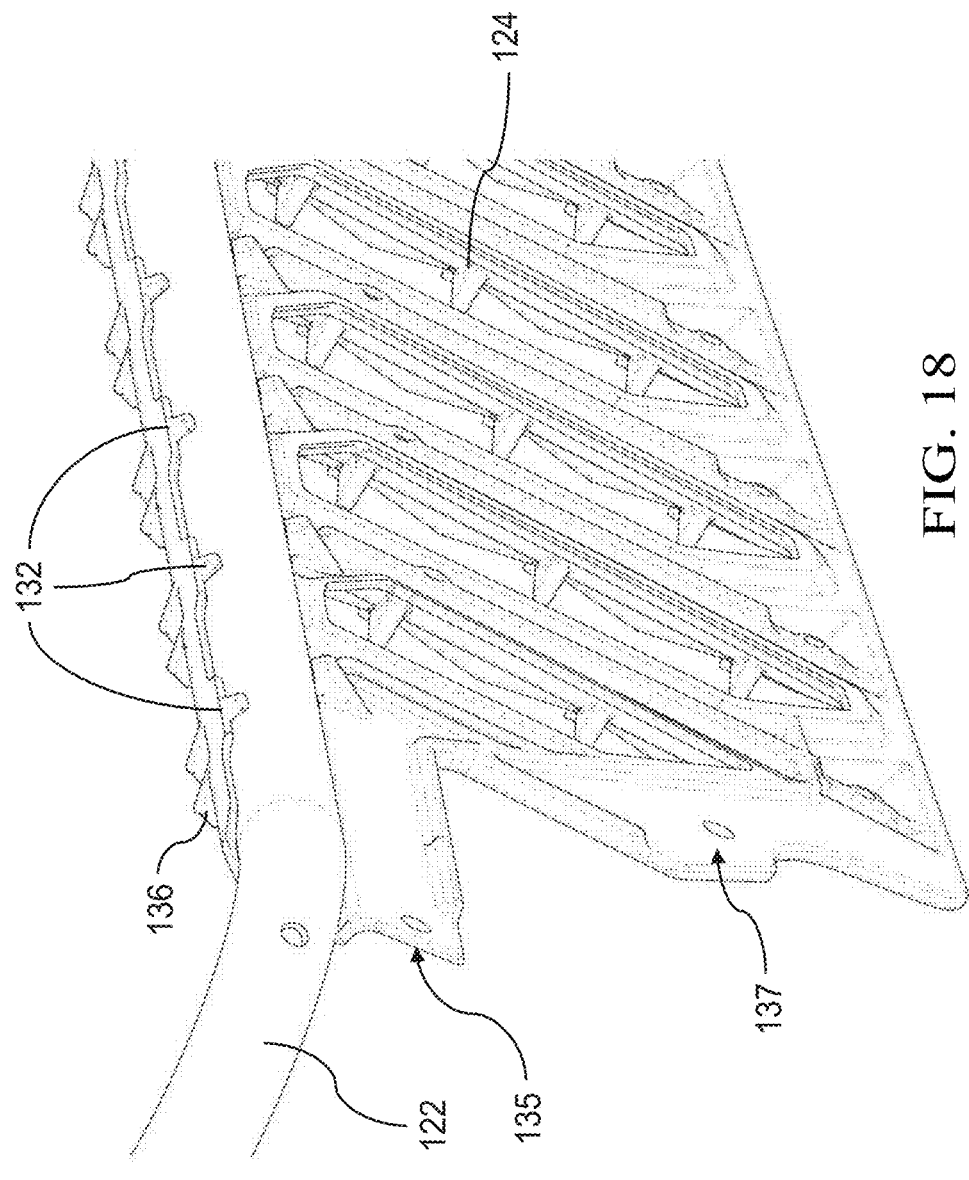
FIG. 18 illustrates a close up bottom view of the running board assembly, according to some embodiments.

As shown in FIGS. 15A, 21A-21B, and 23A-23B, the foot support member 124 includes a first rail 600, a second rail 605 that at least partially defines the channel 131, and plurality of cross members 610 extending between the first rail 600 and the second rail 605. The cross members 610 partially define a plurality of apertures 134 extending from the first rail 600 to the second rail 605. These apertures 134 are configured to shed snow or other debris through the cross members 610 of the foot support member 124 and may reduce the weight of the snowmobile and/or the material needed to form the foot support member 124. The foot support member 124 may define a plurality of ridges 136 that extending from a top surface 138 of the cross members and optionally along the first rail 600. At least some of the ridges 136 are located intermediate at least some of the apertures 134. The ridges 136 are configured to enhance traction of a rider's boot with the foot support member 124. As shown in FIG. 17, the ridges 136 may be notched or serrated to further enhance traction. As best shown in FIG. 16, the inclusion of a series of ridges 136 inboard of the cross members 610 along the first rail 600 provides additional surface area for boot traction when at least a portion of the forward end of the foot support member 124 is positioned further outboard from the tunnel 104 in a first configuration (running board assembly 120A) as shown in FIG. 3 than a second configuration (running board assembly 120B) as shown in FIG. 10. In an illustrative example, the running board assembly 120A may include a first support tube 122A (FIG. 58) and a first support bracket 184A (FIGS. 37A-B), and the running board assembly 120B may include a second support tube 122B (FIGS. 37C-D) that is different than the first support tube 122A, and a second support bracket 184B that is different than the first support bracket 184A. Although the support tubes 122A, 122B and the support brackets 184A, 184B are different, each are still compatible with and can be removable secured to the common foot support member 124. Accordingly, the same foot support member 124 can be used on different snowmobile configurations or models that arrange the foot support member 124 in a different configuration or position with respect to the tunnel 104. The series of ridges 136 positioned along the first rail 600 may have a base or a crown that is positioned lower than a corresponding base or crown of the ridges 136 on the cross members 610, and the base or crown of ridges 136 positioned along the second rail 605 be positioned higher than the corresponding base or crown of the ridges 136 on the cross members 610.

Figure 26:
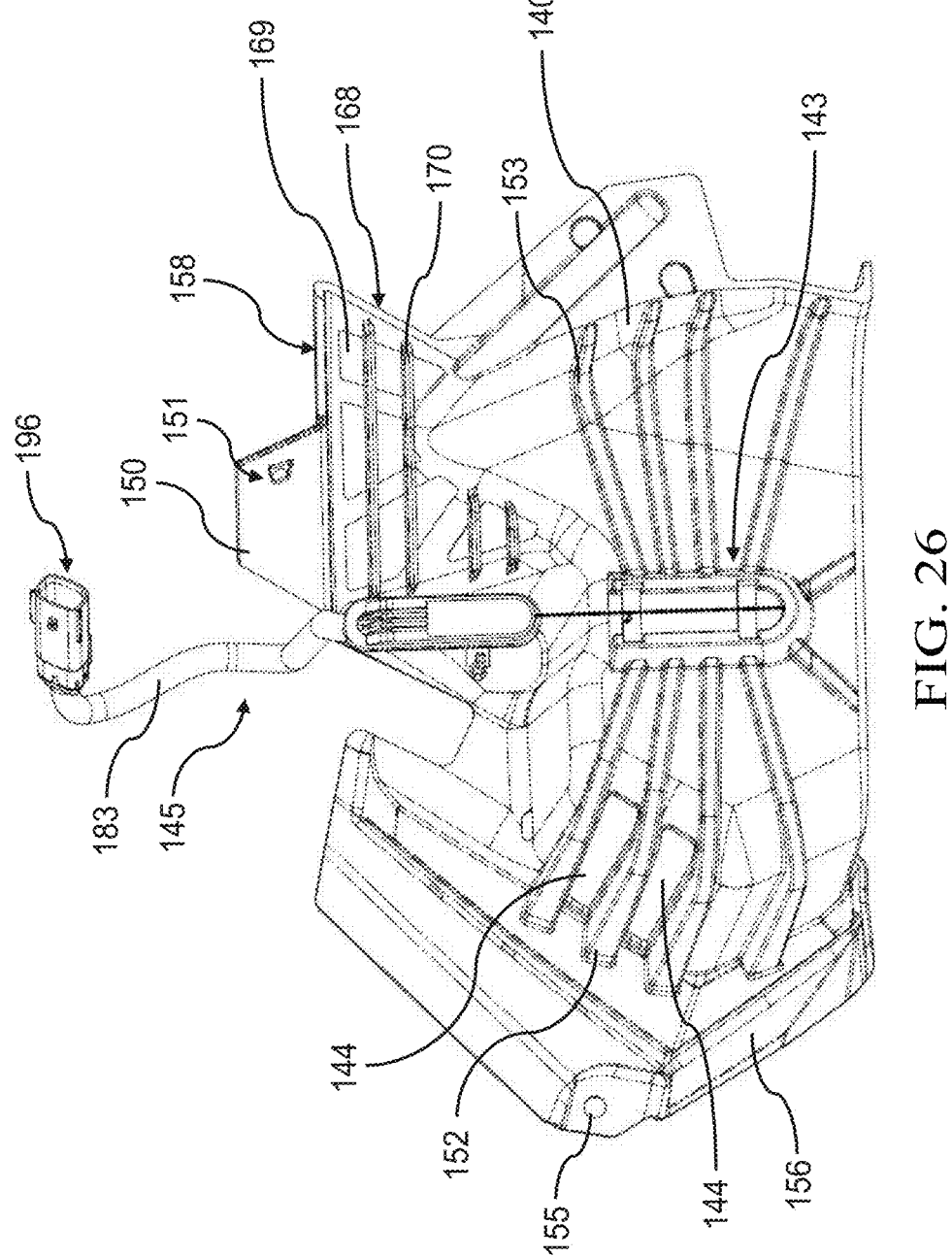
FIG. 26 illustrates an inboard view of a front toe stop of the running board assembly, according to some embodiments.

In an embodiment as shown in FIGS. 26-31, toe stops 140 are provided. In an illustrative example, the toe stops 140 may be removably securable to one or more of the foot support member 124, the forward frame assembly 312, and the tunnel 104 by screws or threaded fasteners 142. The toe stops 140 may be configured to receive at least a portion of the rider's boots. The front toe stops 140 are positionable at the front end of the running board assembly 120 and may be at least partially disposed within or positioned adjacent to a front cowl or body panel 400 of the snowmobile forming the engine bay 108. As shown in FIG. 26, the front toe stops 140 define a plurality of openings 144 that are in fluid communication with the engine bay 108 and are configured to exhaust air warmed by the engine 106 from inside the engine bay 108. These openings 144 may transfer heat from inside the engine bay 108 and direct it toward the toe pocket 222. The front toe stops 140 may include one or more features to receive and optionally secure the support member 122 thereto. The support member 122 may define a substantially U-shaped configuration along the outboard side 127 of the foot support member 124 with an open end facing rearwardly to accommodate the transition between the toe stops 140 and the foot support member 124. The front toe stops 140 may comprise a polymeric composite material, optionally the same material used to form the foot support member 124. For example, the toe stop 140 may comprise a composite including one or more of the above-described polymers and one or more types of reinforcements including, but not limited to, glass and/or carbon fibers, e.g., 30 wt % glass filled polyamide. In a non-limiting example, the fiber % by weight of the composite material may range from 10 wt % to 50 wt %, and may optionally be in the range of 20 wt % to 60 wt %, or optionally in the range of 45 wt % to 55 wt %. In some embodiments, the toe stop 140 includes polymeric material including, but not limited to, Nylon 6/6, Polyetheretherketone (PEEK), Polypropylene (PP), or Polyphthalamide (PPA) as a matrix material with glass, carbon, or ratio of both carbon and fiber material for fiber fill varying in percent volume from 10%-50%, optionally from 40%-60%, and in some embodiments, from 45%-55%.

Figure 33:
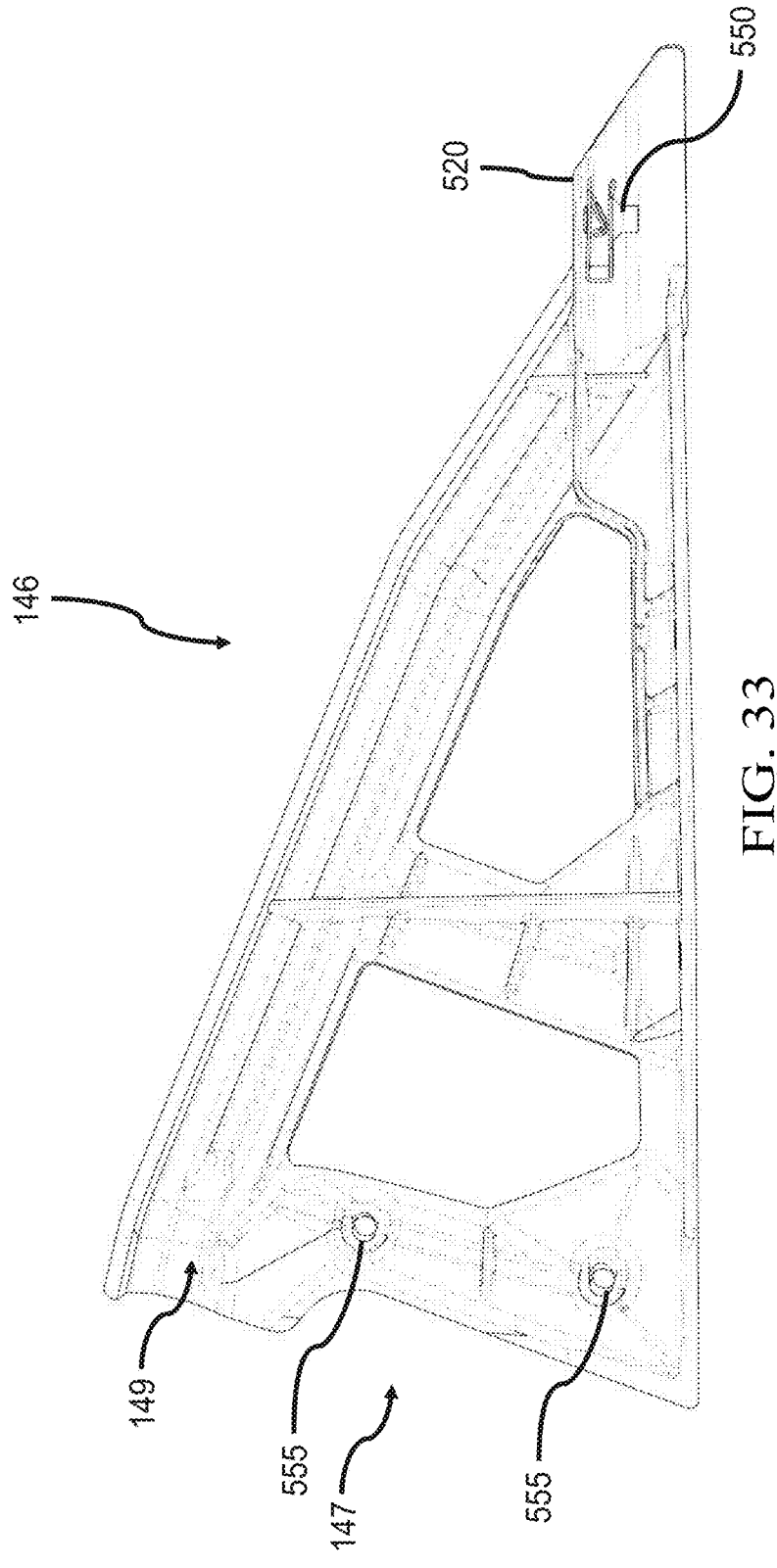
FIG. 33 illustrates a bottom view of the rear kick-up panel of the running board assembly, according to some embodiments.
Figure 34B:
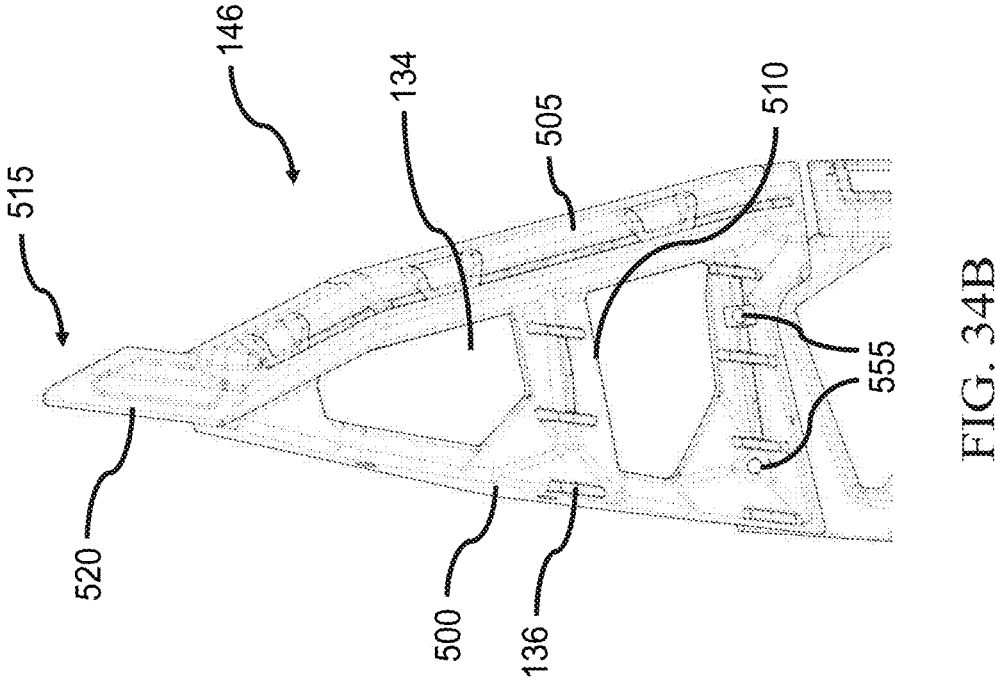
FIG. 34B illustrates a top view of the foot support member and the rear kick-up panel of the running board assembly of FIG. 34A, according to some embodiments.
Figure 34A:
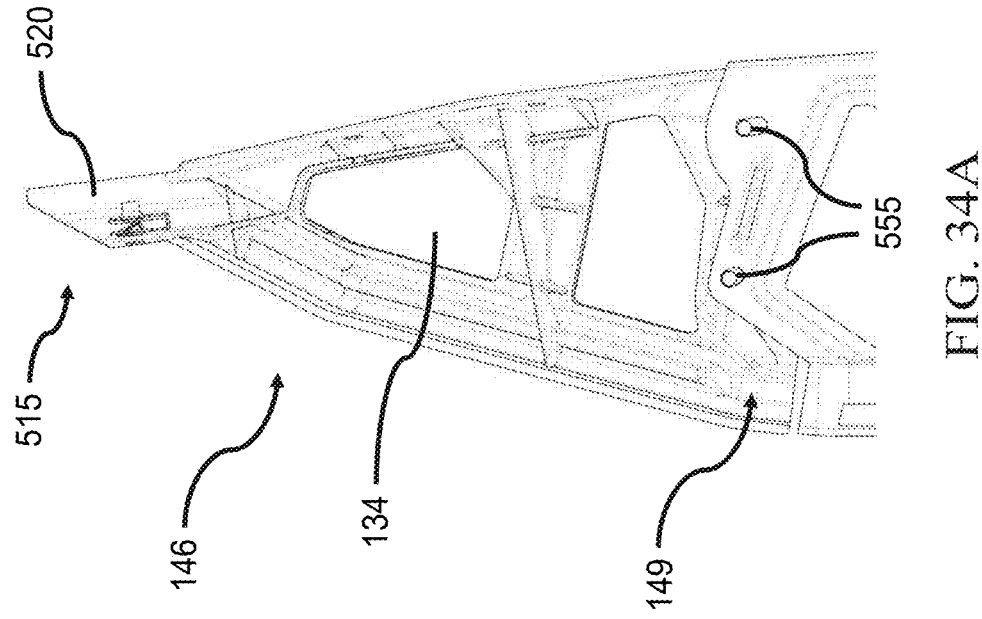
FIG. 34A illustrates a bottom view of the foot support member and the rear kick-up panel of the running board assembly in a first position associated with the first snowmobile of FIG. 1, according to some embodiments.
Figure 35B:
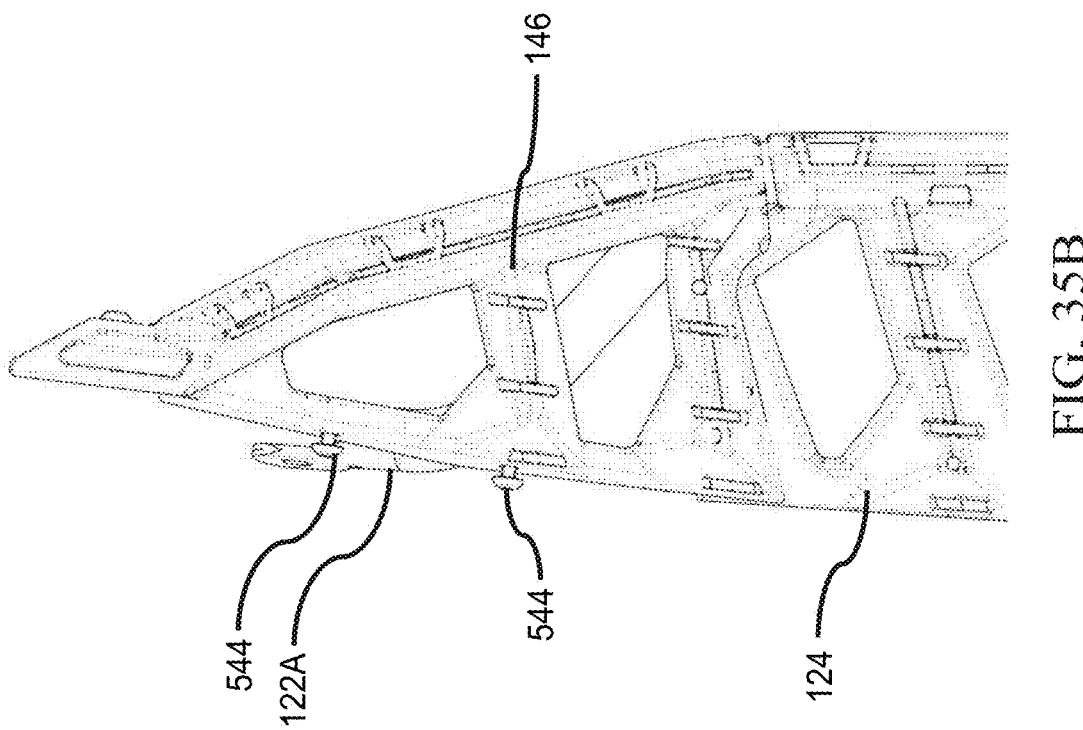
FIG. 35B illustrates a top view of the assembly of FIG. 35A, according to some embodiments.
Figure 35A:
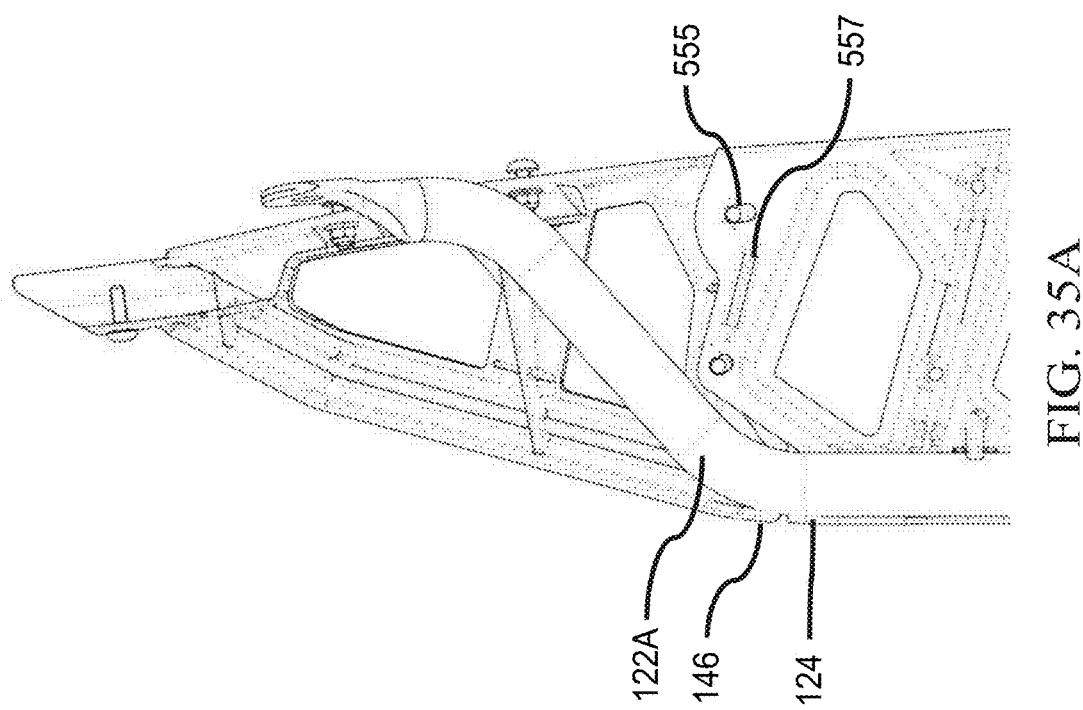
FIG. 35A illustrates a bottom view of the foot support member, the support member, and the rear kick-up panel of the running board assembly in a first position associated with the first snowmobile of FIG. 1, according to some embodiments.
Figure 35C:
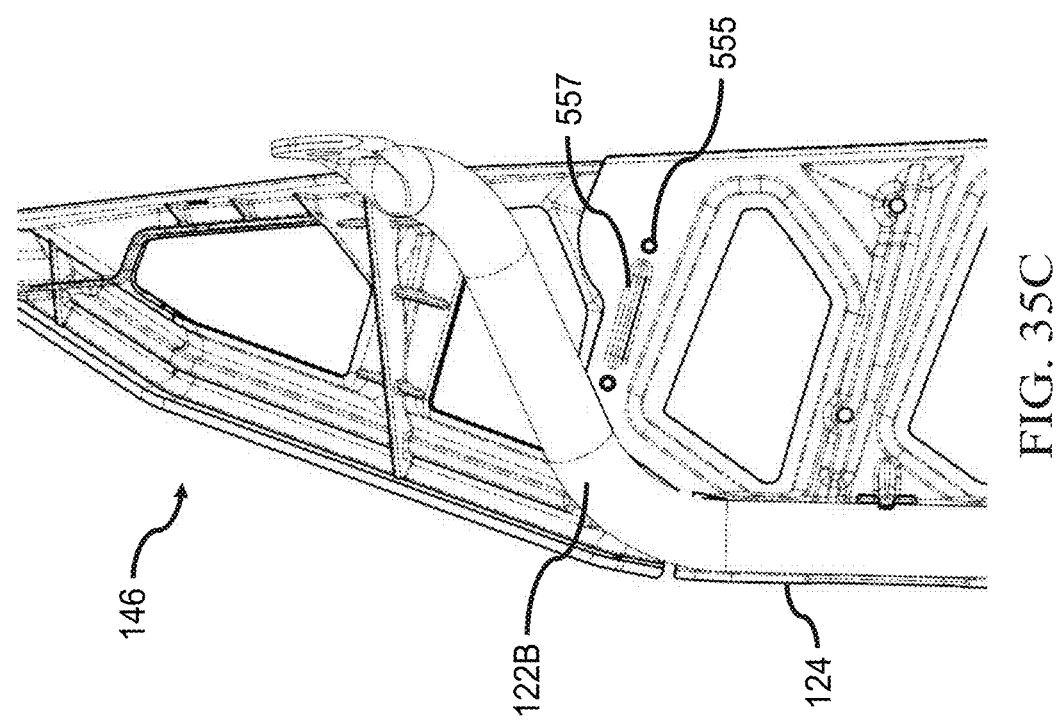
FIG. 35C illustrates a bottom view of a foot support member in a second position associated with the second snowmobile of FIG. 8, according to some embodiments.
Figure 36:
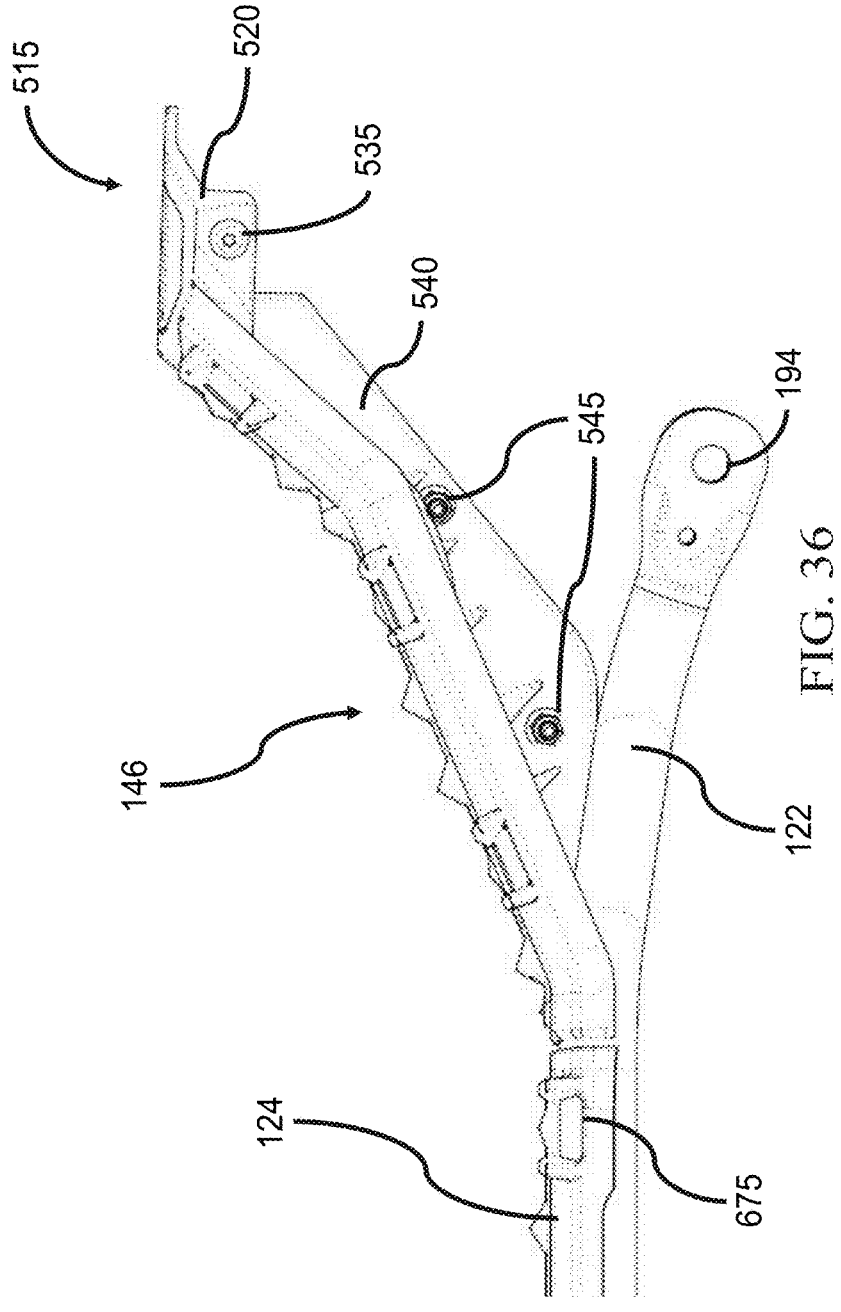
FIG. 36 illustrates a side view of the foot support member, the support member, and the rear kick-up panel of the running board assembly, according to some embodiments.
Figure 44:
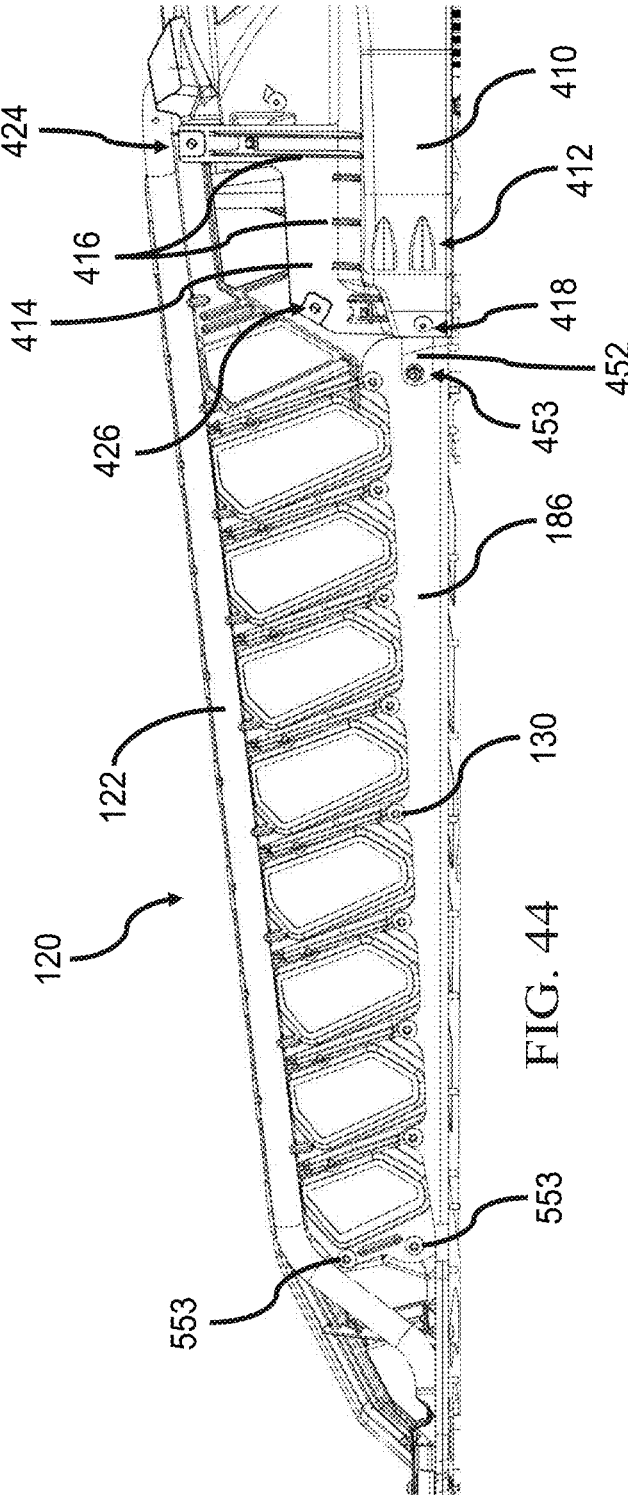
FIG. 44 illustrates a bottom view of the foot support member, the support member, and the rear kick-up panel of the running board assembly installed on the snowmobile in a first position associated with the first snowmobile of FIG. 1, according to some embodiments.

In an embodiment as shown in FIGS. 32-37, a rear kick-up panel 146 is provided. In an illustrative example, the rear kick-up panel 146 extends from the foot support member 122 along a transition length 105 of the tunnel 104 to a part of the bumper assembly, such as an arm 525. In addition to, or alternatively, the rear kick-up panel 146 is supported by the support member 122 on the forward outboard end of the rear kick-up panel 146. The rear kick-up panel 146 may be removably secured to one or more of the rearward end of the foot support member 124, the support bracket 184, the rear bumper 530, and the side panel 182 of the tunnel 104. In a non-limiting example, the rear kick-up panel 146 includes a first rail 500, a second rail 505, and one or more cross members 510 extending between the first rail 500 and the second rail 505. The forward end 147 of the rear kick-up panel 146 may overlap a rearward end of the foot support member 124, and the rear kick-up panel 146 may define one or more apertures 555 that may receive a fastener (e.g., fastener 553 in FIG. 44) to maintain positioning of the foot support member 124 and the rear kick-up panels 146. In an illustrative example as shown in FIGS. 35A and 35C, the foot support member 124 may define one or more slots 557 that are alignable with the apertures 555 in the rear kick-up panel 146. Although the position of the rear kick-up panel 146 may be fixed with respect to the tunnel 104, the slots allow the foot support member 124 to be fastened to the rear kick-up panel 146 in either of the running board assembly positions 120A or 120B. As shown in FIG. 35A, the apertures 555 are located near a rearward end of the slots when in the running board assembly 120A configuration is desired. As shown in FIG. 35C, the apertures are located near a forward end of the slots when the running board assembly 120B configuration is desired. As shown in FIG. 44, a self-tapping (and removable) fastener may be inserted from the bottom of the foot support member 124 through the slot and into the apertures 555 to secure the foot support member 124 to the rear kick-up panel 146. Accordingly, the slots allow for the same foot support member 124 and the same kick-up panel 146 to be used on both running board assembly 120A-B configurations, thereby reducing ineffi-ciencies associated with the production of different compo-nents specific to a particular configuration. Although the slots are included on the foot support member 124 and the apertures 555 are included on the rear kick-up panels 146, it is to be understood that the rear kick-up panels 146 could include the slots and the foot support member 124 could include the apertures 555. It is also to be understood that the present disclosure is not limited to a slot and aperture system for allowing the foot support member 124 to be selectively positioned in different configurations with respect to the tunnel 104 and/or the rear kick-up panel 146. As shown in FIGS. 33 and 36, the second rail 505 may define a channel 149 at the forward end 147 that is positioned adjacent the foot support member 124 and is shaped to receive a portion of the support member 122 therein. The first rail 500 and the second rail 505 may extend from the forward end 147 and converge at a rearward end 515 to define a member 520 extending therefrom. As shown in FIG. 17, the member 520 is removably securable to, for example, the side panel 182 of the tunnel 104 and/or an arm 525 extending from the rear bumper 530. In a non-limiting example, the arm 525 may be a hollow member. The member 520 may an upper wall 522 that is positionable on top of an upper surface of the arm 525 to support the rear kick-up panel 146 thereon. An outboard wall 524 of the member 520 overlaps an outboard wall 526 of the arm 525 and defines an aperture for receiving a threaded fastener 535 therethrough. The threaded fastener 535 may be inserted through coaxially aligned apertures on the member 520 and the arm 525 to removably secure the kick-up panel 146 to the rear bumper 530 with, for example, a clip nut 550 positioned on an underside of the member 520 and the arm 525 when installed thereon. The member 520 is optionally removably secured to the side panel 182. As shown in FIG. 36, a flange 540 extends downward from the first rail 500 and is positioned adjacent an edge of a transitional length of the side panel 182 of the tunnel 104, and is removably secured thereto with threaded fasteners 544 inserted from the inner surface of the side panel 182 through apertures 227, that optionally also extend through the body 185 of the support bracket 184 through apertures 188 (as shown in FIGS. 37B and 37D), and outward through the flange 540 and removably secured with nuts 545. The rear kick-up panels 146 may comprise a polymeric compos-ite material, optionally the same material used to form the foot support member 124. The rear kick-up panels 146 may also define apertures 134 and ridges 136 similar to those of the foot support member 124 as t shown in FIGS. 34A and 34B.

Figure 13:
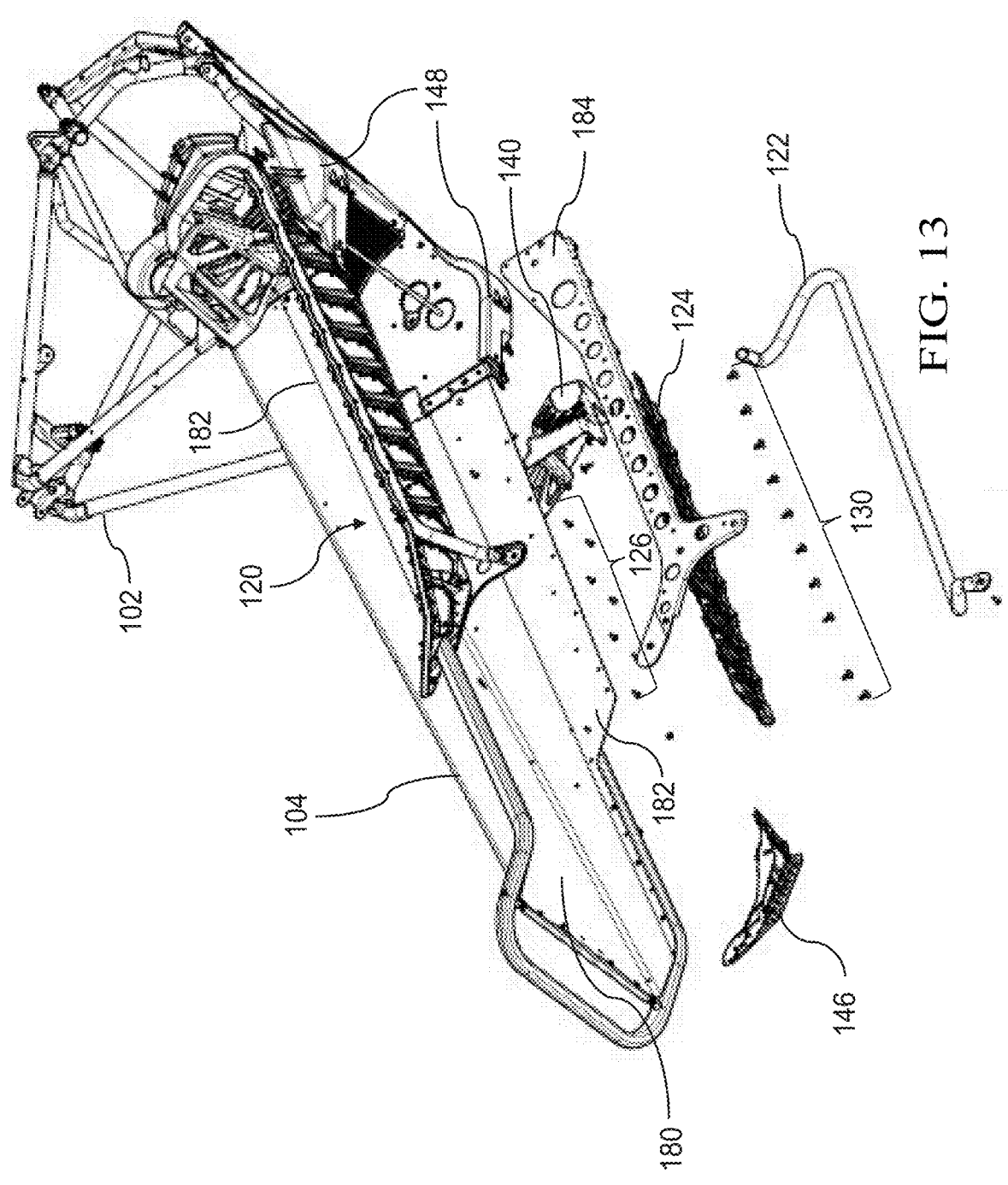
FIG. 13 illustrates an exploded bottom view of the running board assembly of FIG. 11, according to some embodiments.
Figure 14:
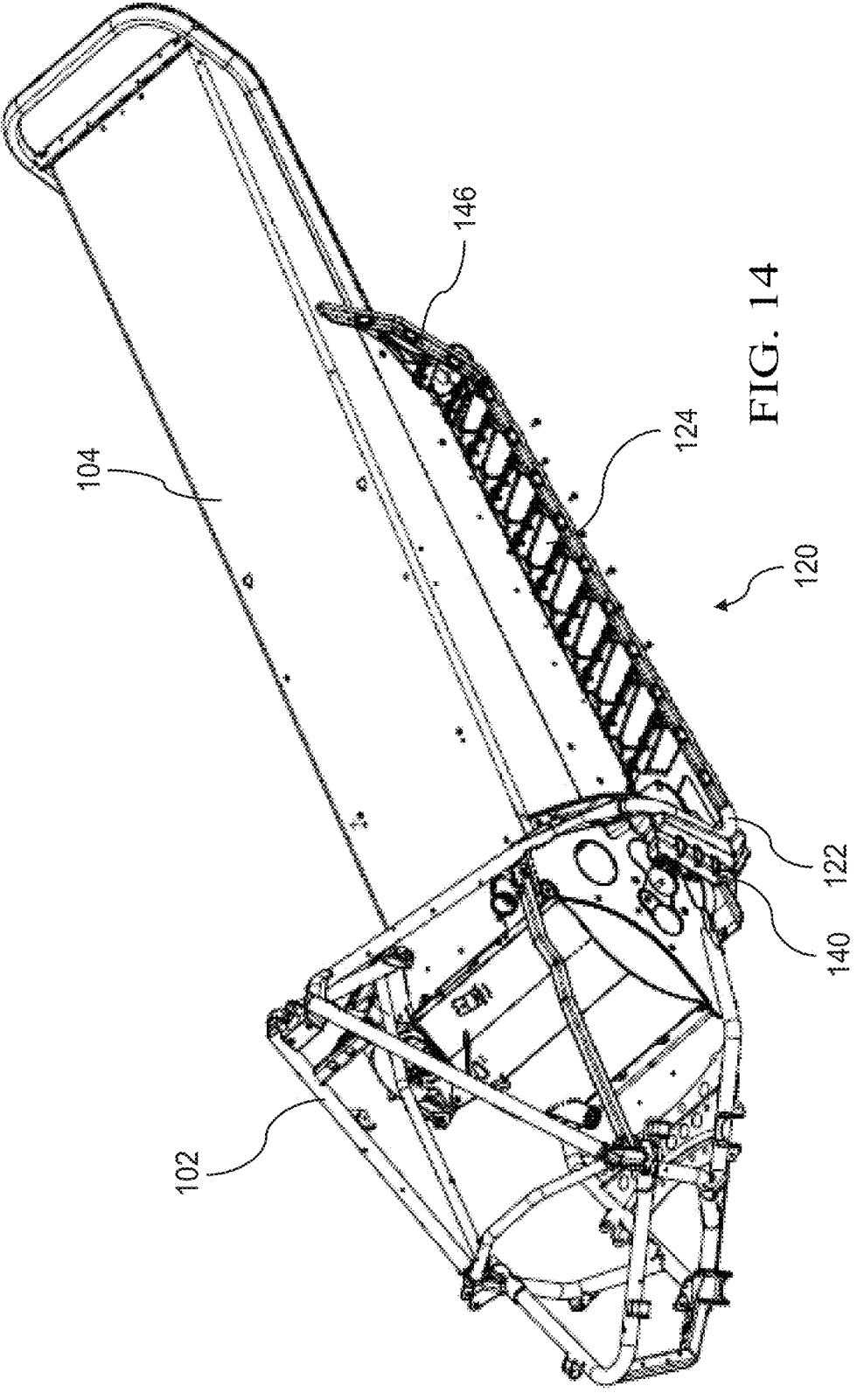
FIG. 14 illustrates an alternative perspective top view of the snowmobile chassis having the running board assembly attached to the tunnel, according to some embodiments.
Figure 27A:
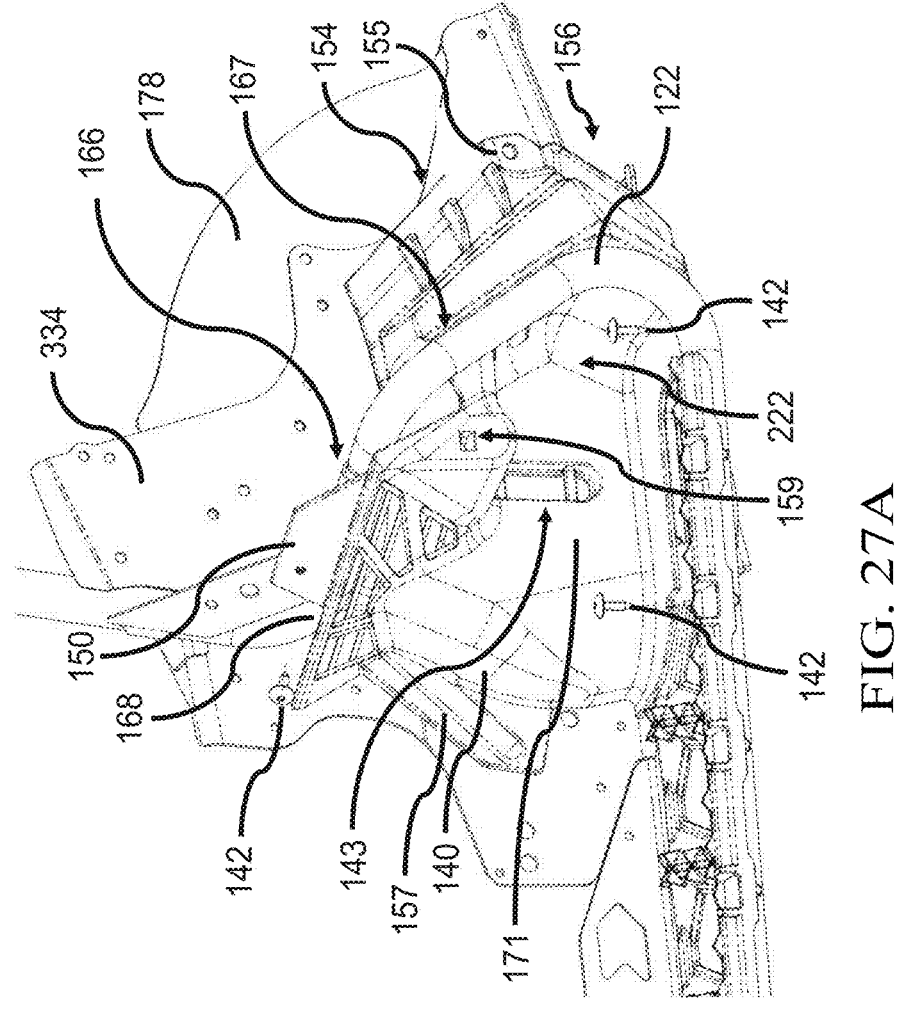
FIG. 27A illustrates a top perspective view of the front toe stop, the foot support member, and the support member of the running board assembly, with the tunnel and a portion of the forward frame assembly not shown for illustrative purposes, according to some embodiments.
Figure 27B:
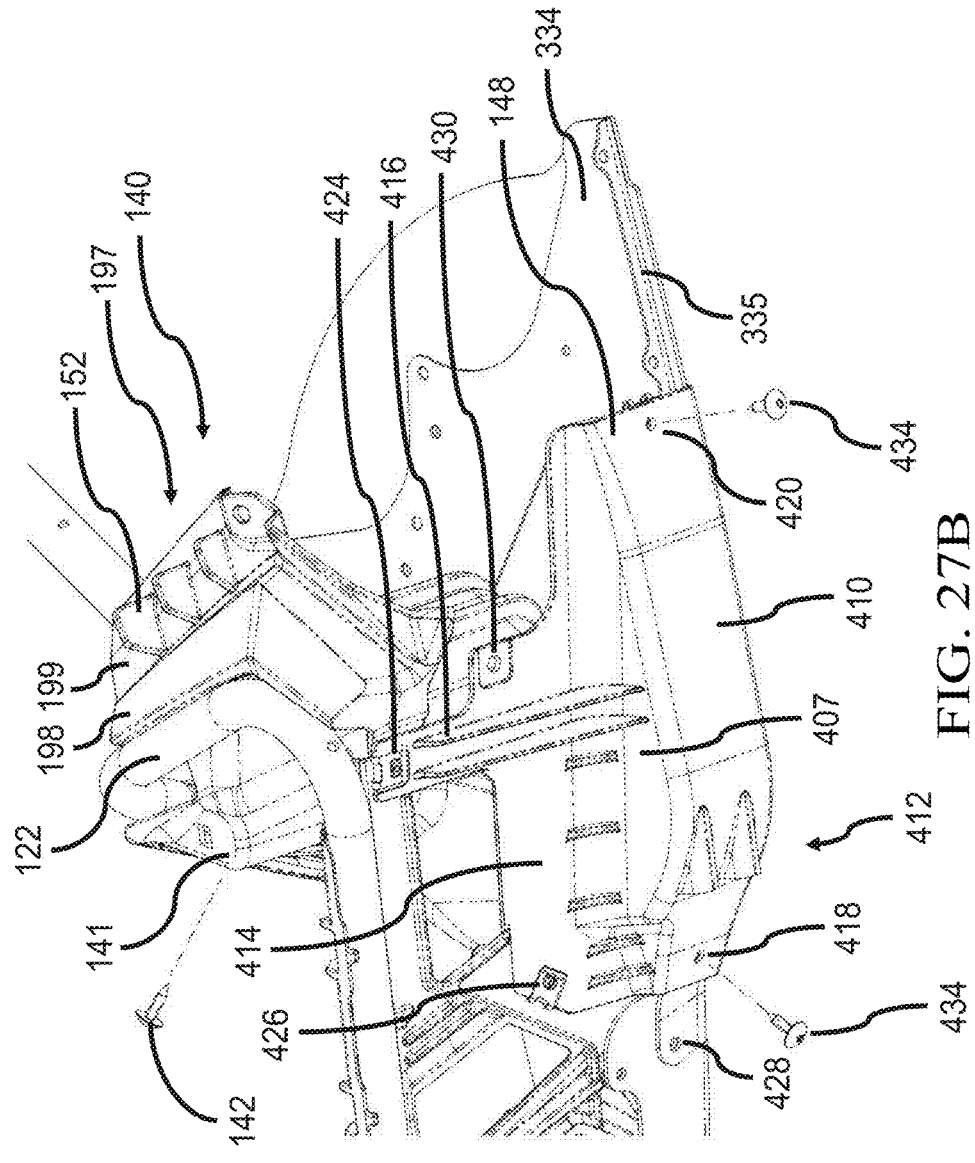
FIG. 27B illustrates a bottom perspective view of the front toe stop, the foot support member, and the support member of the running board assembly, with the tunnel and a portion of the forward frame assembly not shown for illustrative purposes, according to some embodiments.
Figure 30:
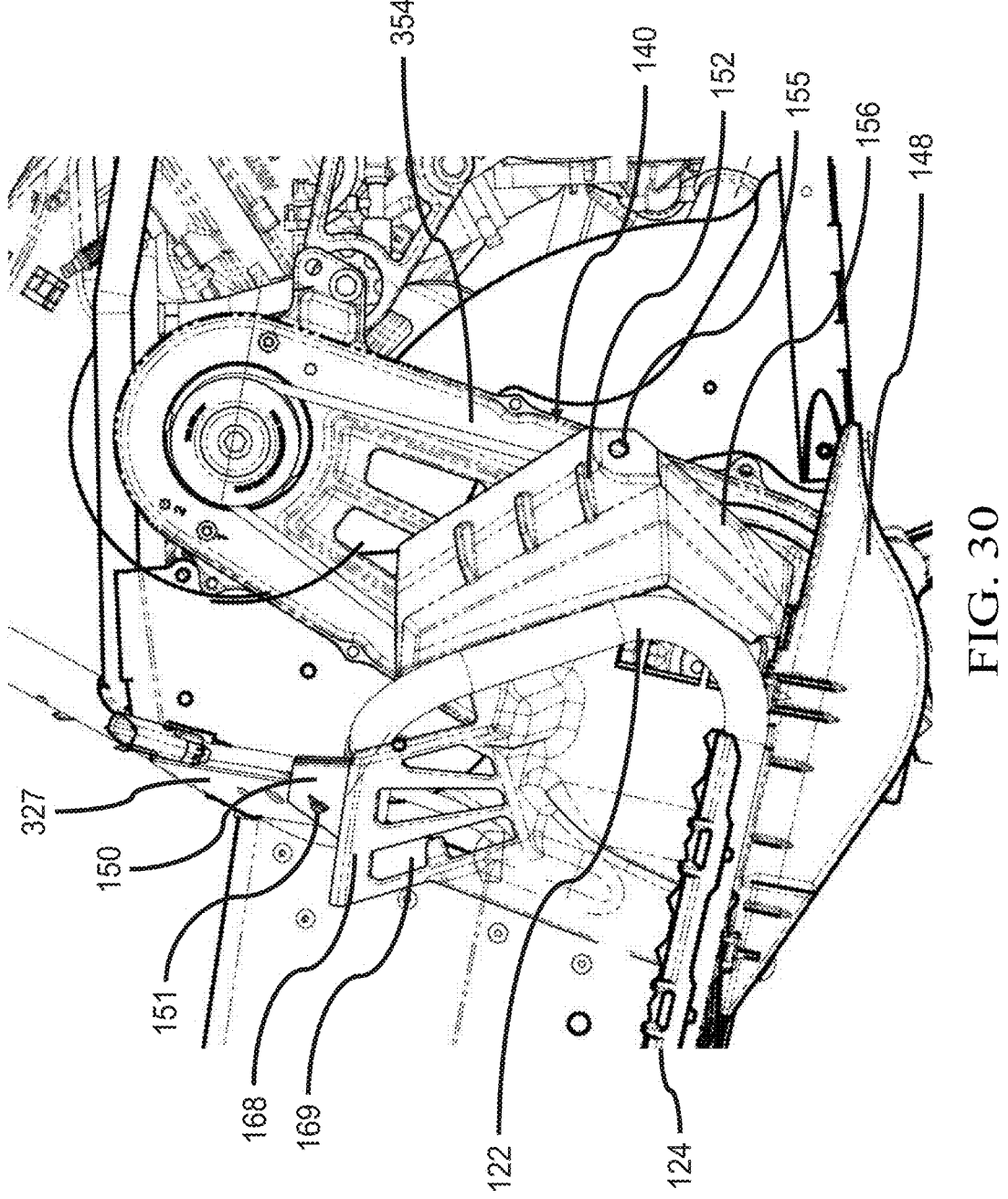
FIG. 30 illustrates a side view of the assembly of FIG. 29, according to some embodiments.
Figure 31:
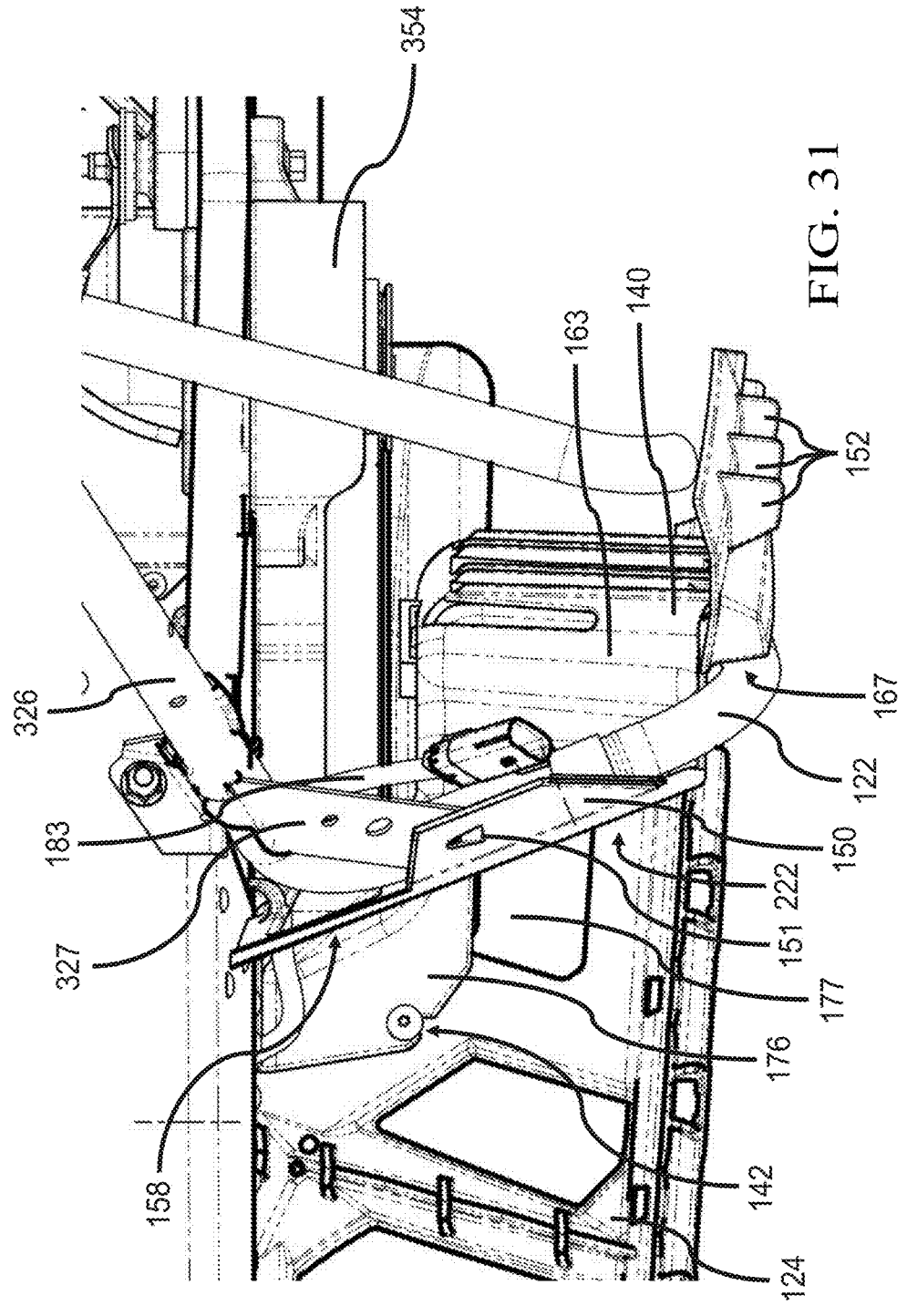
FIG. 31 illustrates a top view of the assembly of FIG. 29, according to some embodiments.
Figure 32:
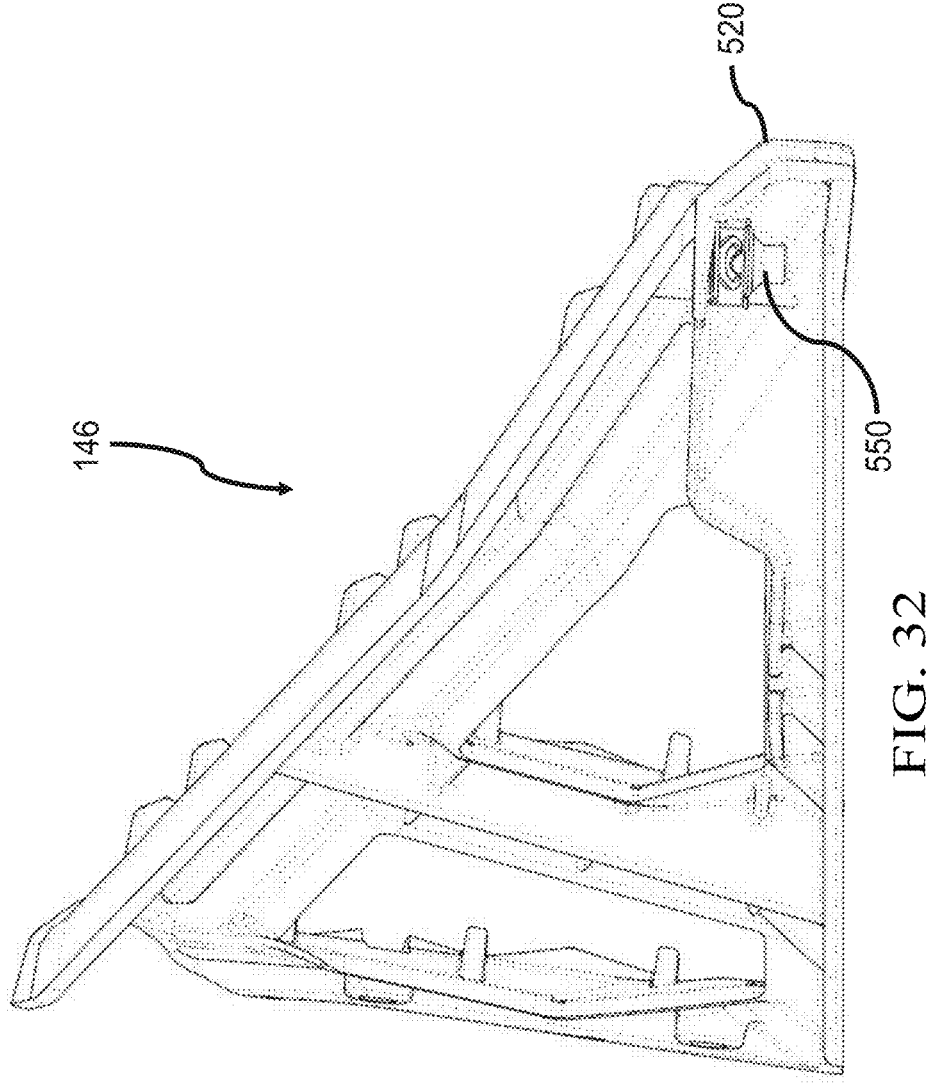
FIG. 32 illustrates a rear view of the rear kick-up panel of the running board assembly, according to some embodiments.

In an embodiment, bottom-out protectors 148 may be provided. In an illustrative example as shown in FIGS. 13, 27B, and 30, the bottom-out protectors may project from a portion of the chassis 102 and are configured to inhibit the transmission of forces directly to the chassis 102. The bottom-out protectors 148 are positioned on the chassis 102 in a location lower than the foot support member 124. In a non-limiting example, the bottom-out protectors 148 are positioned at least partially outboard of the tunnel 104, and at least partially inboard of the support member 122 of the running board assembly. The bottom-out protectors 148 may be positioned to contact a ground-based obstacle before another part of the chassis 102. The bottom-out protectors

148 are formed from a resilient material, such as, for example, an unfilled thermoplastic olefin material. In some embodiments, the bottom-out protector 148 may be formed of a fiber reinforced polymer material including one or more of the above-described polymers and one or more types of reinforcements including, but not limited to, glass and/or carbon fibers, e.g., 30 wt % glass filled polyamide. In a non-limiting example, the fiber % by weight of the com-posite material may range from 20 wt % to 60 wt %, and may optionally be in the range of 20 wt % to 40 wt %, or optionally in the range of 25 wt % to 35 wt %. In some embodiments, the bottom-out protector 148 includes poly-meric material including, but not limited to, Nylon 6/6, Polyetheretherketone (PEEK), Polypropylene (PP), or Polyphthalamide (PPA) as a matrix material with glass, carbon, or ratio of both carbon and fiber material for fiber fill varying in percent volume from 10%-50%, optionally from 40%-60%, and in some embodiments, from 45%-55%.

Figure 37A:
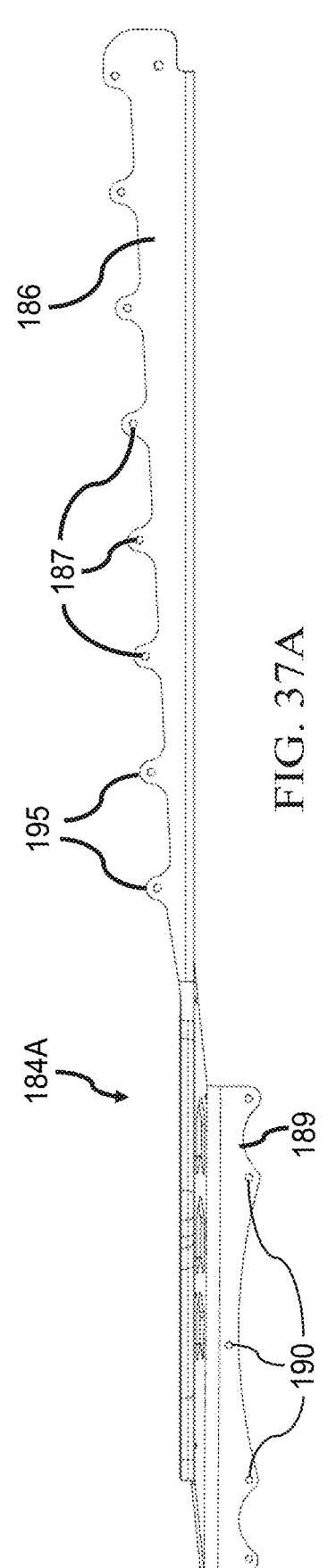
FIG. 37A illustrates a top view of a support bracket for the running board assembly associated with the first snowmobile of FIG. 1, according to some embodiments.
Figure 37B:
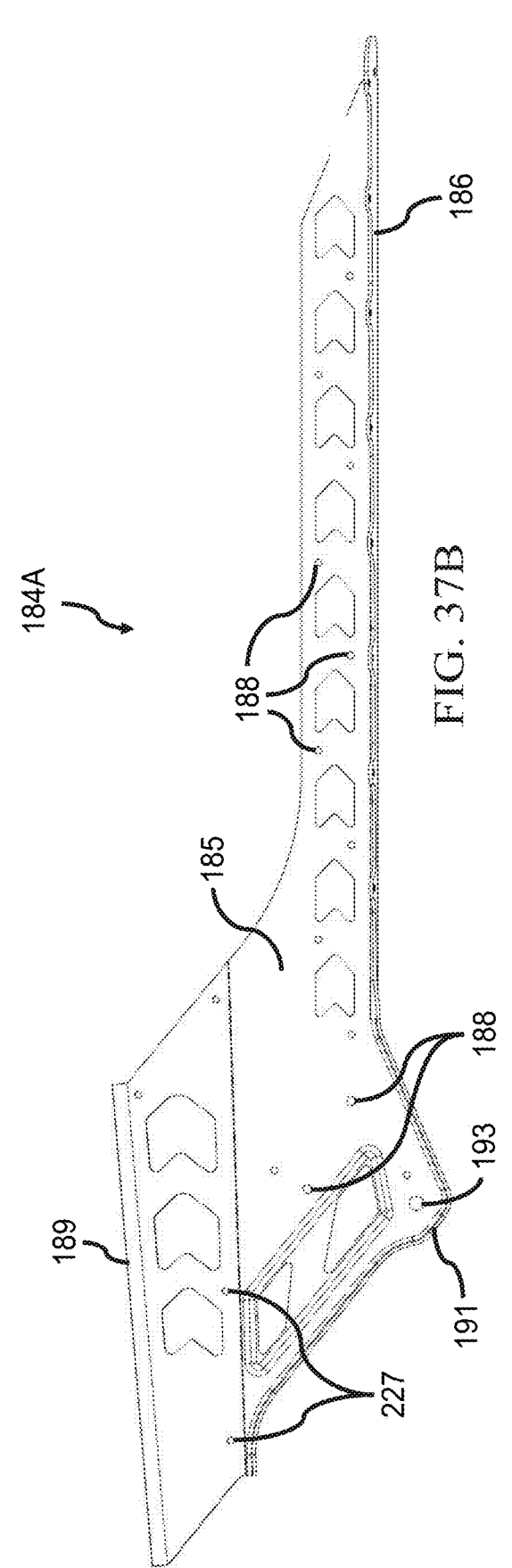
FIG. 37B illustrates a side view of the support bracket of FIG. 37A, according to some embodiments.
Figure 40A:
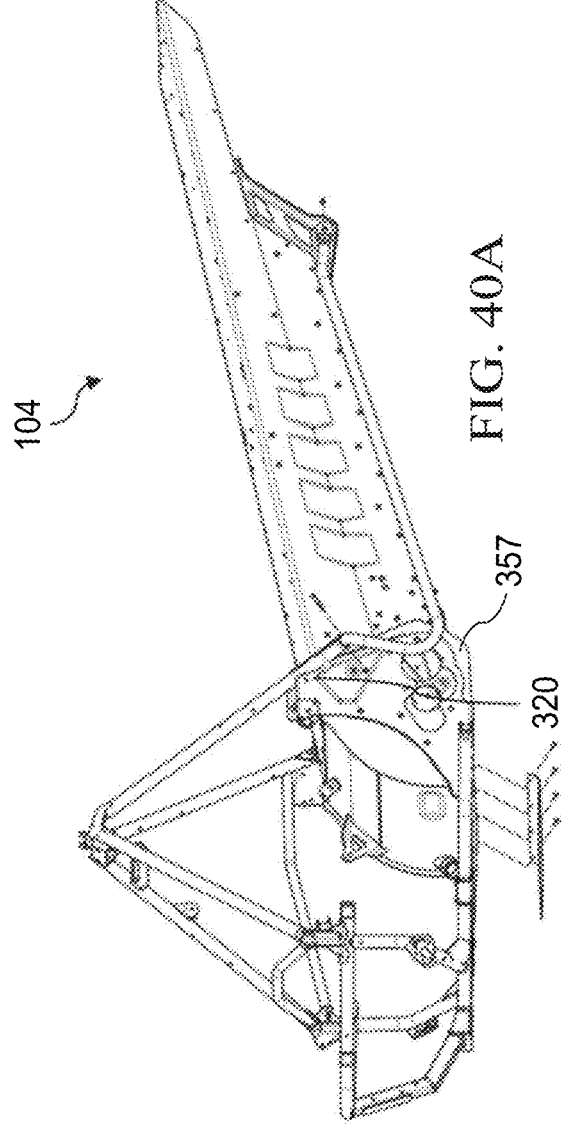
FIG. 40A illustrates a perspective view of a snowmobile including a forward frame assembly, a heat exchanger assembly, and a tunnel, according to some embodiments.
Figure 40B:
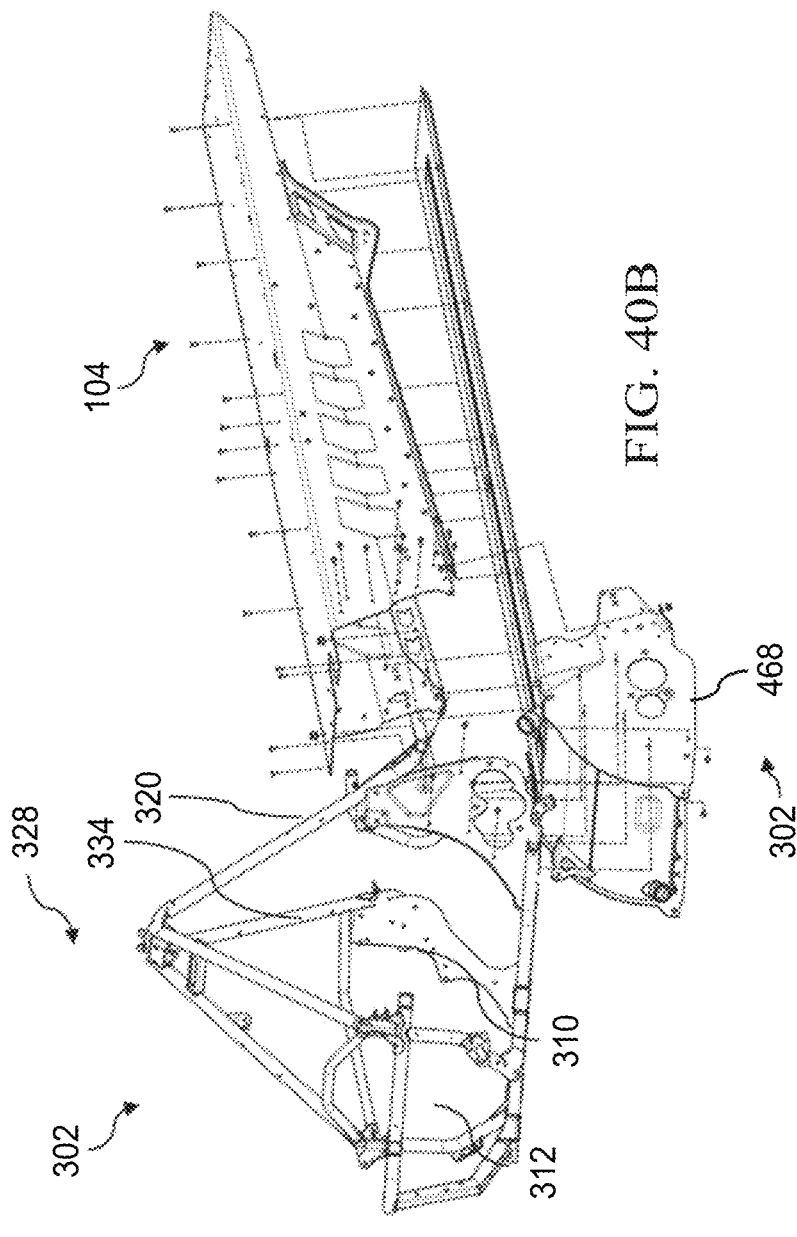
FIG. 40B illustrates an exploded view of the snowmobile of FIG. 40A, according to some embodiments.
Figure 40C:
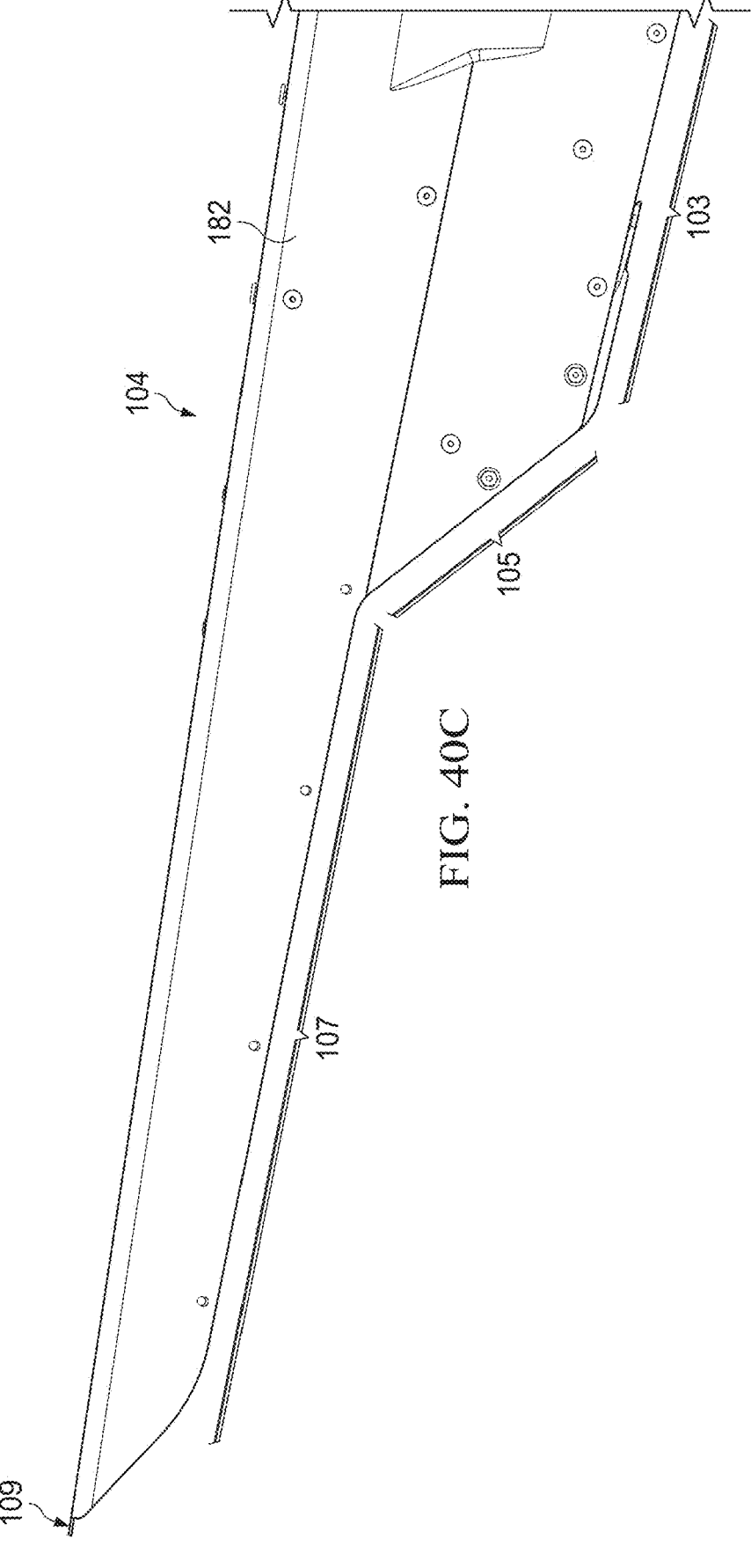
FIG. 40C illustrates a side view of the tunnel of FIG. 40A with the support bracket and support tube removed for viewing purposes, according to some embodiments.
Figure 43:
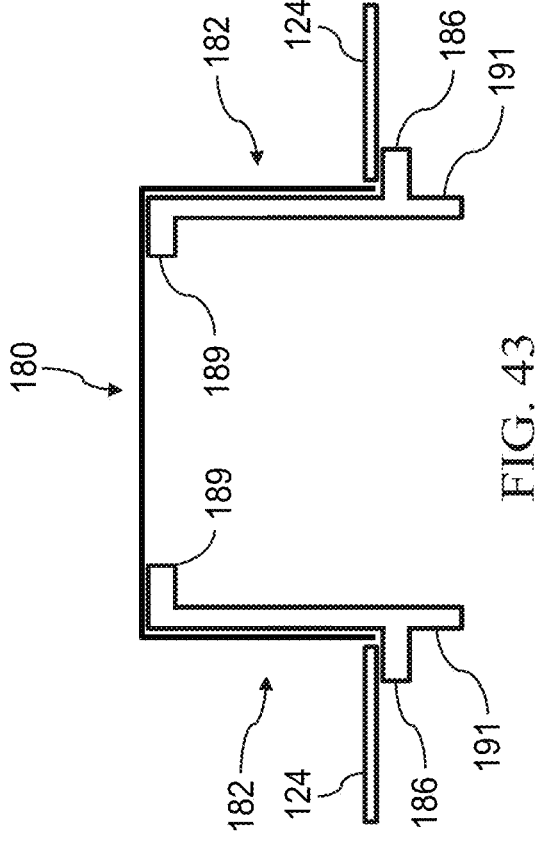
FIG. 43 illustrates a schematic rear view of the tunnel, the support bracket, and the foot support member, according to some embodiments.

As shown in FIGS. 37A and 37B, the support bracket 184 is provided with a body 185 that includes a plurality of apertures 188 for receiving the fasteners 126 to secure the support bracket 184 to an interior surface of the side panel 182. As shown in FIGS. 37A and 43, the support bracket includes an upper flange 189 that is positionable along the underside of the center plate 180 and extends toward a centerline of the tunnel 104. The upper flange 189 is provided with a plurality of apertures 190 for receiving fasteners therethrough to secure the upper flange 189 to the underside of the center plate 180. As shown in FIG. 40C, the tunnel 104 comprises a lower end, the lower end including a first length 103, a transition length 105, and a second length 107 extending to a rear end 109 (i.e., a second end) of the tunnel 104. The support bracket 184 may be config-ured to extend from the first length 103 to the second length 107 along the transition length 105. In some embodiments, the first length 103 and the second length 107 may be substantially parallel, with the transition length 105 oriented non-parallel to the first length 103 and the second length 107. In some embodiments, the first length 103 and the second length 107 may be substantially parallel to the top surface of the tunnel 104. In some embodiments, the bumper arm 525 may be positioned along the second length 107 of the side panel 182.

The tunnel 104 of the snowmobile 100 may also include a center plate 180 and a first and second side panel 182. The first side panel 182 includes a first end that is connected to the center plate 180 and a second, or free, end extending away from the center plate 180. The second side panel 182 also includes a first end that is connected to the center plate 180 and a second end that extends from the center plate 180. As shown in FIG. 43, a first support bracket 184 is secured to an interior surface of the first side panel 182, and a second support bracket 184 is secured to an interior surface of the second side panel 182. In a non-limiting example, the support brackets 184 may extend along one or more lengths of the free end of the side panels 182 of the tunnel 104. The free end of the side panels 182 may comprise a first length, a second length positioned rearward from the first length, and a transition length extending from the first length to the second length. The support bracket 184 may be positioned along at least a portion of one or more of the first length, the second length, and the transition length. The portion of the support bracket 184 positioned along the first length may be secured to the foot support member 124, the portion of the support bracket 184 positioned along the transition length may be secured to the rear kick-up panel 146, and the portion of the support bracket 184 positioned along the second length may be secured to a portion of the bumper 530. Accordingly, the support bracket 184 can reinforce the tunnel 104 to support components positioned outboard thereof. Each support bracket 184 may include a mounting surface 186 extending underneath the second ends of the side panels 182 and outboard from the side panel 182 that the foot support members 124 are removably secured to. The mounting surface 186 may be provided with one or more projections 195 extending outward, and the apertures 187 may be provided on the projections 195. The apertures 187 for receiving the fasteners 130 for securing the foot support members 124 to the mounting surface 186 may each be positioned at the same distance from the longitudinal centerline of the tunnel 104 as utilized in the running board assembly 120B configuration. Optionally, one or more of the apertures 187 may be positioned at a greater distance from the longitudinal centerline of the tunnel 104 than the other apertures 187, as utilized in the running board assembly 120A configuration.

Figure 45:
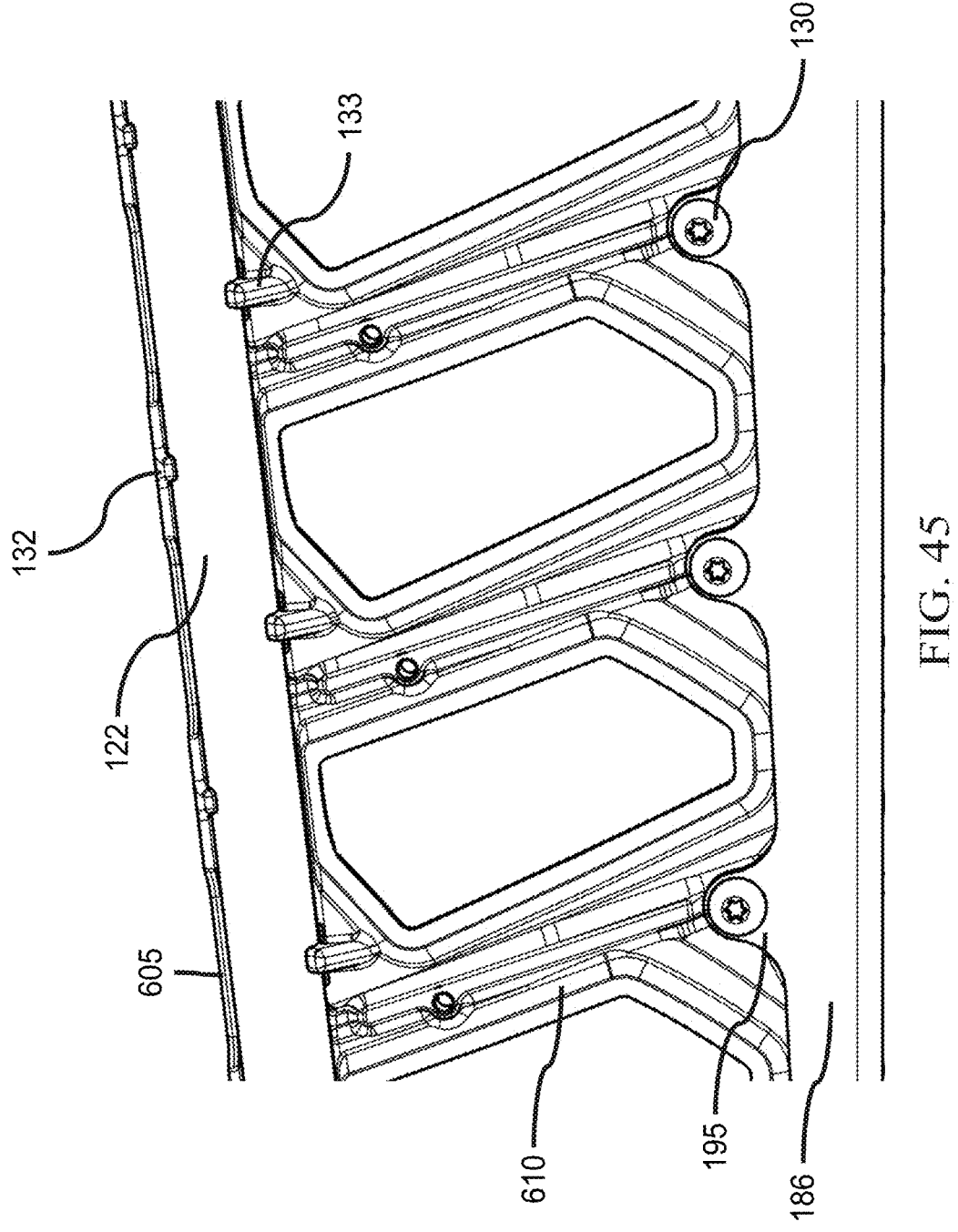
FIG. 45 illustrates a close-up bottom view of the foot support member and the support member of FIG. 44, according to some embodiments.

As shown in FIGS. 44 and 45, the inboard side of the foot support members 124 may be positioned on top of the mounting surfaces 186 and the fasteners 130 used to secure the foot support member 124 may be inserted through the apertures 187 in the support bracket 184 and threaded into the foot support member 124. The fasteners may be inserted into the first rail 600, the cross member 610, or an area positioned at the intersection of the first rail 600 and the cross member 610.

Figure 7:
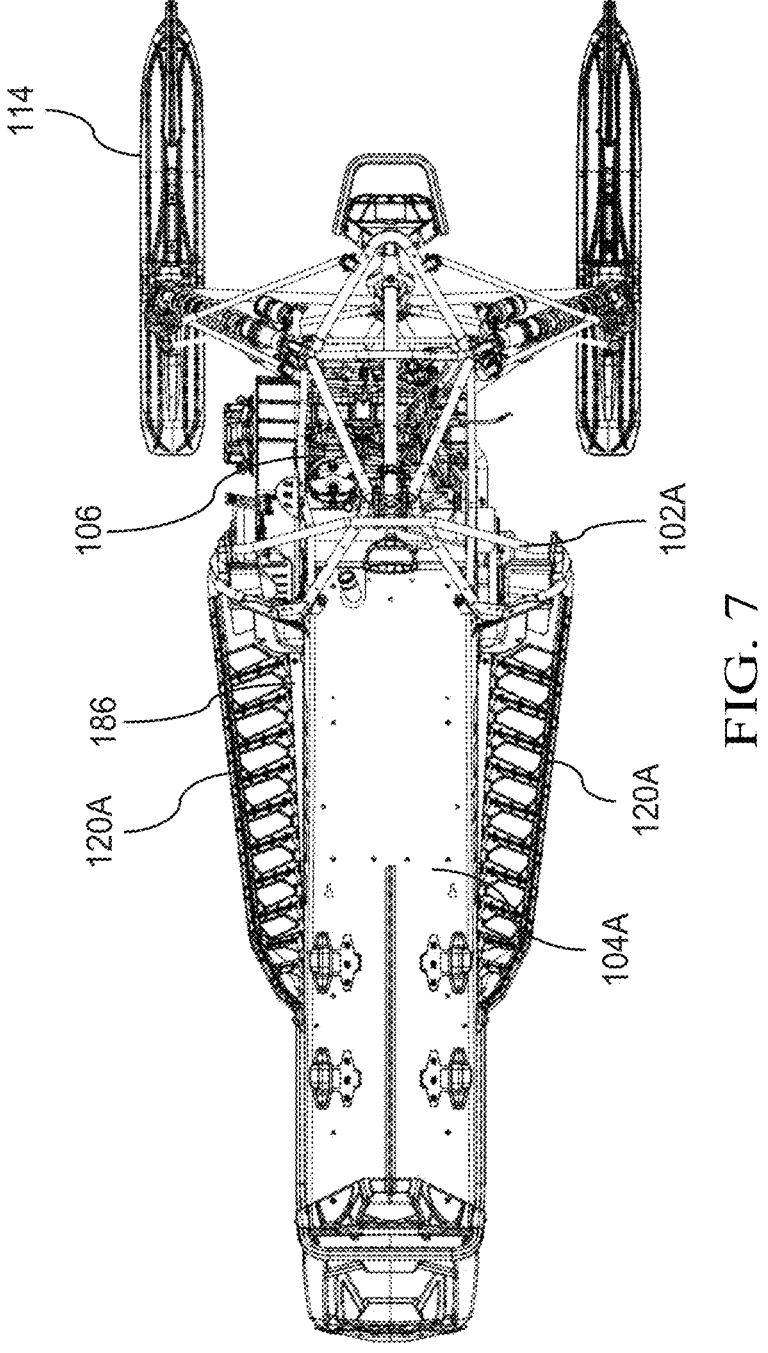
FIG. 7 illustrates a top view of the snowmobile of FIG. 1 with portions of the engine cover removed, according to some embodiments.
Figure 37C:
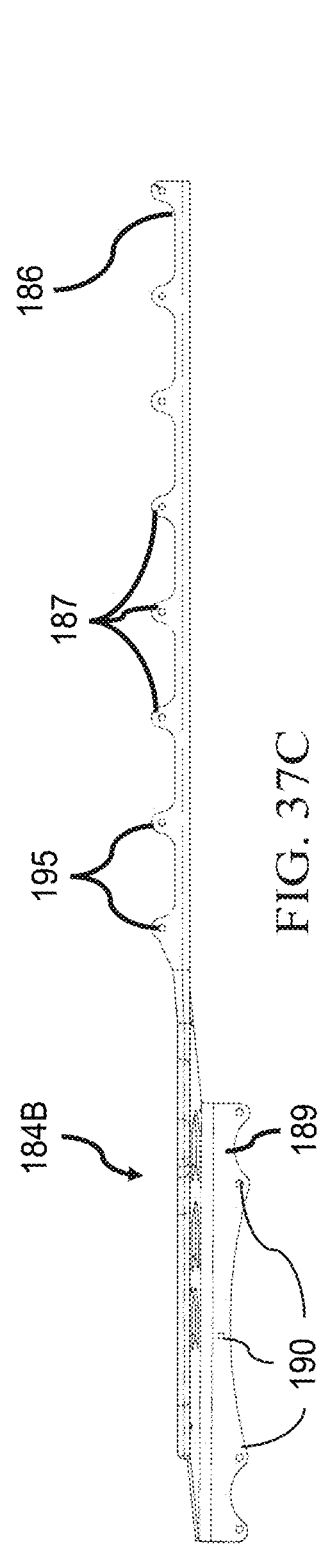
FIG. 37C illustrates a top view of a support bracket for the running board assembly associated with the second snowmobile of FIG. 8, according to some embodiments.
Figure 37D:
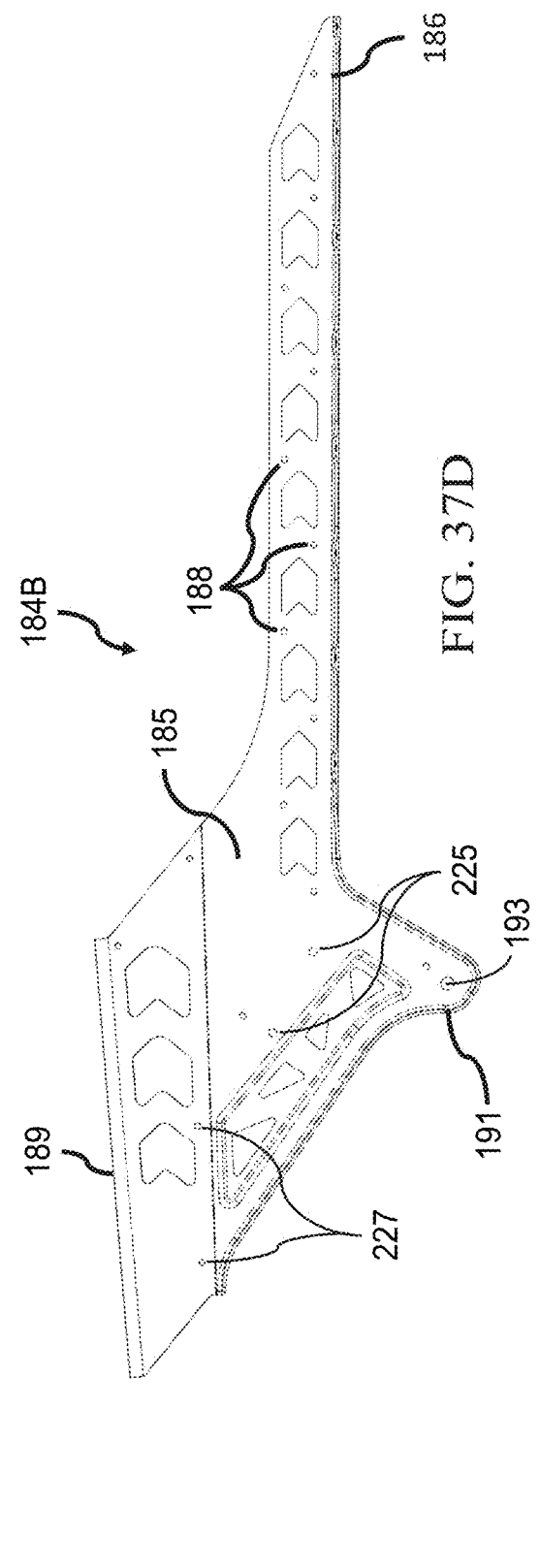
FIG. 37D illustrates a side view of the support bracket of FIG. 37C, according to some embodiments.
Figure 38:
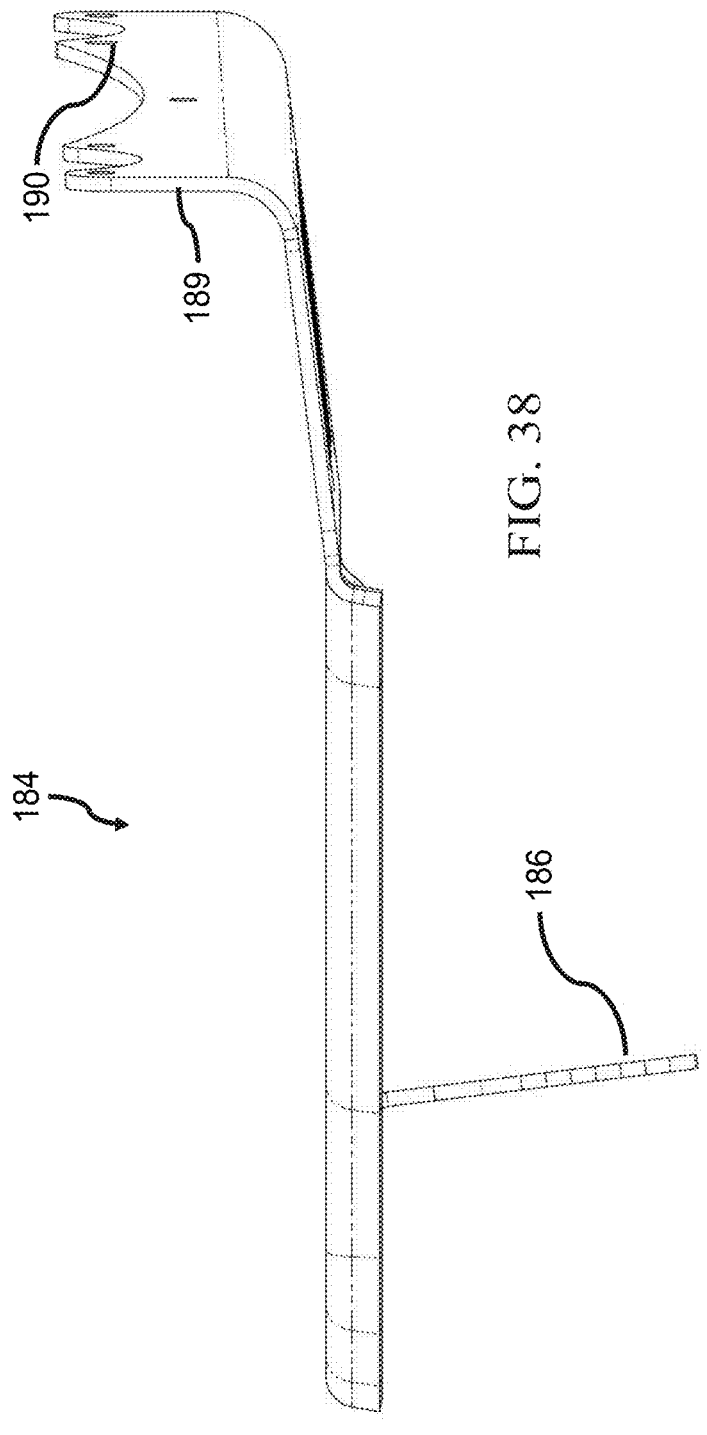
FIG. 38 illustrates an end view of the support bracket of FIG. 37A, according to some embodiments.
Figure 58:
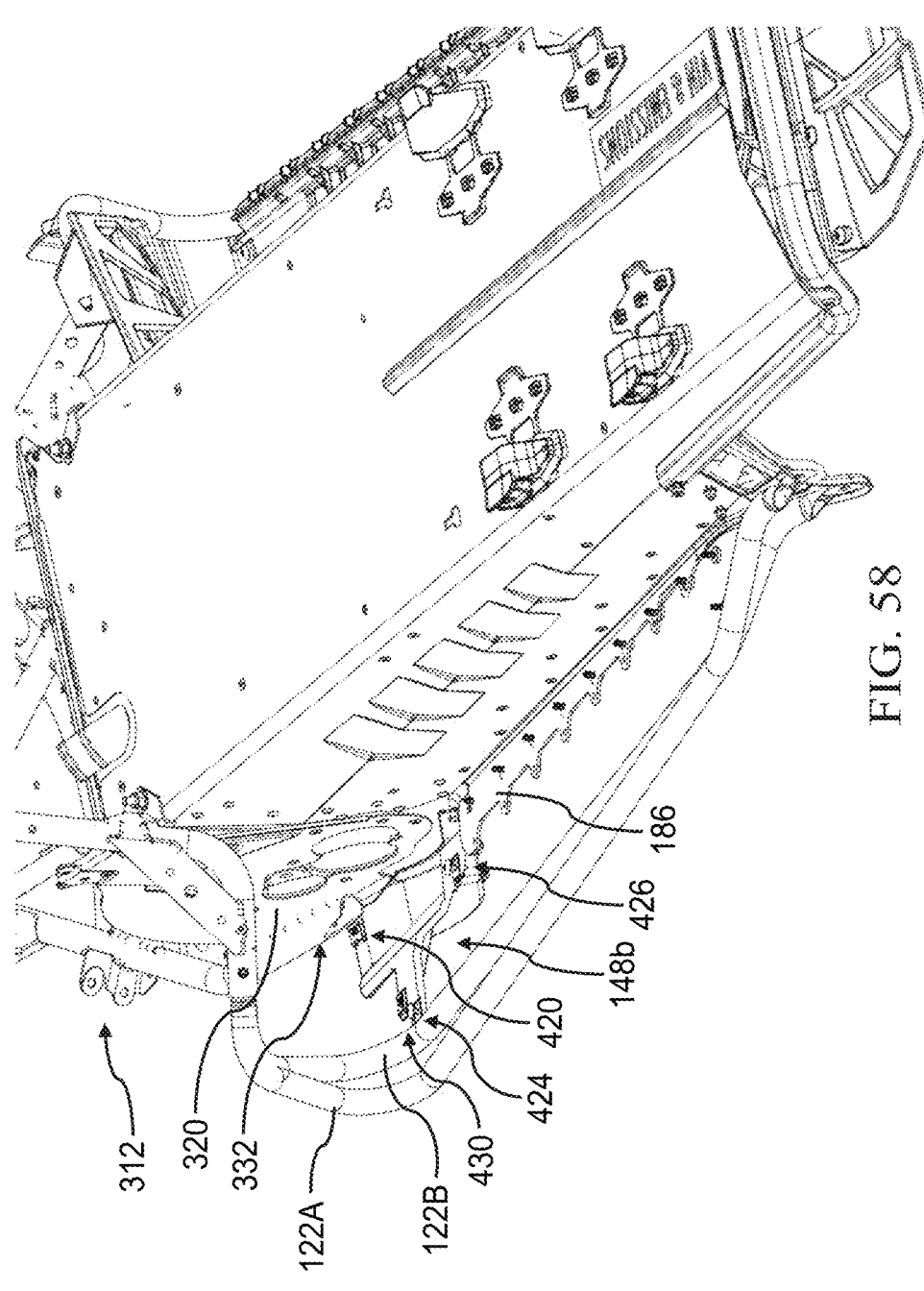
FIG. 58 illustrates a perspective view of a forward frame assembly with the support member associated with the first snowmobile of FIG. 1 superimposed with the support member associated with the second snowmobile of FIG. 8 to illustrate the common connection with the forward frame assembly for each support member.
Figure 59:
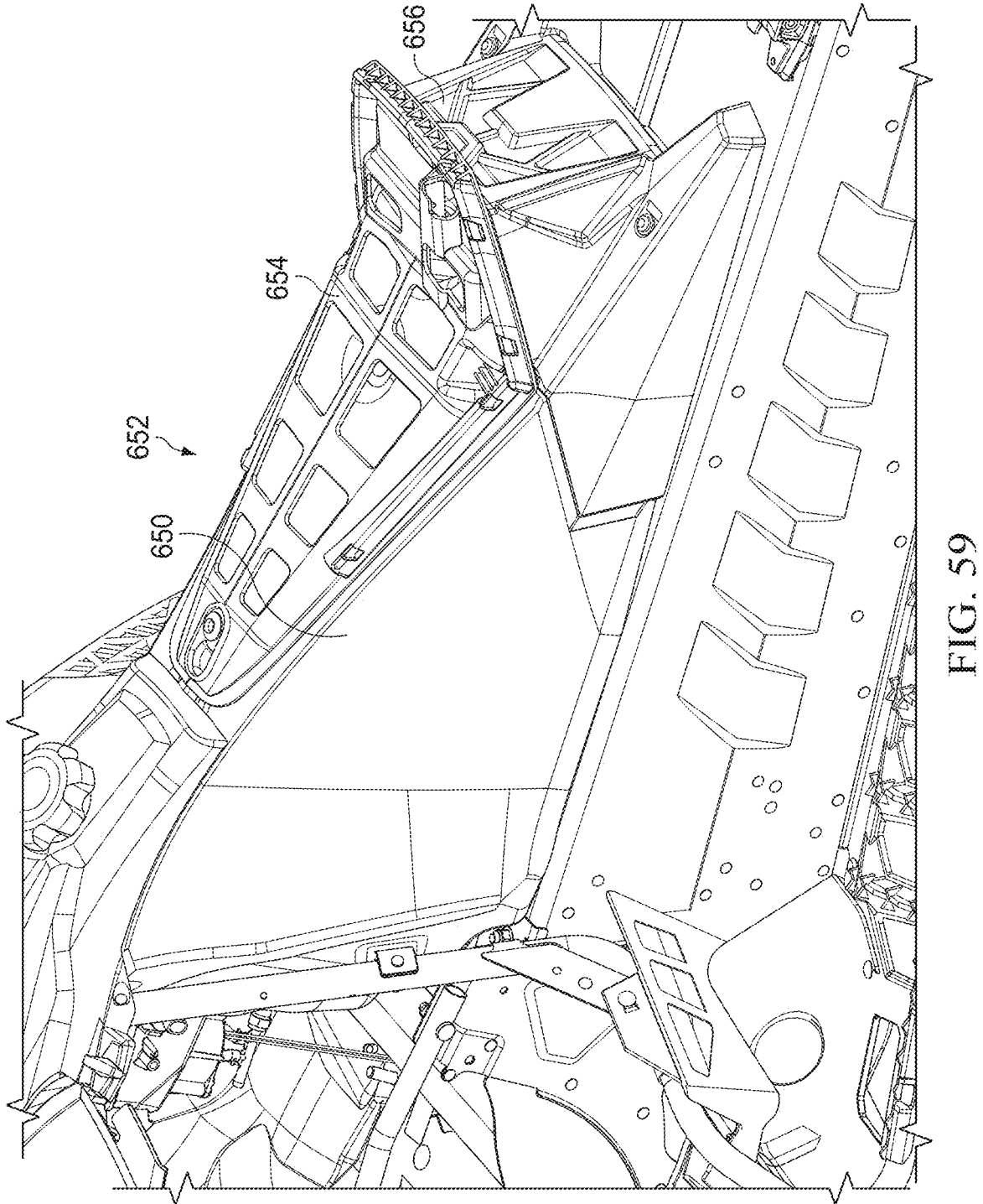
FIG. 59 illustrates an isometric view of a seat assembly including a fuel tank, a rear panel, and seat frame, according to some embodiments.
Figure 60:
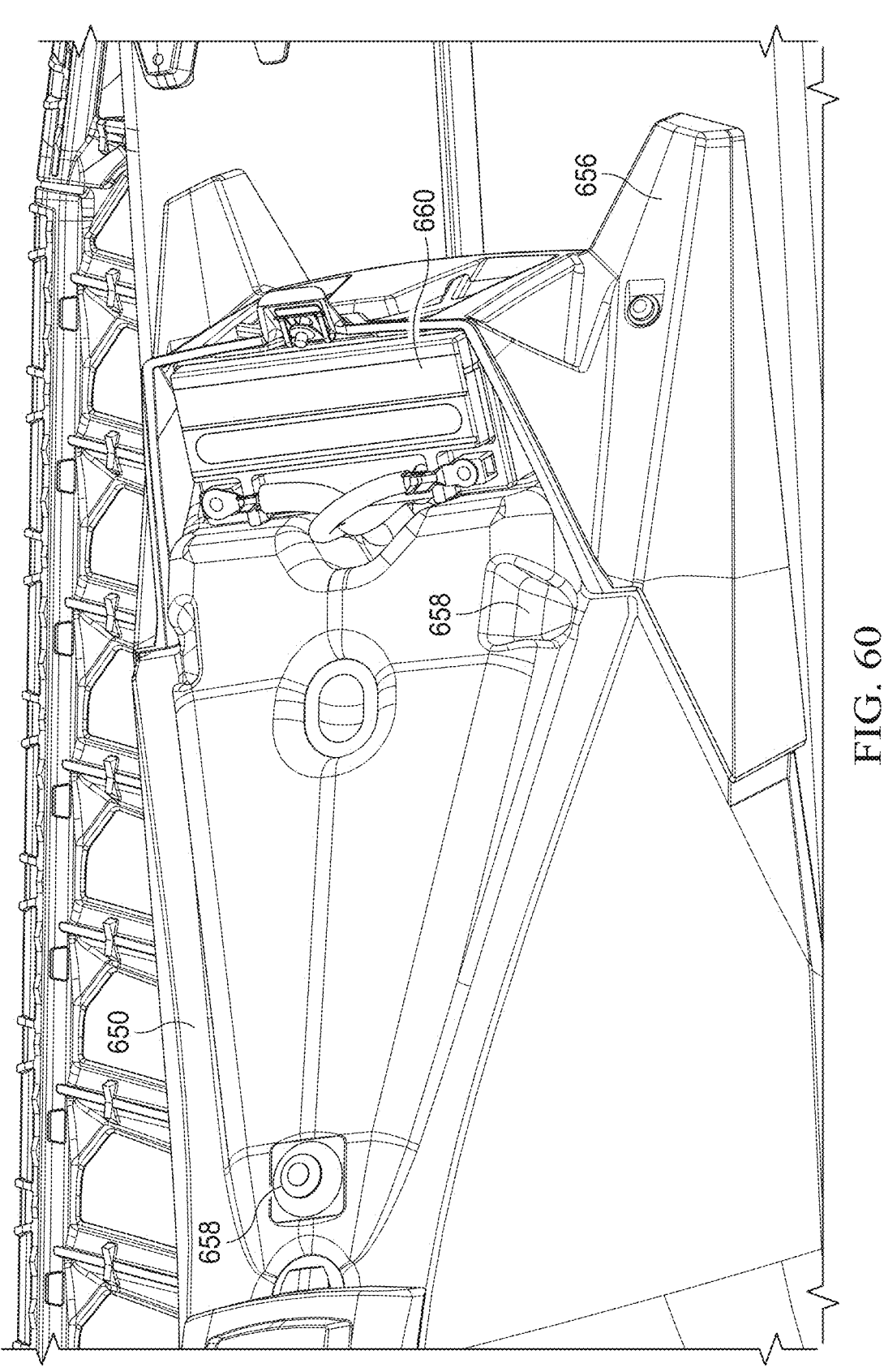
FIG. 60 illustrates an isometric view of the seat assembly of FIG. 59 with the seat frame removed, according to some embodiments.
Figure 61:
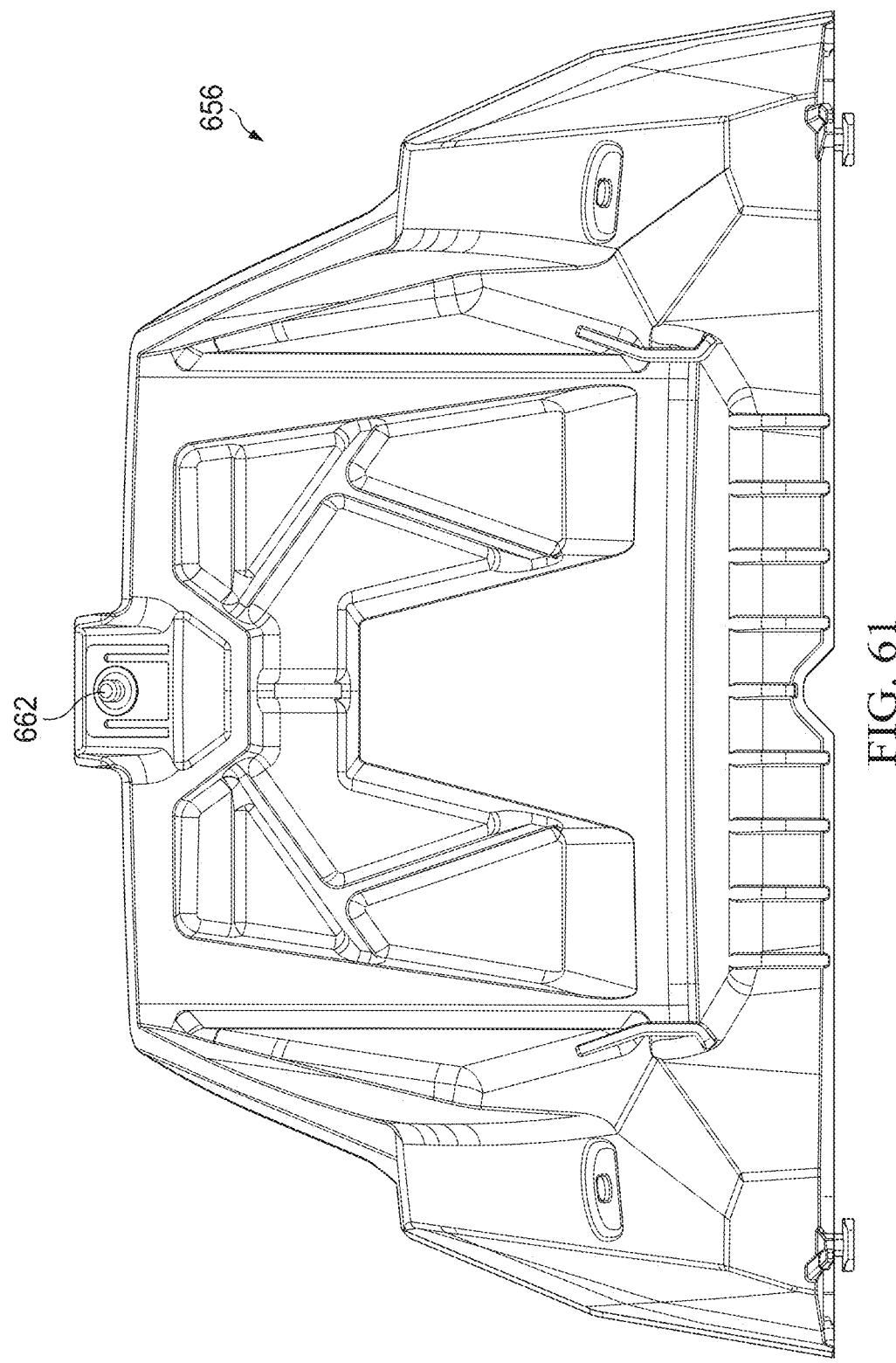
FIG. 61 illustrates a rear view of the rear panel of the seat assembly of FIG. 59, according to some embodiments.
Figure 62:
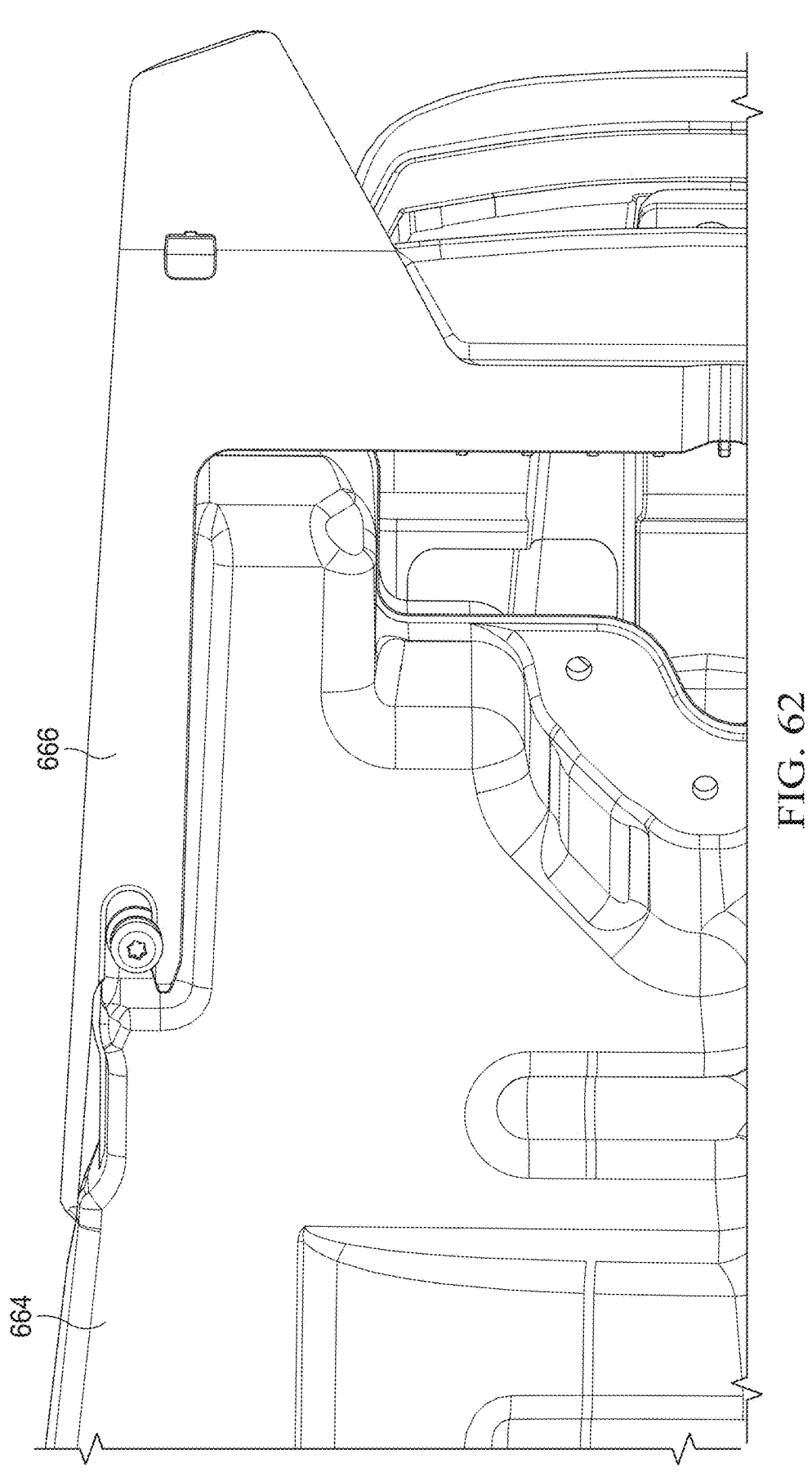
FIG. 62 illustrates a bottom isometric view of the rear panel and the fuel tank of the seat assembly of FIG. 59, according to some embodiments.

As explained above, the foot support member 124 may be positioned in different configurations with respect to one or both of the chassis 102 and tunnel 104 by modifying one or both of the support member 122 and the support bracket 184. As shown in FIG. 37A, the support bracket 184 is provided with a series of the apertures 187 for receiving fasteners 130 for removably securing the foot support member 124 thereto. In a first configuration (running board assembly 120A) as shown in FIGS. 7, 37A and 87B, the apertures 187 on the mounting surface 186 are positioned along a line that extends progressively outward from the body 185 of the support bracket 184 and the adjacent side panel 182. In a second configuration as shown in FIGS. 10, 12, 37C and 101, the apertures 187 on the mounting surface 186 may be positioned the same distance from the body 185 of the support bracket 184, so that the apertures 187 are positioned along a line parallel to the adjacent side panel 182. The distance that the forward end of the support member 122 extends outward from the rearward leg 326 and the sides of the snowmobile 100 can be increased or decreased to accommodate the differences between the first and second configurations. Accordingly, the same foot support member 124 can be applied to different snowmobile configurations or models without modification of the foot support member 124, simply by using a support bracket 184 with a different mounting surface 186 configuration. It is to be understood, however, that different support members could be used with the different support brackets. As shown in FIG. 58, different support members 122A, 122B may be provided to accommodate the different orientation of the foot support member 124 due to the use of different support brackets 184. When the support bracket 184 shown in FIG. 37A is used, the support tube 122A is used and it extends further outboard than the support tube 122B used when the support bracket 184 shown in FIG. 37C is used. The rear end of the support tubes 122A, 122B are secured to either the side panel 184 of the tunnel 104 and/or the support bracket 184. The rear end of the support tubes 122A, 122B may be secured in the same location on the different snowmobiles, or at different positions. For example, the support tube 122A may be connected to a first rear suspension, and the support tube 122B may be connected to a second rear suspension that is different than the first rear suspension.

In a non-limiting example, the support bracket 184 may be used to provide targeted reinforcement to portions of the tunnel 104, thereby allowing the tunnel 104 to be made of a thinner and lighter gauge of sheet metal or a fiber reinforced polymer. In a non-limiting example, the first side panel 182 comprises a sheet metal or metal alloy that has a first thickness and the first support bracket 184 comprises a sheet metal or metal alloy that has a second thickness that is different than, and optionally greater than the first thickness. In addition to, or alternatively, the tunnel 104 may be comprised of a first material, e.g., aluminum or an aluminum alloy, and the first support bracket 184 may be comprised of a second material, such as steel, that is different than the first material and has a higher value of Young's modulus. It is to be understood, however, that the support bracket 184 may be comprised of the same material as the tunnel 104.

Figure 25B:
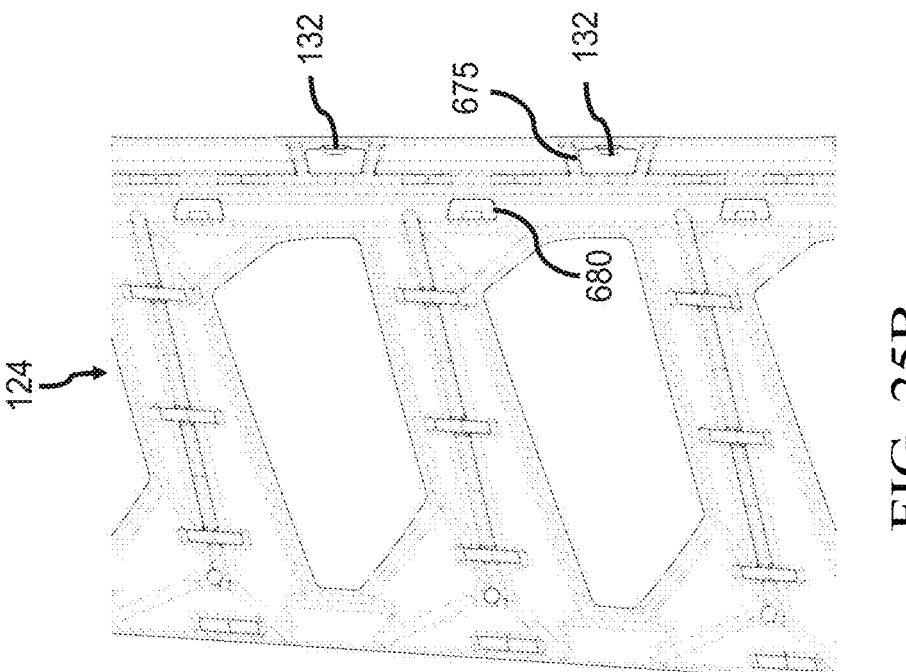
FIG. 25B illustrates a close-up top view of the foot support member of the running board assembly, according to some embodiments.
Figure 25A:
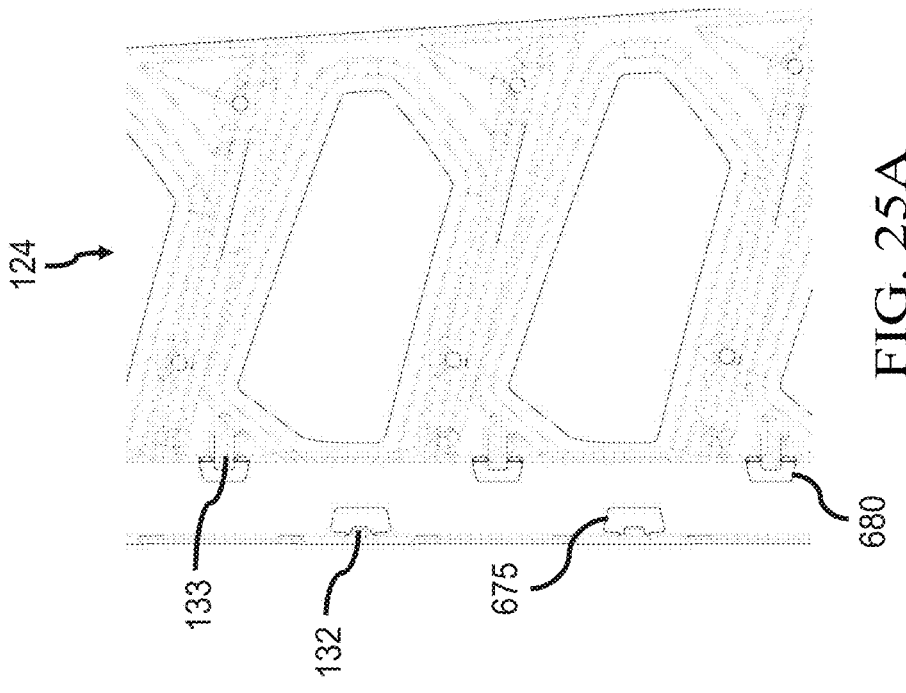
FIG. 25A illustrates a close-up bottom view of the foot support member of the running board assembly, according to some embodiments.

With respect to the foot support member 124, the second rail 605 may define a plurality of openings 675 from the top surface 138 to the channel 131 that extend along an outboard side of the second rail 605 and face outwardly from the tunnel 104. Optionally, the second rail 605 may define a second plurality of openings 680 from the top surface 138 to the channel 131 that extend along an inboard side of the second rail 605 and face inwardly toward the tunnel 104. The openings 680 may be offset from the openings 675 along the length of the channel 131. One or more ridges 136 may at least partially define the outer perimeter of the openings 675, and optionally the outer perimeter of the openings 680. As shown in FIG. 25A, the clips 132 may be positioned along the second rail 605 below the openings 675 and extend downward and inward toward the downward facing opening 615. As shown in FIG. 25B, the clips 133 may be positioned along the second rail 605 below the openings 680 and extend downward from the bottom surface 139 of the foot support member 124 and outward towards the downward facing opening 615. The clips 133 may be at least partially positioned along a leading edge 617 of the cross members 610 and extend outward therefrom toward the downward facing opening 615.

While the running board and running board assembly presented herein is employed on a snowmobile, different embodiments of the running board and running board assembly may be applied to other types of vehicles, such as a snow bike or a personal off-road vehicle.

Figure 39:
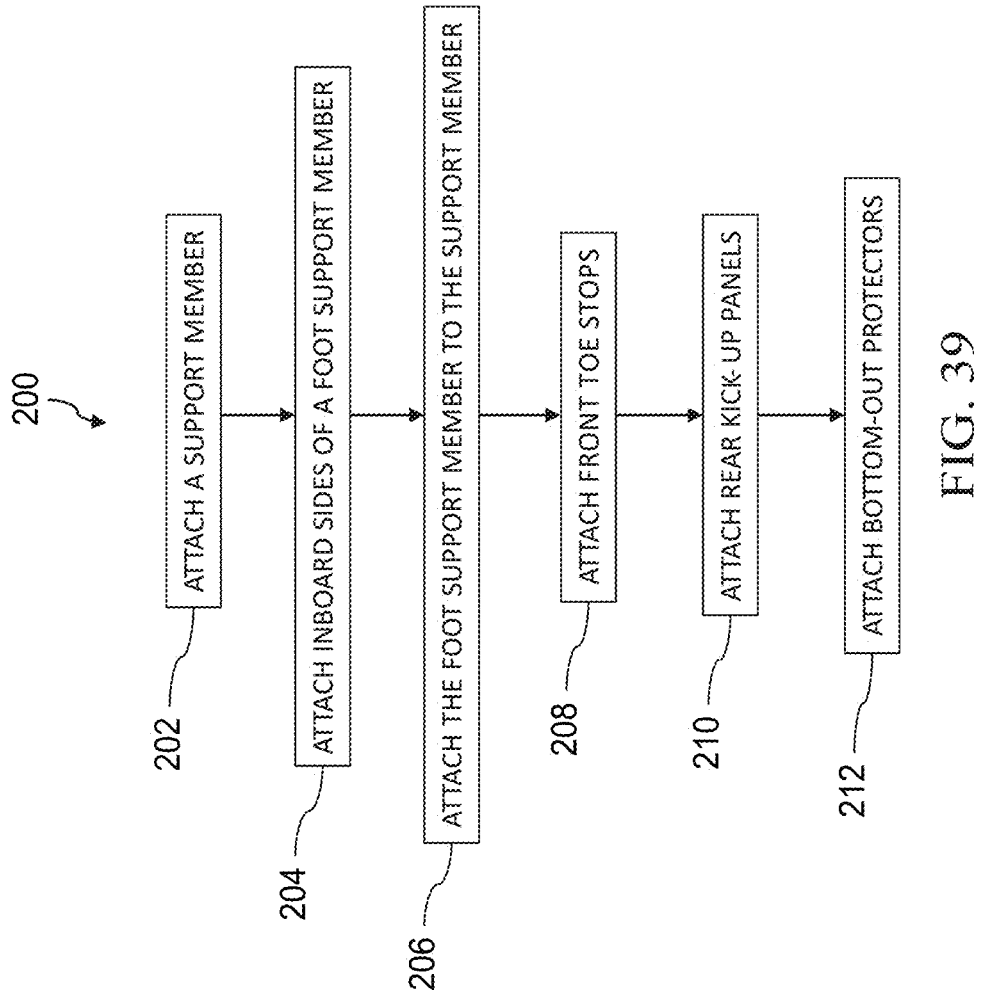
FIG. 39 is a flowchart for a method of assembling a snowmobile, according to some embodiments.

FIG. 39 shows a illustrative method 200 of assembling a snowmobile that includes a chassis 102, an engine 106 attached to the chassis and disposed within an engine bay 108, a drive track 110, a drivetrain 112 operatively interconnecting the engine with the drive track 110 and configured to deliver propulsive power to the drive track 110, a tunnel 104 attached to the chassis 102, and a running board assembly 120 attached to the tunnel 104. The method 200 includes the following steps:

STEP 202, ATTACH A SUPPORT MEMBER, includes attaching a support member 122 to one or more of the forward frame assembly 312, the tunnel 104 and the support bracket 184 to position the support member 122 outboard of the tunnel 104;

STEP 204, ATTACH INBOARD SIDES OF A FOOT SUPPORT MEMBER, includes attaching inboard sides 128 of a foot support member 124 to the tunnel 104 and/or the support bracket 184 using a plurality of threaded fasteners 130;

STEP 206, ATTACH THE FOOT SUPPORT MEMBER TO THE SUPPORT MEMBER, includes retaining outboard sides 127 of the foot support member 124 to the support member 122 optionally using a plurality of flexible clips 132 that are integrally formed with the foot support member 124 and are defined on an outboard edge of the foot support member 124. Each of the flexible clips 132 wraps around at least 51% and at most 75% of a circumference of the support member 122. The flexible clips 132 are sized to apply a compressive force to the support member 122;

STEP 208, ATTACH FRONT TOE STOPS, includes attaching front toe stops 140 to one or more of the foot support member 124, the support member 122, the tunnel 104, body panels 400, 402, and the forward frame assembly 312;

STEP 210, ATTACH REAR KICK-UP PANELS, includes attaching rear kick-up panels 146 to one or more of the bumper 530, the support bracket 184, the foot support member 124, the support member 122, and the tunnel 104; and STEP 212, ATTACH BOTTOM-OUT PROTECTORS, includes attaching bottom-out protectors 148 to one or more of the tunnel 104, the heat exchanger end cap 178, the forward frame assembly 312, the foot support member 124, the toe stop 140, and body panels 400, 402. The bottom-out protectors 148 may be formed of an unfilled thermoplastic olefin material or a thermoplastic polyurethane material. The bottom-out protectors 148 may be located outboard of at least a portion of the tunnel 104 and inboard of at least a portion of the support member 122, wherein the bottom-out protectors 148 are positioned on the chassis 102 in a location that is lower, i.e., closer to the ground, than the tunnel 104 and the foot support member 124. It is to be understood that steps 202, 204, 206, 208, 210 and 212 may be performed in any order, and that one or more of the steps may be optional.

As illustrated in a non-limiting example of FIGS. 40A-42D, the snowmobile 100 may include a forward frame assembly 312 including a plurality of tube members. The forward frame assembly 312 may be assembled prior to securing to one or both the tunnel 104 and heat exchanger assembly 174. The forward frame assembly 312 may define a front, a rear, and a longitudinal centerline. The forward frame assembly 312 may include a first side 304 extending substantially along the longitudinal centerline and a second side 306 extending substantially along the longitudinal centerline and spaced apart from the first side 304. Each of the first side 304 and the second side 306 includes an inner perimeter 308 defining a side opening 310. The first side 304 and the second side 306 are positioned to define a rear opening 314 therebetween at the rear of the forward frame assembly 312 for receiving the heat exchanger assembly 174, tunnel 104, or both therein.

According to one or more aspects of the present disclosure, a forward frame assembly 312 for a snowmobile 100 is provided including a front, a rear, and a longitudinal centerline extending from front to rear. The forward frame 312 includes a first side 304 extending along the longitudinal centerline, a second side 306 extending along the longitudinal centerline and spaced apart from the first side 304. Each of the first side 304 and the second side 306 includes an inner perimeter 308 defining a side opening 310. The first side 304 and the second side 306 define a rear opening 314 therebetween at the rear of the forward frame 312 for receiving a heat exchanger assembly 174 and/or tunnel 104 therein.

Optionally, the first side 304 defines an outer perimeter 318, the second side 306 defines an outer perimeter 318, and a track drive shaft 352 extends across the forward frame assembly 312. The track drive shaft 352 is positioned rearward of the outer perimeter 318 of the first side 304 and forward of the outer perimeter 318 of the second side 306.

Optionally, the track drive shaft 352 is positioned rearward of the inner perimeter 308 of the first side 304 and rearward of the inner perimeter 308 of the second side 306.

Optionally, the second side 306 includes a metal plate or sheet 320 (hereinafter referred to as "the metal sheet 320") defining an aperture 322 for receiving the track drive shaft 352 therethrough when the metal sheet 320 is positioned to overlap a heat exchanger end cap 178 of the heat exchanger assembly 174 or a side of the tunnel 104.

Optionally, the metal sheet 320 of the second side 306 defines a first aperture 324 therein for receiving the track drive shaft 352 in a first position or a second position that is different than the first position.

Optionally, the second side 306 includes a rearward leg 326, such as a hollow tube, extending upward and forward from the metal sheet 320 to a steering column mount component 328, a forward leg 330, such as a hollow tube, extending upward and rearward to the steering column mount component 328, and a horizontal member 331 (shown in FIGS. 12 and 41A) substantially extending along the longitudinal centerline from the forward leg 330 to the rearward leg 326. An upper end of the metal sheet 320 is shaped to support a rearward end of the horizontal member 331 and is removably secured thereto, and the rearward end of the horizontal member 331 is vertically positioned higher than the front end of the tunnel 104.

Figure 55:
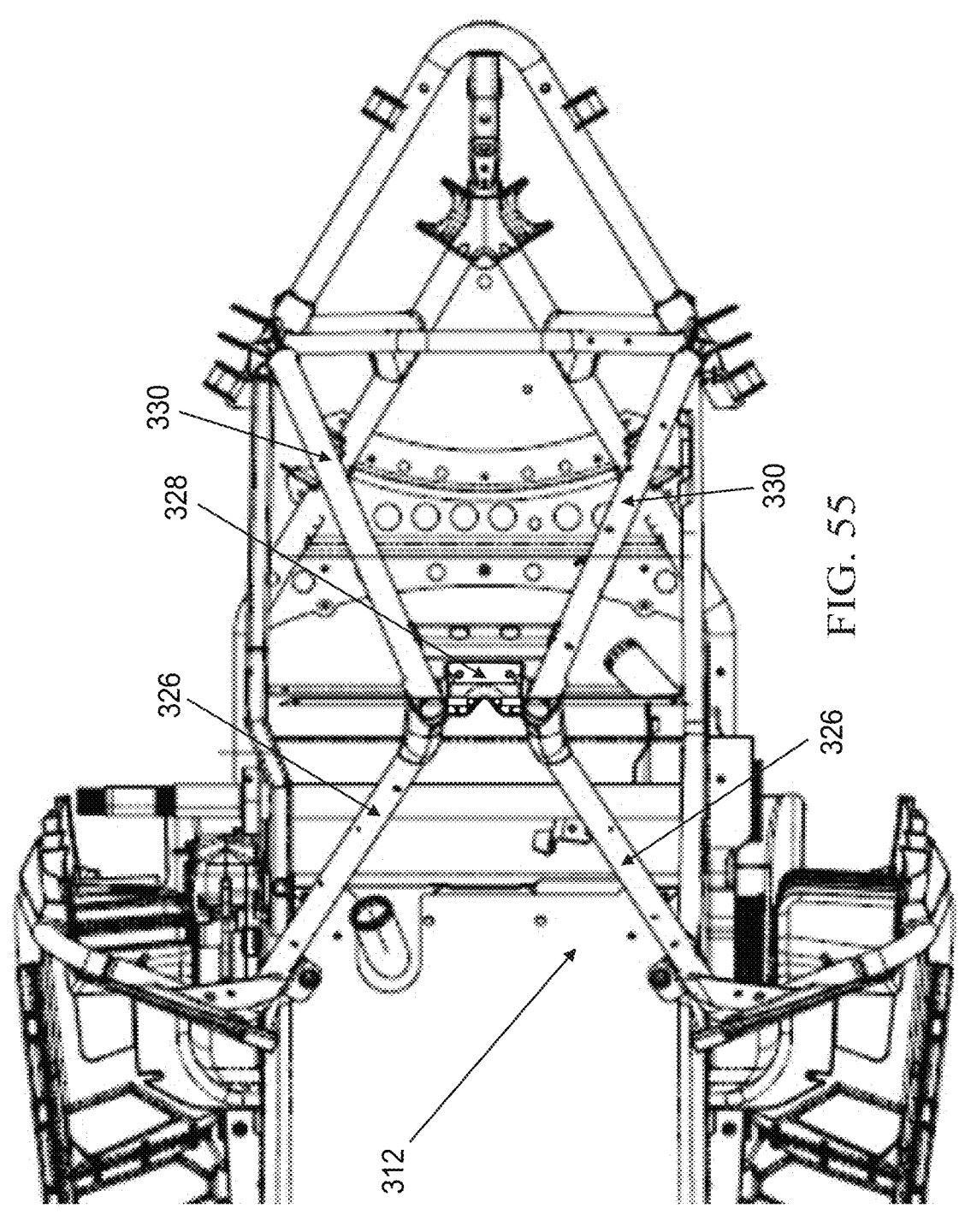
FIG. 55 illustrates a top-down view of a forward frame assembly with steering column bracket, according to some embodiments.
Figure 56B:
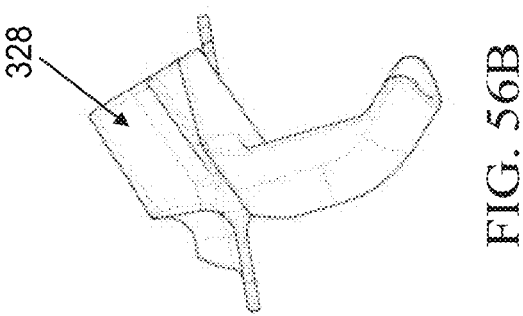
FIG. 56B illustrates a side perspective view of the steering column bracket of FIG. 56A, according to some embodiment.
Figure 56C:
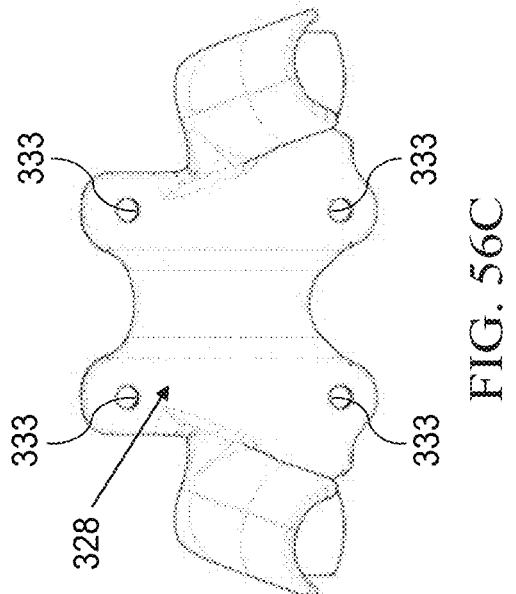
FIG. 56C illustrates a rear perspective view of the steering column bracket of FIG. 56A, according to some embodiment

Optionally, the steering column mount component 328 may be configured to secured to the forward legs 330 and the rearward legs 326 (see e.g., FIGS. 55-56C). The steering column mount component 328 may include one or more mounting points 333 configured to secured to a steering column.

Optionally, the first side 304 includes a metal plate or sheet 334 (hereinafter referred to as "the metal sheet 334") defining an aperture for securing a belt housing assembly 354 thereto when the metal sheet 334 is positioned to overlap the heat exchanger end cap 178 of the heat exchanger assembly 174 and/or a side panel 182 of the tunnel 104.

Figure 42A:
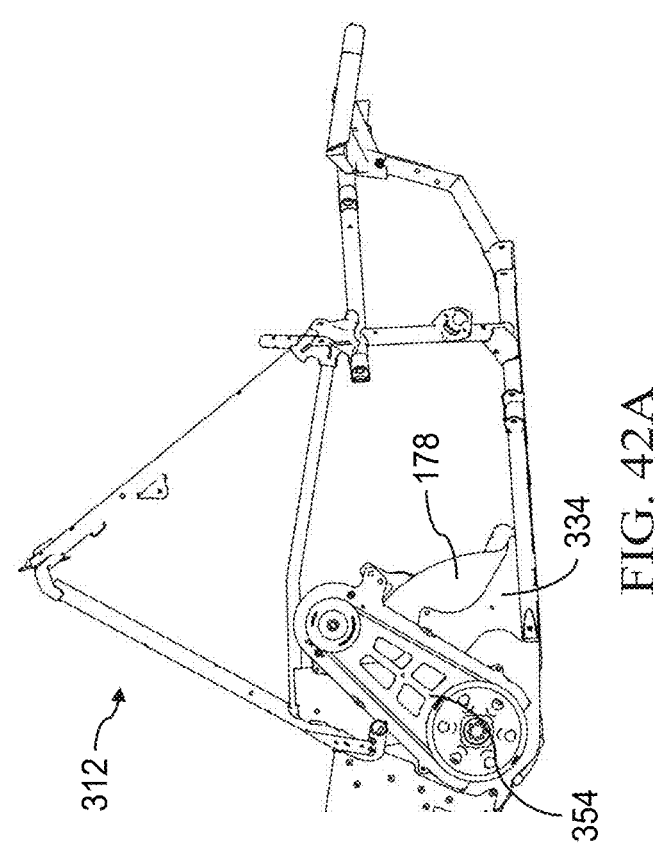
FIG. 42A illustrates a right side view of the forward frame assembly with a belt housing assembly in a first position associated with the first snowmobile of FIG. 1, according to some embodiments.
Figure 42B:
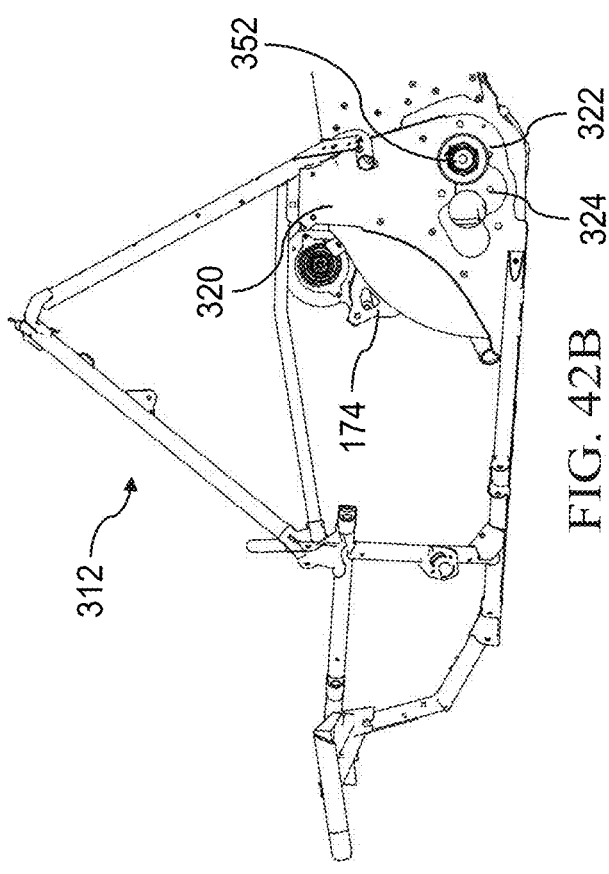
FIG. 42B illustrates a left side view of the forward frame assembly of FIG. 42A with a track drive shaft in a first position associated with the first snowmobile of FIG. 1, according to some embodiments.
Figure 42C:
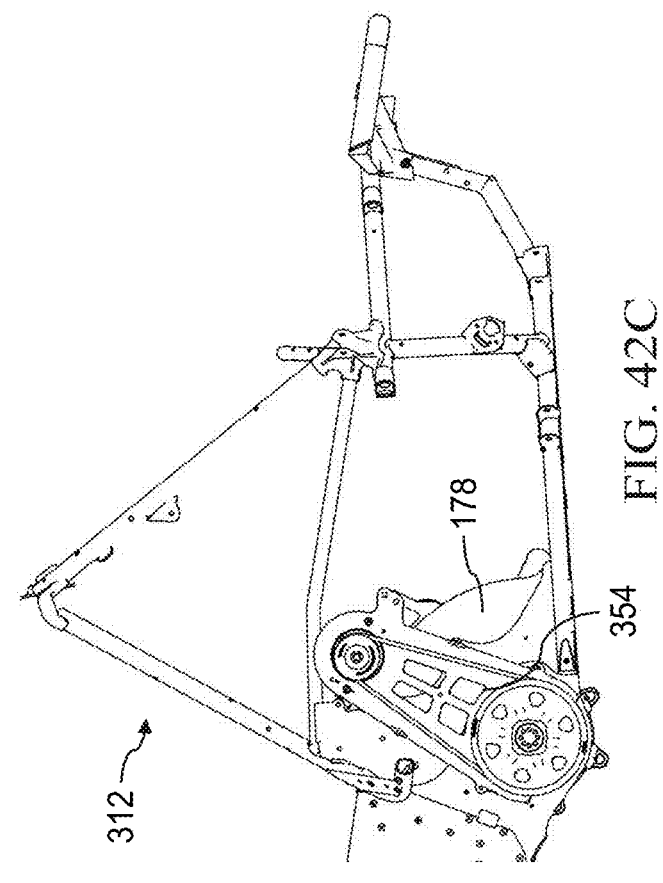
FIG. 42C illustrates a right side view of the forward frame assembly with the belt housing assembly in a second position associated with the second snowmobile of FIG. 8, according to some embodiments.
Figure 42D:
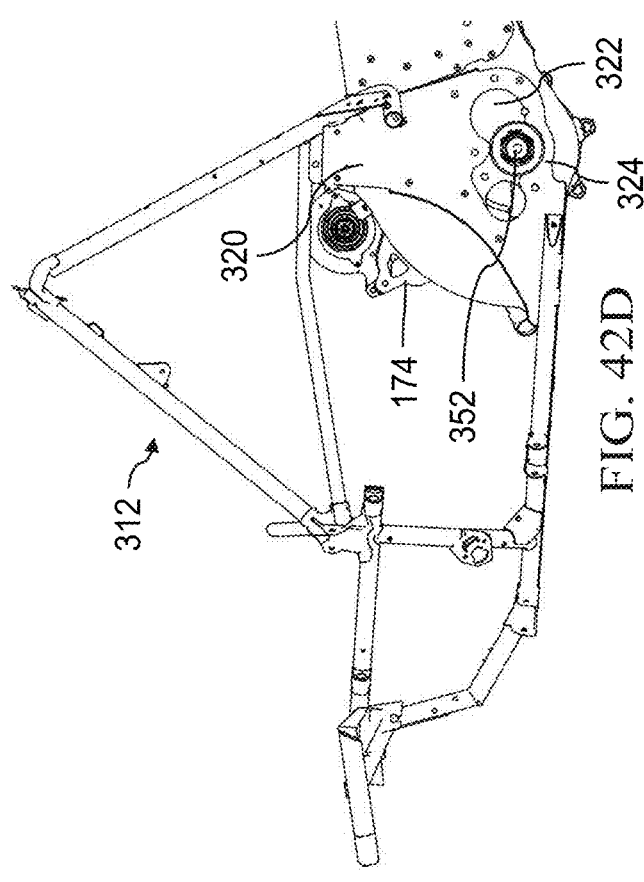
FIG. 42D illustrates a left side view of the forward frame assembly of FIG. 42C with a track drive shaft in a second position associated with the second snowmobile of FIG. 8, according to some embodiments.

Optionally, the metal sheet 334 of the first side 304 defines a first aperture therein for securing the belt housing assembly 354 in a first position as shown in FIG. 42A or a second position as shown in FIG. 42C that is different than the first position.

Optionally, the first side 304 includes a rearward leg 338 extending upward and forward from the metal sheet 334 to a steering column mount component 328, a forward leg 330 extending upward and rearward to the steering column mount component 328, and a horizontal member 342 substantially extending along the longitudinal centerline from the forward leg 330 to the rearward leg 326, and a rearward end of the horizontal member 342 is vertically positioned higher than the front of the tunnel 104.

Optionally, a jack shaft, as disclosed in U.S. patent application Ser. No. 17/588,487, entitled ADJUSTABLE BELT DRIVE ASSEMBLY, SYSTEM AND METHOD, filed Jan. 31, 2022, which is commonly owned and incorporated herein by reference in its entirety, extends across the forward frame 312 and is positioned beneath the horizontal member 342 of the first side 304.

Optionally, a steering column mount component 328 extends between the first side 304 and the second side 306. The first side 304 and the second side 306 each includes a leg 326, 338 extending upward and forward from the rear of the forward frame 312 to the steering column mount component 328.

Figure 41A:
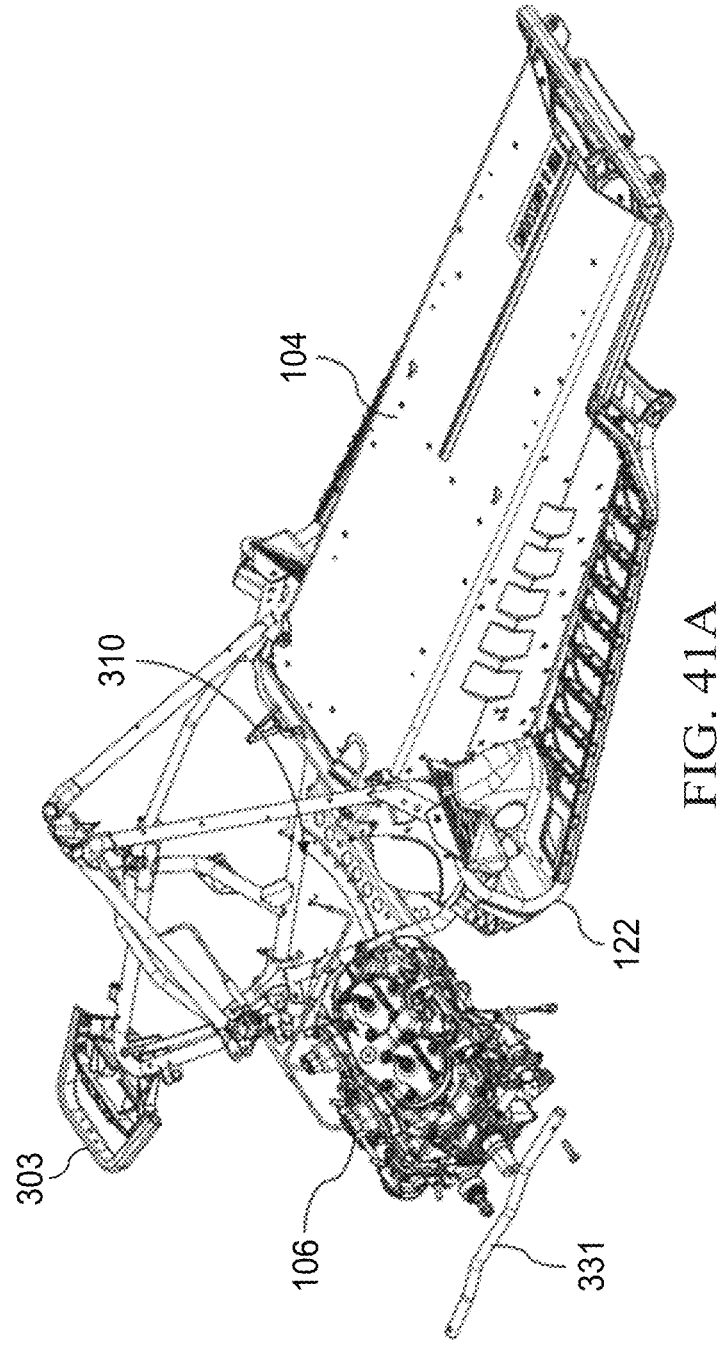
FIG. 41A illustrates an engine being inserted into a forward frame assembly, according to some embodiments.
Figure 41B:
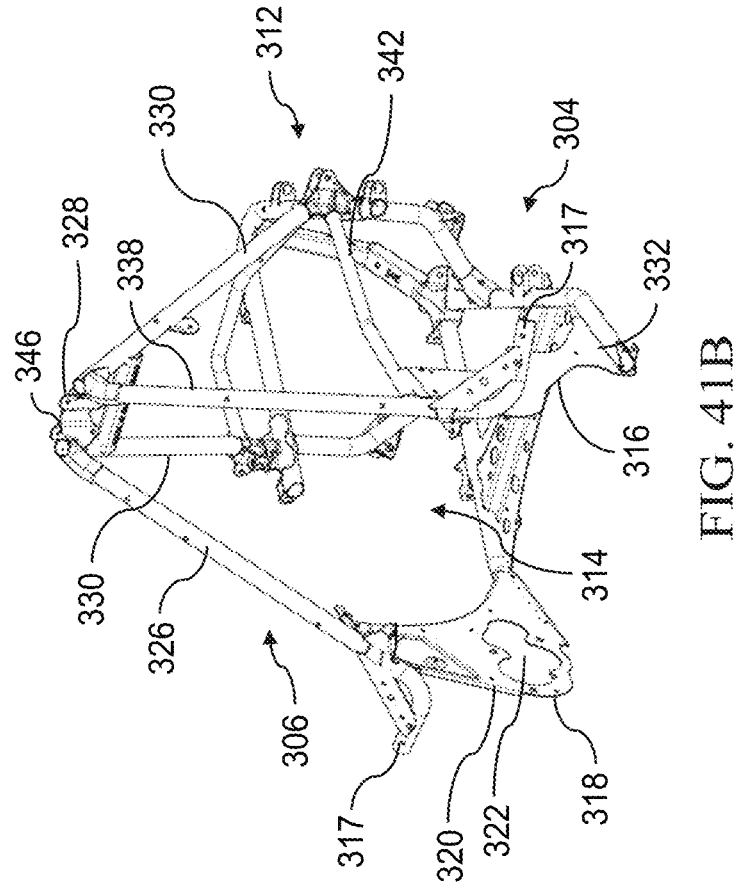
FIG. 41B illustrates right rear perspective view of a snowmobile forward frame assembly, according to some embodiments.
Figure 41C:
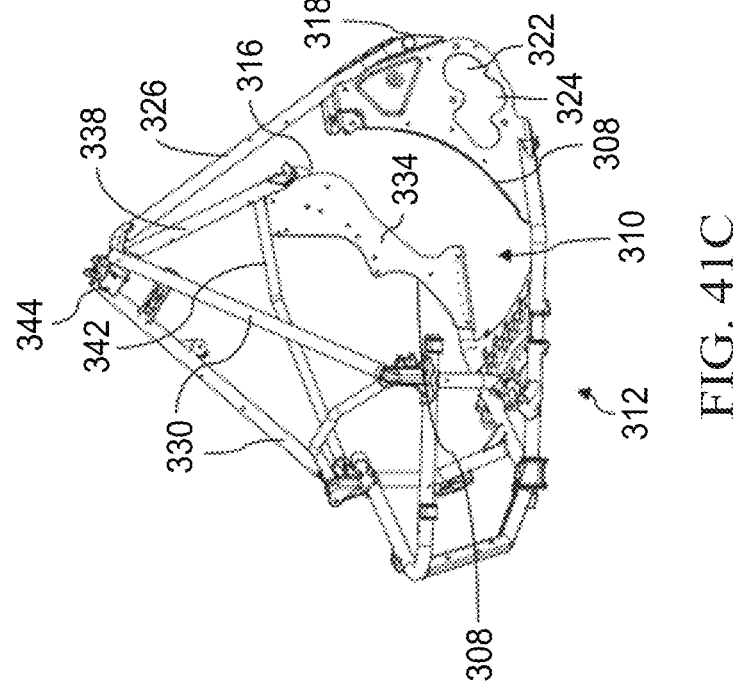
FIG. 41C illustrates left front perspective view of the snowmobile forward frame assembly, according to some embodiments.
Figure 50A:
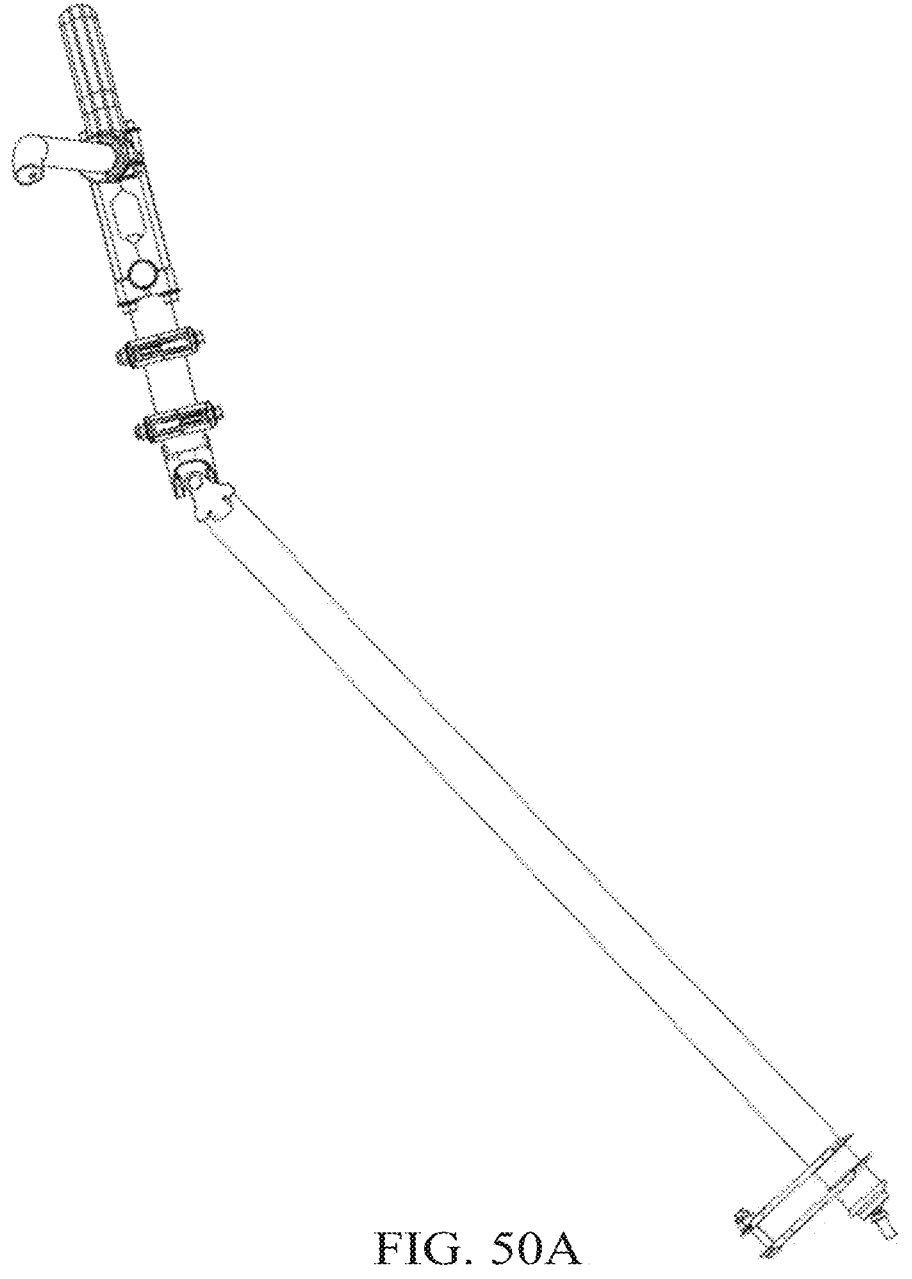
FIG. 50A illustrates a side view of the steering column assembly of FIG. 46, according to some embodiments.
Figure 50B:
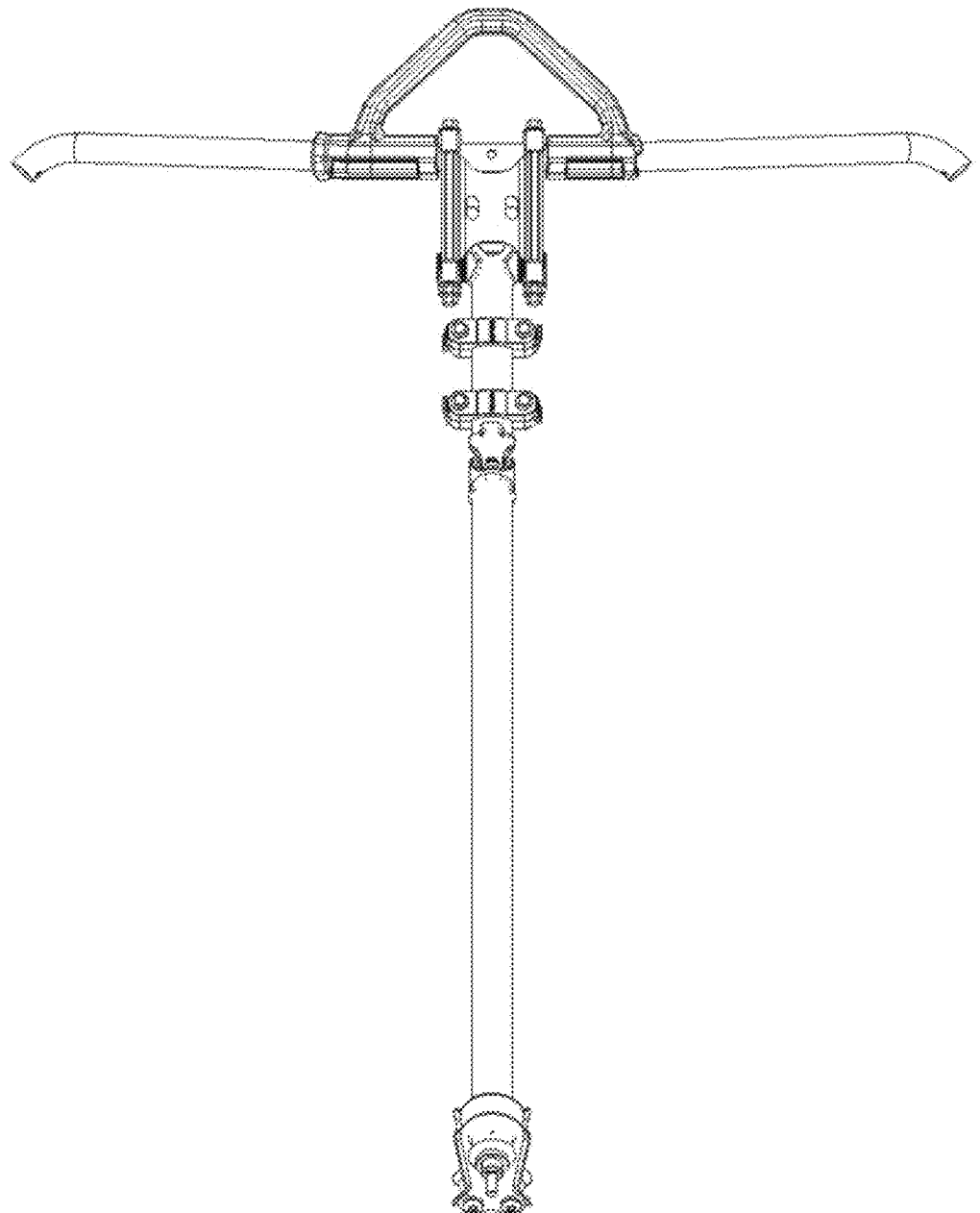
FIG. 50B illustrates a front view of the steering column assembly of FIG. 50A, according to some embodiments.
Figure 51A:
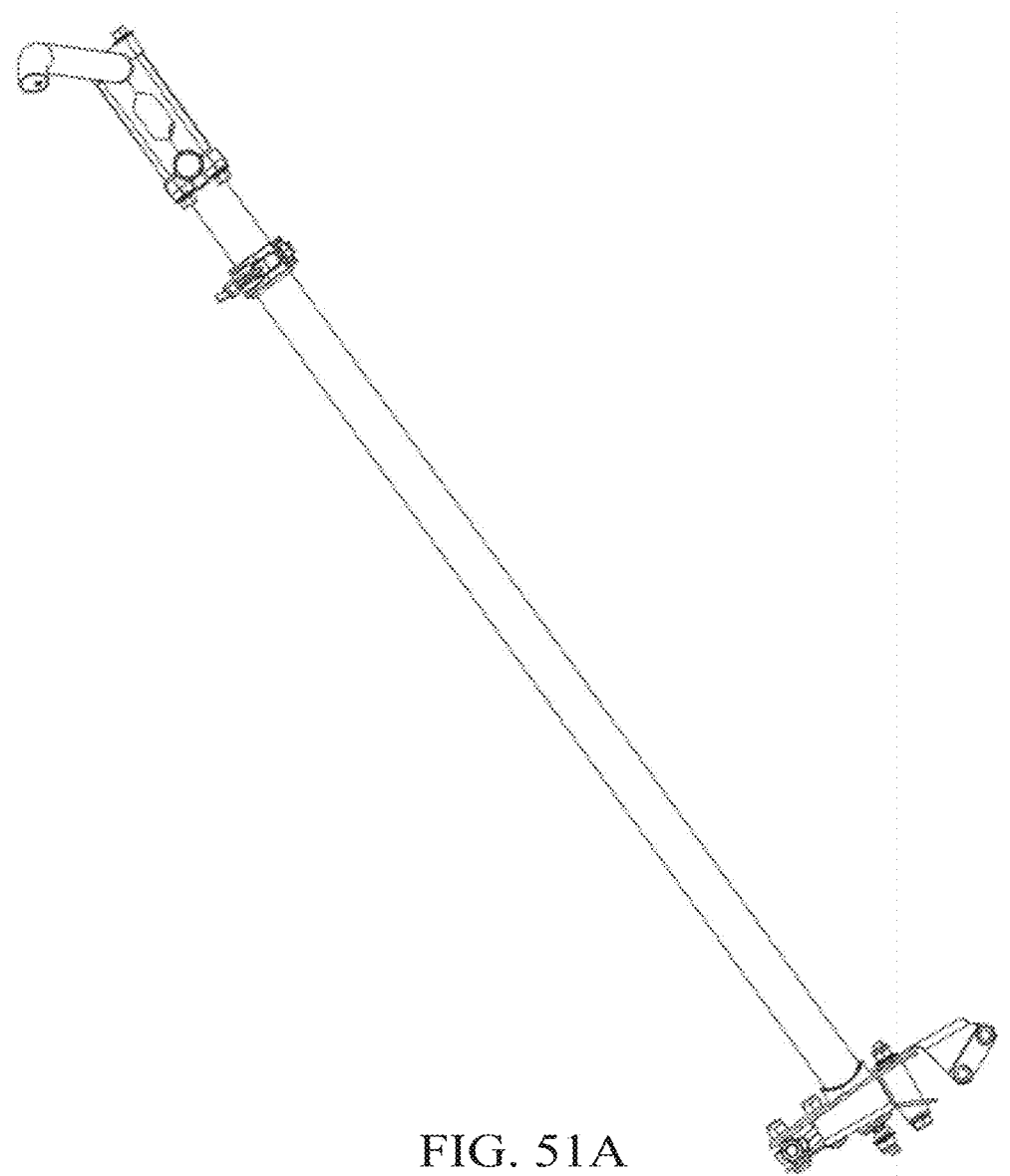
FIG. 51A illustrates a side view of the steering column assembly of FIG. 47, according to some embodiments.
Figure 51B:
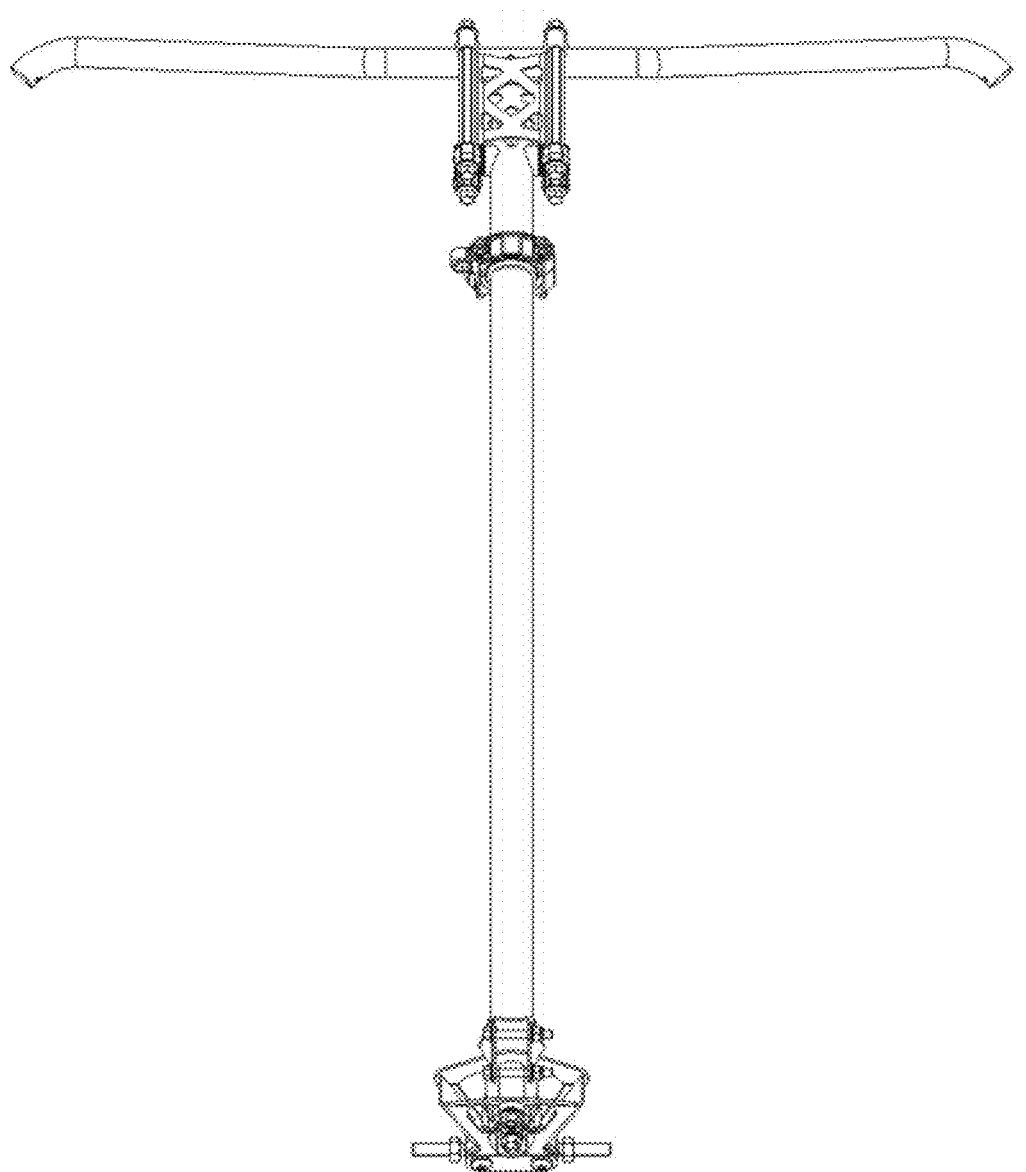
FIG. 51B illustrates a front view of the steering column assembly of FIG. 51A, according to some embodiments.

Optionally, the steering column mount component 328 includes a first side including a first steering mount 344 that is securable to the steering column assembly shown in FIGS. 41C, 51A and 51B, and a second side that includes a second steering mount 346 that is securable to the steering column assembly shown in FIGS. 41B, 50A and 50B, wherein the second side is positioned rearward of the first side along the longitudinal centerline.

Optionally, the first steering mount 344 is positioned forward along the longitudinal centerline of the forward frame assembly 312, of the heat exchanger assembly 174, and the tunnel 104.

Optionally, the first side 304 includes a rearward tube 338. The rearward tube 338 include a first end extending upward and forward from the metal sheet 334 to a steering column mount component 328, and a second end extending outward from the first side 304. A support member 122 is provided that includes a tube with a first end that is mated with the second end of the first side rearward tube 338 and a second end secured to a rearward portion of the tunnel 104 and/or support bracket 184. The rearward tube 338 of the first side 304 and the tube of the support member 122 define a continuous tubular length extending from the steering column mount component 328 to rearward of the foot support member 124 to a rear suspension component.

According to one or more aspects of the present disclosure, a method of assembling a snowmobile 100 is provided including providing a preassembled forward frame 312 including a front and rear, the forward frame 312 including a first side 304 and a second side 306. The first and second sides 304, 306 are spaced apart from each other to define a rear opening 314 at the rear of the forward frame 312. At least a portion of a heat exchanger assembly 174, a tunnel 104, or both are positioned in the rear opening 314 between the first side 304 and the second side 306. The preassembled forward frame 312 is then secured to the heat exchanger assembly 174, the tunnel 104, or both.

Optionally, each of the first side 304 and the second side 306 includes an inner perimeter 308 defining a side opening 310.

Optionally, the method includes inserting an engine 106 through the side opening 310 of the second side 306 and securing the engine 106 to the forward frame 312.

According to one or more aspects of the present disclosure, a method of assembling two different snowmobiles with a common forward frame, optionally on a common assembly line, is provided including providing a common forward frame, providing a first rear body component or a second rear body component, securing either the first body component or the second body component to the forward frame, and securing a track drive shaft 352 in a first position with respect to the forward frame when the first body component is secured to the forward frame or securing a track drive shaft 352 in a second position with respect to the forward frame when the second body component is secured to the forward frame, wherein the first position is different than the second position. In a non-limiting example, the first body component and the second body component are different tunnels. In a non-limiting example, the first body component and the second body component are different heat exchanger assemblies. In a non-limiting example, the first body component and the second body component are different support members 122. In a non-limiting example, the first body component and the second body component are different steering column assemblies. In a non-limiting example, the first body component and the second body component are different front suspensions. In a non-limiting example, the first body component and the second body component are different steering column assemblies. In a non-limiting example, the first body component and the second body component are different toe stops. In a non-limiting example, the first body component and the second body component are different bottom-out protectors.

Optionally, the method includes securing a belt housing assembly to the forward frame, the belt drive housing defining a track drive shaft opening, wherein the track drive shaft opening is located at a first position with respect to the forward frame when the forward frame is secured to the first rear body component, and wherein the track drive shaft opening is located at a second position with respect to the forward frame when the forward frame is secured to the second rear body component, wherein the first position is different than the second position.

Optionally, the first body component is a tunnel, a heat exchanger assembly component, or both. Optionally, the first body component is a running board assembly. Optionally, the second body component is a tunnel, a heat exchanger assembly, or both. Optionally the second body component is a running board assembly.

According to one or more aspects of the present disclosure, a method of assembling two types of snowmobiles with different drive track requirements is provided including providing a common forward frame, providing a first body component with a first drive track requirement and a second body component with a second drive track requirement that is different than the first drive track requirement, wherein at least a first engine mount is provided on one or more of the forward frame, the first body component, and the second body component, positioning either the first body component or the second body component adjacent the forward frame, and securing a belt housing assembly 354 to the first engine mount, the belt housing assembly 354 defining a track drive opening, wherein the track drive opening is located at a first position with respect to the first engine mount when the forward frame is secured to the first body component, and wherein the track drive opening is located at a second position with respect to the first engine mount when the forward frame is secured to the second body component, wherein the first position is different than the second position.

Optionally, the first body component is a tunnel, a heat exchanger assembly, or both. Optionally the first body component is a running board assembly. Optionally, the second body component is a tunnel, a heat exchanger assembly, or both. Optionally the second body component is a running board assembly.

According to one or more aspects of the present disclosure, a method of assembling two types of snowmobiles with different drive track requirements is provided including providing a common forward frame including a front and rear, the forward frame including a first side, and a second side spaced apart from the first side to define a rear opening at the rear of the forward frame. The method includes providing a first body component with a first drive track shaft position and a second body component with a second drive track shaft position that is different than the first drive track position. The method includes positioning either the first body component or the second body component in the rear opening between the first side and the second side, providing a belt drive housing that defines a track drive shaft opening, securing the belt housing assembly to the first side of the forward frame, wherein the track drive shaft opening is located at a first position with respect to the first side when the forward frame is secured to the first body component, and wherein the track drive shaft opening is located at a second position with respect to the first side when the forward frame is secured to the second body component, wherein the first position is different than the second position.

Optionally, each of the first side and the second side includes an inner perimeter defining a side opening.

Optionally, the belt housing assembly is secured to the first side for both body components with a jackshaft axis extending through the side openings of the first side and the second side, and a track drive shaft axis positioned outside of an outer perimeter of the first side and inside of an outer perimeter of the second side.

Optionally, the method includes inserting an engine through the side opening of the second side and securing the engine to the preassembled frame at a position between the first and second sides.

According to one or more aspects of the present disclosure, a front frame assembly 312 for a snowmobile 100 is provided including a front, a rear, and a longitudinal centerline. The forward frame 312 includes a first side 304 extending along the longitudinal centerline and a second side 306 extending along the longitudinal centerline and spaced apart from the first side 304. Each of the first side 304 and the second side 306 includes an inner perimeter 308 defining a side opening 310. The first side 304 and the second side 306 define a rear opening 314 at the rear of the forward frame 312 therebetween for receiving a heat exchanger assembly 174, a tunnel 104, or both therein.

Optionally, the first side 304 defines an outer perimeter 318, and the second side 306 defines an outer perimeter 318. A track drive shaft 352 extends across the forward frame 312 and is positioned rearward of the outer perimeter 318 of the first side 304 and forward of the outer perimeter 318 of the second side 306.

Optionally, the first side 304 defines an inner perimeter 308, the second side 306 defines an inner perimeter 308, and the track drive shaft 352 is positioned rearward of the inner perimeter 308 of the first side 304 and rearward of the inner perimeter 308 of the second side 306.

Optionally, the second side 306 includes a plate or metal sheet, hereinafter referred to as metal sheet 320, defining an aperture 322 for receiving the track drive shaft 352 therethrough when the metal sheet 320 is positioned to overlap an end cap 178 of the heat exchanger assembly 174, a side panel 182 of the tunnel 104, or both.

Optionally, the aperture of the metal sheet 320 of the second side 306 defines is shaped to receive the track drive shaft 352 in a first position 322 or a second position 324 that is different than the first position.

Optionally, the second side 306 includes a support tube or rearward leg, hereinafter referred to as rearward leg 326, extending upward and forward from the metal sheet 320 to a steering column mount component 328, a support tube or forward leg, hereinafter referred to as forward leg 330, extending upward and rearward to the steering column mount component 328, and a horizontal member 331 substantially extending along the longitudinal centerline from the forward leg 330 to the rearward leg 326. An upper end of the metal sheet 320 is shaped to support a rearward end of the horizontal member 331 and is removably secured thereto, and the rearward end of the horizontal member 331 is vertically positioned higher than a forward end of the tunnel 104.

Optionally, the first side 304 includes a metal sheet or plate, hereinafter referred to as metal sheet 334, defining an aperture for securing a belt housing assembly 354 thereto when the metal sheet 320 is positioned to overlap an end cap 178 of the heat exchanger assembly 174, a side panel 182 of the tunnel 104, or both.

Optionally, the metal sheet 334 of the first side 304 defines a first aperture therein for securing the belt housing assembly 354 in a first position as shown in FIG. 42A, and a second aperture therein for securing the belt housing assembly 354 in a second position as shown in FIG. 42C that is different than the first position.

Optionally, the first side 304 includes a rearward leg 338 extending upward and forward from the metal sheet 334 to a steering column mount component 328, a forward leg 330 extending upward and rearward to the steering column mount component 328, and a horizontal member 342 substantially extending along the longitudinal centerline from the forward leg 330 to the rearward leg 326, and a rearward end of the horizontal member 342 is vertically positioned higher than a forward end of the tunnel 104.

Optionally, a jack shaft extends across the forward frame 312 and is positioned beneath the horizontal member 342 of the first side 304.

Optionally, a steering column mount component 328 extends between the first side 304 and the second side 306, wherein the first side 304 and the second side 306 each includes a leg extending upward and forward from the rear of the forward frame to the steering column mount component.

Optionally, the steering column mount component 328 includes a first side including a first steering mount, and a second side that includes a second steering mount, wherein the second side is positioned rearward of the first side along the longitudinal centerline.

Optionally, the first steering mount is positioned forward along the longitudinal centerline of the heat exchanger and the tunnel.

Optionally, the first side 304 includes a rearward tube 338 including a first end extending upward and forward from the metal sheet 334 to a steering column mount component 328, and a second end extending outward from the first side 304, and further including a support member 122 including a tube with a first end that is mated with the second end of the first side tube and a second end secured to a rearward portion of the tunnel 104 and/or support bracket 184, wherein the rearward tube 338 of the first side and the tube of the support member 122 define a continuous tubular length extending from the steering column mount component 328 to a rear suspension component, and/or rearward of the foot support member 124.

In an embodiment, a method of assembling two different types of snowmobiles with a common forward frame 312 is provided that includes providing a common forward frame 312 including a longitudinal centerline and a support member 122 mounting point 317 positioned outboard of the longitudinal centerline, providing a first running board assembly 120A including a support member 122A; providing a second running board assembly 120B including at least one component that is different than at least one component of the first running board assembly, the second running board assembly 120B including a support member 122B, and securing either the first running board assembly 120A or the second running board assembly 120B to the mounting point 317, wherein the first running board assembly 120B is located at a first position with respect to the longitudinal centerline of the forward frame 312 when secured to the mounting point 317, and wherein the second running board assembly 120B is located at a second position with respect to the longitudinal centerline of the forward frame 312 when secured to the mounting point 317, wherein the first position is different than the second position.

Optionally, each running board assembly includes a foot support member 124, a support member 122, and optionally a support bracket 184. Optionally, the foot support member 124 is a fiber reinforced polymer composite, and the support member 122 is a hollow tube.

Optionally, the mounting point 317 extends outward and forwardly from the forward frame 312. Optionally, the mounting point 317 is positioned below an upper surface of a portion of the tunnel 104 that is secured to the forward frame 312. Optionally, the support member 122 of the first running board assembly 120A extends outward from the centerline of the vehicle farther than the support member 122B of the second running board assembly 120B.

Optionally, the common forward frame 312 includes an A-arm mounting point, and the method may further comprise providing a first suspension assembly (FIGS. 47 and 54) including a control arm and a spindle 492 that includes a lower A-arm ball joint, providing a second suspension assembly (FIGS. 46 and 53) that is different than the first suspension assembly, the second suspension assembly including a control arm and a spindle 490 that includes a lower A-arm ball joint, and securing the A-arm of the first suspension assembly to the A-arm mounting point when the first running board assembly 120A is secured to the mounting point 317 or the second suspension assembly to the A-arm mounting point when the second running board assembly 120B is secured to the mounting point 317, wherein optionally the first lower A-arm ball joint is positioned at a different position with respect to the common forward frame 312 than the second lower A-arm ball joint when the respective suspension assembly is secured to the common forward frame 312. The first suspension assembly may comprise the assemblies disclosed in U.S. Provisional Patent Application No. 63/310,254 filed Feb. 15, 2022, and entitled "Recreational Vehicle Spindle", U.S. Provisional Patent Application No. 63/404,856 filed Sep. 8, 2022, and entitled "Recreational Vehicle Spindle", and U.S. patent application Ser. No. 17/982,748 filed on Nov. 8, 2022, and entitled "Recreational Vehicle Spindle," the contents of each is incorporated by reference in its entirety. The second suspension assembly may comprise the assemblies disclosed in U.S. Provisional Patent Application No. 63/310,276 filed Feb. 15, 2022, and entitled "Spindle for a Recreational Vehicle", U.S. Provisional Patent Application No. 63/404, 841 filed Sep. 8, 2022, and entitled "Spindle for a Recreational Vehicle," and U.S. patent application Ser. No. 17/988,304 filed on Nov. 16, 2022, and entitled "Spindle for a Recreational Vehicle," the contents of each is incorporated by reference in its entirety.

Optionally, the support member 122A of the first running board assembly 120A extends outward from the centerline of the vehicle farther than the support member 122B of the second running board assembly 120B, and the lower A-arm ball joint of the first suspension assembly is positioned outward from the centerline of the vehicle a greater distance than the lower A-arm ball joint of the second suspension assembly.

Optionally, wherein the support member 122A of the first running board assembly 120A extends outward from the centerline of the vehicle farther than the support member 122B of the second running board assembly 120B, and the lower A-arm ball joint of the first suspension assembly is positioned farther forward with respect to the common forward frame 312 than the lower A-arm ball joint of the second suspension assembly.

Optionally, wherein the support member 122A of the first running board assembly 120A extends outward from the centerline of the vehicle farther than the support member 122B of the second running board assembly 120B, and the lower A-arm ball joint of the first suspension assembly is positioned along the centerline of the common forward frame 312 farther forward from the mounting point 317 than the lower A-arm ball joint of the second suspension assembly.

Figure 46:
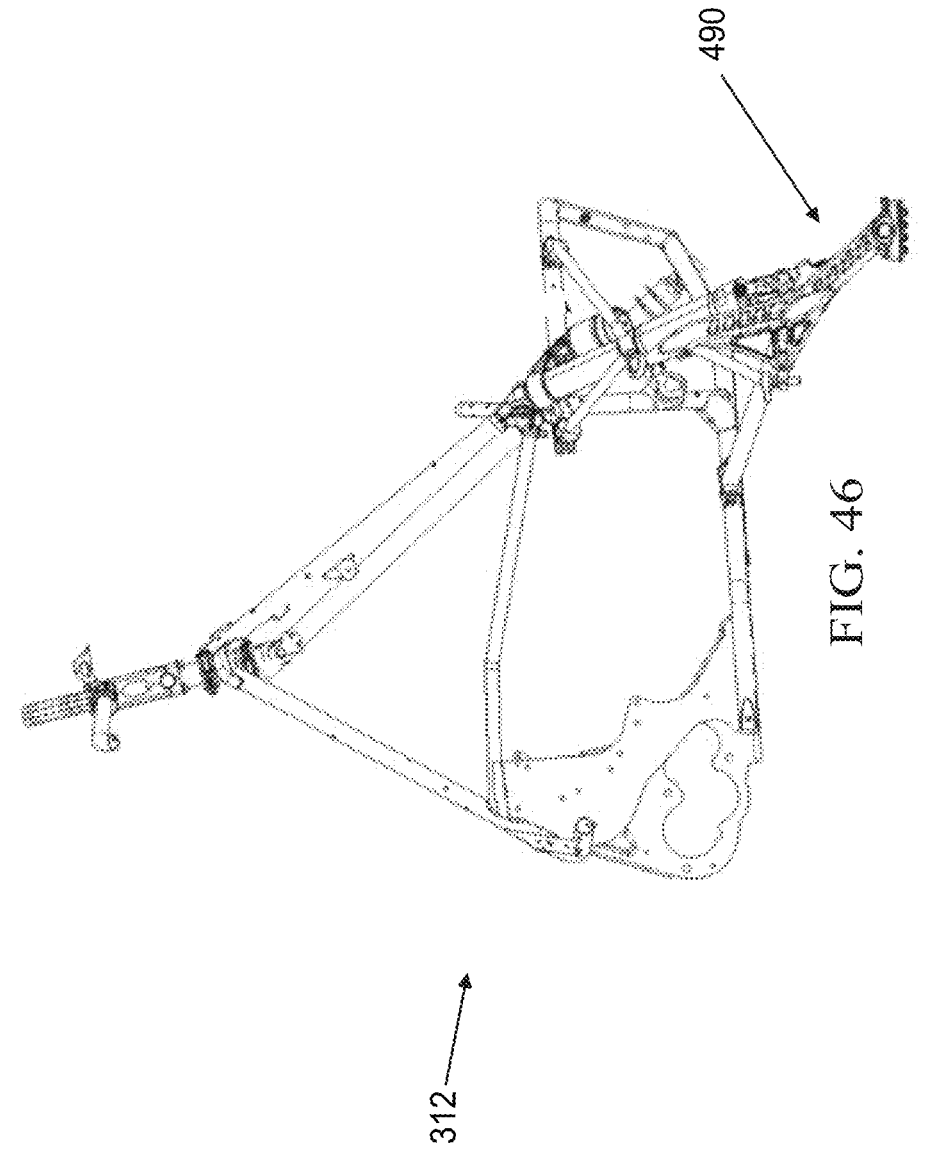
FIG. 46 illustrates a side view of a forward frame assembly with a steering column and suspension components associated with the second snowmobile of FIG. 8, according to some embodiments.
Figure 47:
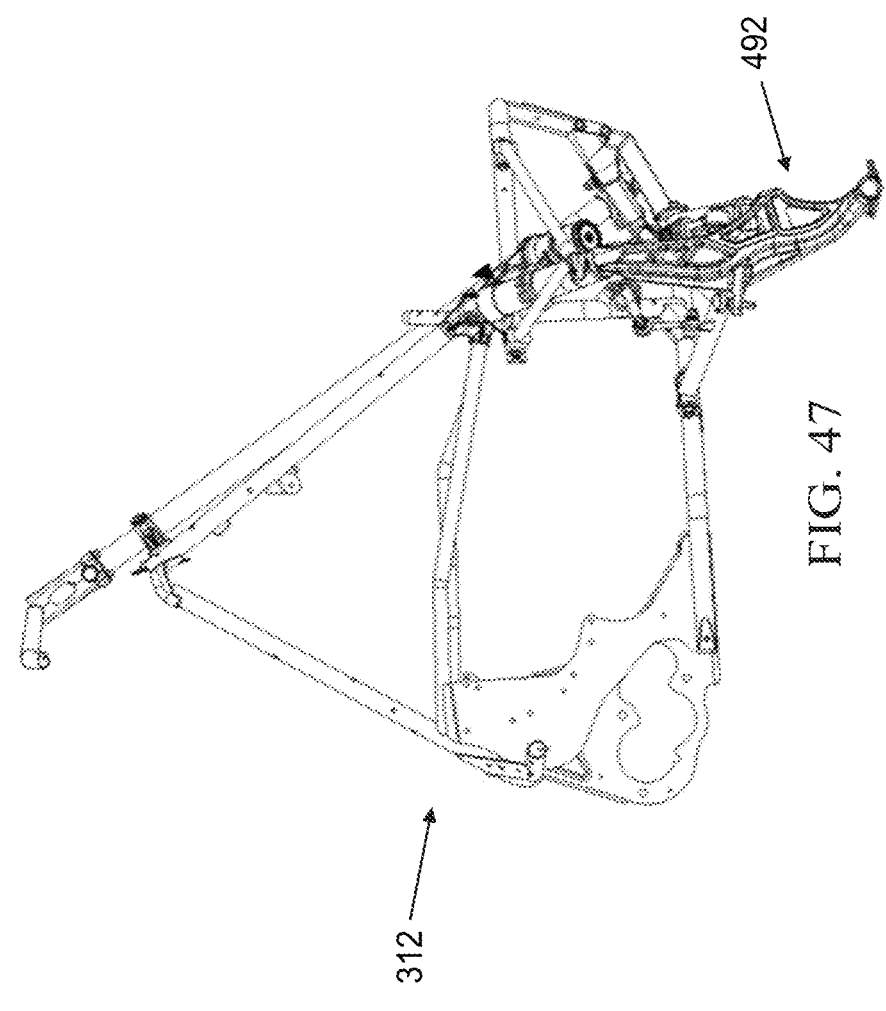
FIG. 47 illustrates a side view of the forward frame assembly with a steering column and suspension components associated with the first snowmobile of FIG. 1, according to some embodiments.
Figure 48:
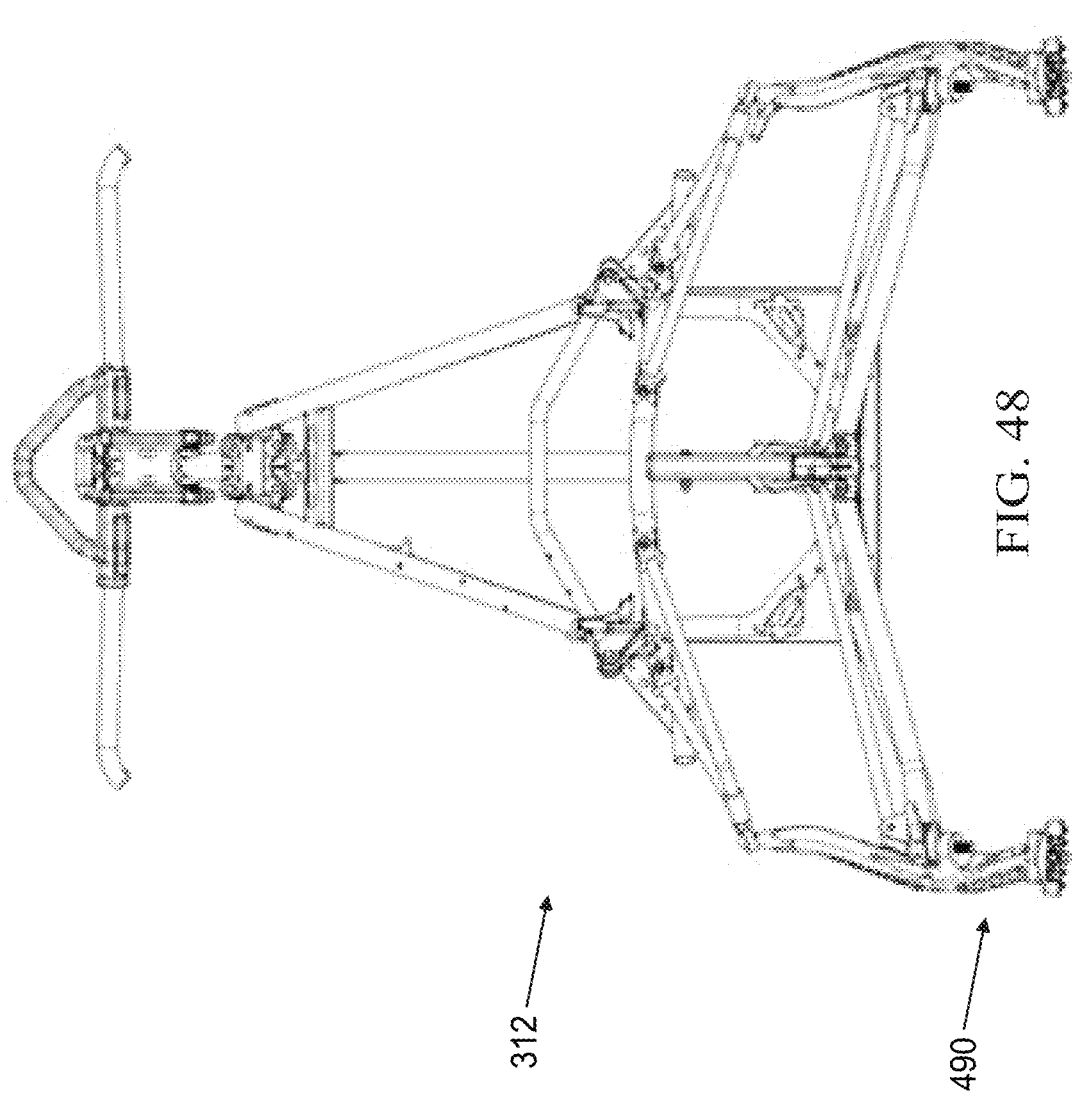
FIG. 48 illustrates a front view of the assembly of FIG. 46, according to some embodiments.
Figure 49:
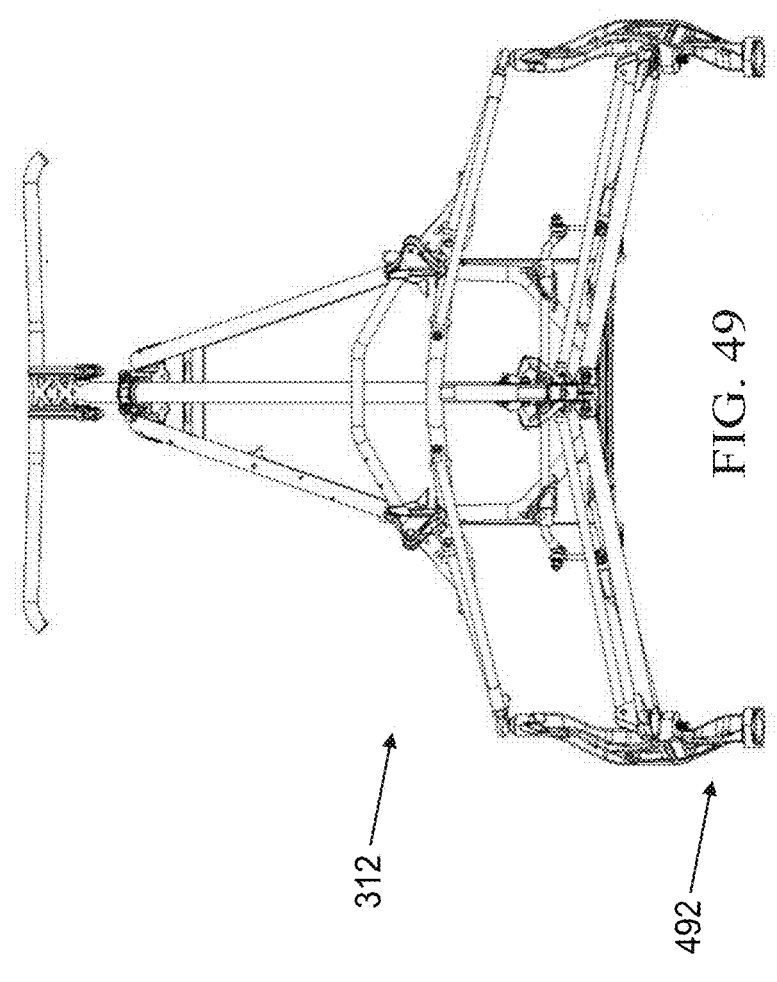
FIG. 49 illustrates a front view of the assembly of FIG. 47, according to some embodiments.
Figure 53:
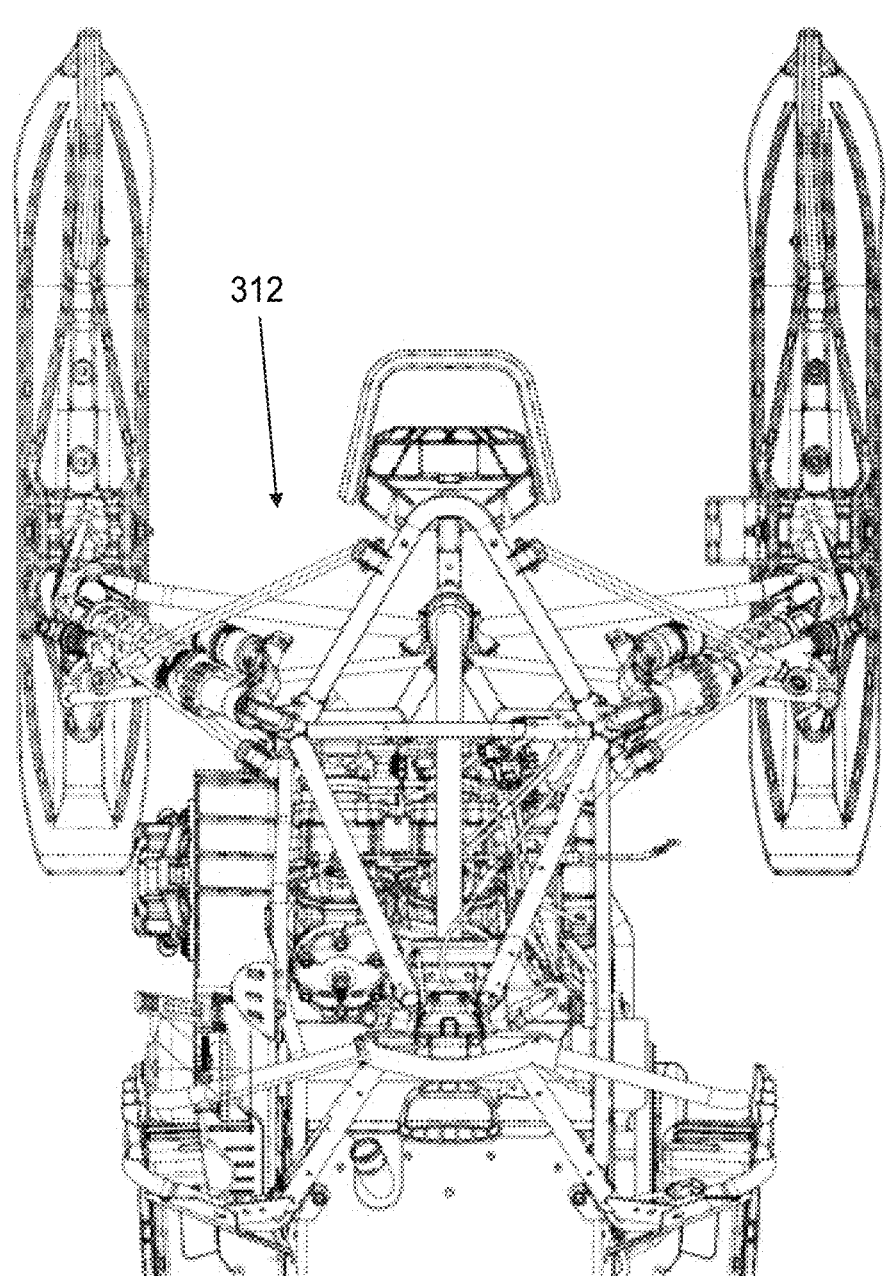
FIG. 53 illustrates a top-down view of the forward frame assembly, suspension, and engine components associated with the second snowmobile of FIG. 8, according to some embodiments.
Figure 54:
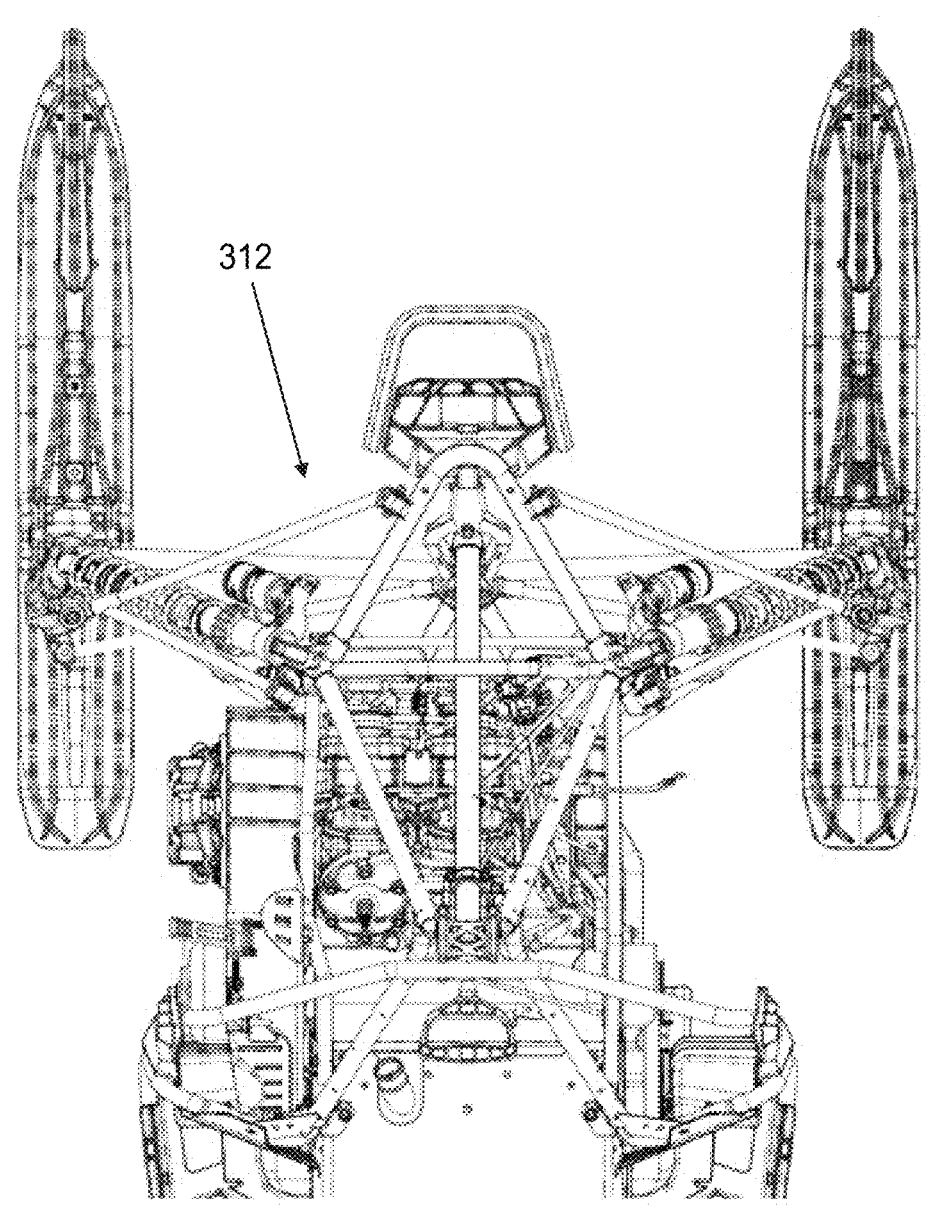
FIG. 54 illustrates a top-down view of the forward frame assembly, suspension, and engine components associated with the first snowmobile of FIG. 1, according to some embodiments.

In a non-limiting example, different snowmobile models may be assembled using a common forward frame assembly by changing one or more of a spindle, a suspension component such as a control or A-arm, and a steering assembly between models. FIGS. 46 and 47 illustrates a side view of a common forward frame assembly 312 with different suspension components including a second spindle 490 and a first spindle 492, according to some embodiments. FIGS. 48 and 49 show a front view of the two different models utilizing the common forward frame assembly. As shown in FIGS. 49 and 54, the model with the first spindle 492 may have a wider width or stance than the model shown in FIGS. 48 and 53 with the second spindle 490. This difference in width may be configured by providing different control arms for the different models (that extend different distances from the vehicle longitudinal centerline). The location of the spindles 490/492 (and/or at least a portion of the attached skis) may be positioned at different locations along the longitudinal centerline of the vehicle. As shown in FIG. 53, the model may position the second spindle 490 and/or the rearward end of the ski attached to the second spindle 490 farther forward along the longitudinal centerline (and farther forward with respect to the forward frame) than the model with the first spindle 492 and/or the rearward portion of the ski attached to the first spindle 492 (those being positioned further rearward along the longitudinal centerline and further rearward with respect to the forward frame). The height of the two different models may be the same, or different. It is also to be understood that the steering assembly may be the same or different for the different models and may extend forward (FIG. 47) or rearward (FIG. 48) of a steering column bracket (shown in FIGS. 56A, B, C) positioned at the upper portion of the forward frame.

Figure 52A:
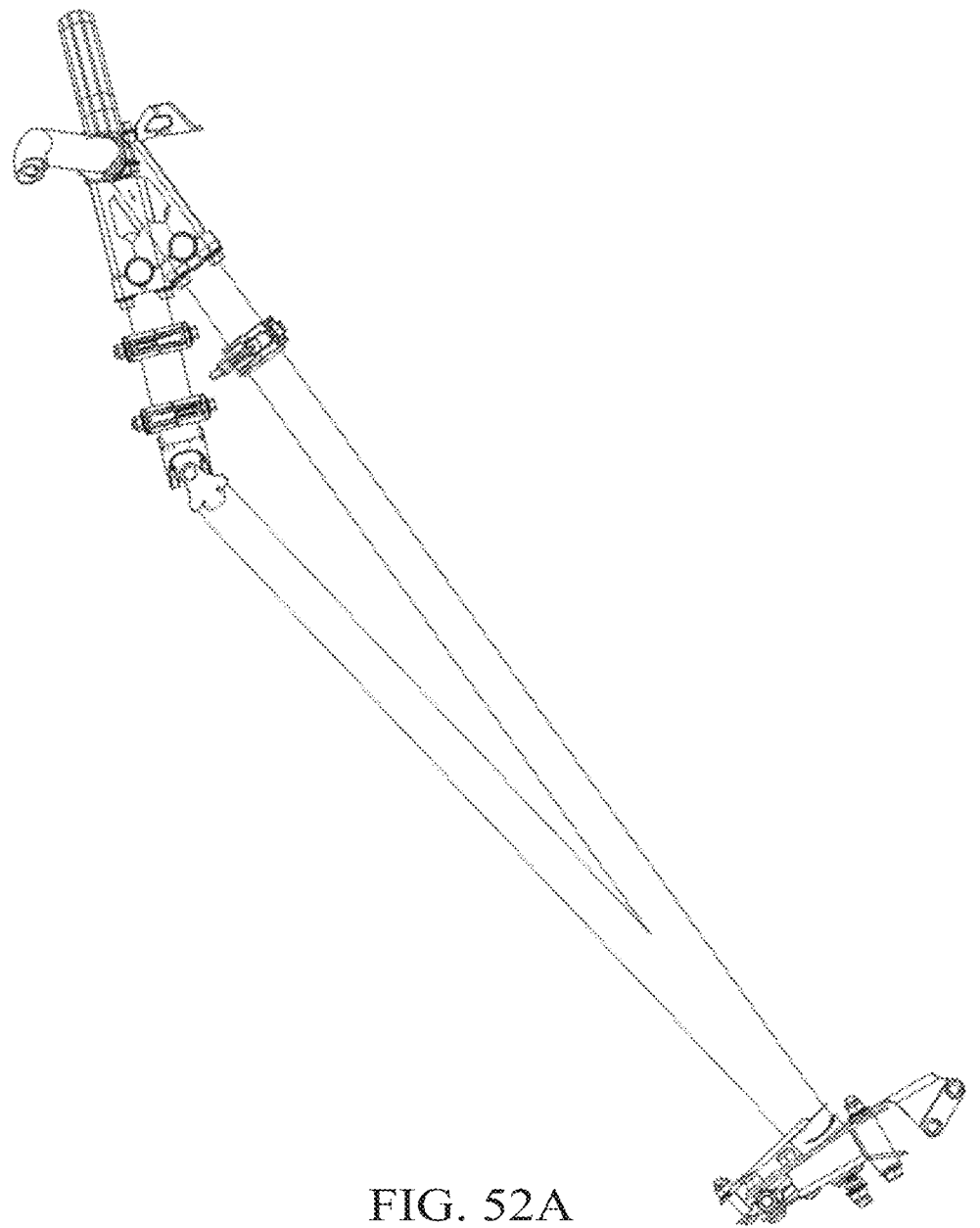
FIG. 52A illustrates a side view of the steering column assembly of FIG. 50A superimposed with the steering column assembly of FIG. 51A, according to some embodiments.
Figure 52B:
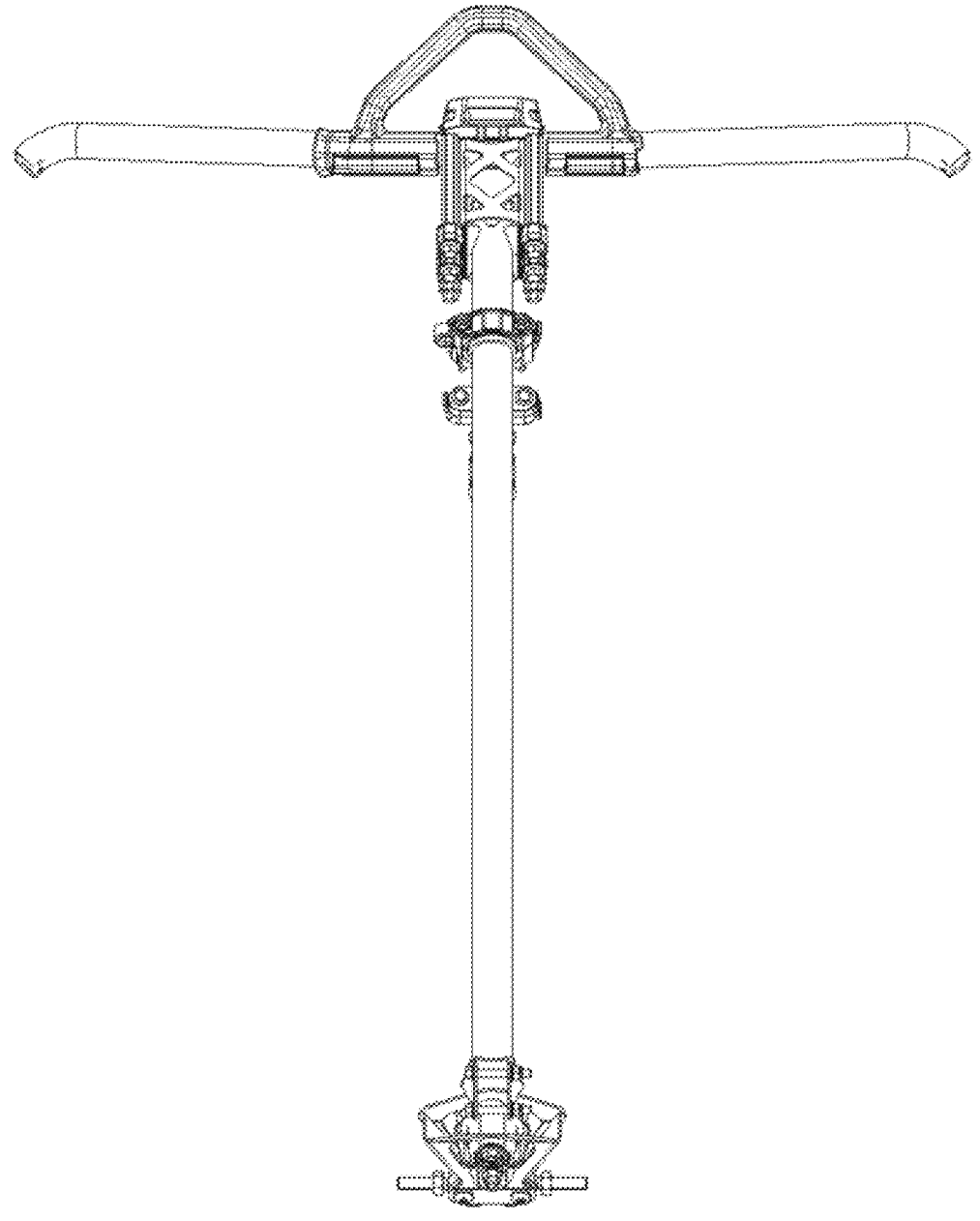
FIG. 52B illustrates a front view of the steering column assembly of FIG. 50B superimposed with the steering column assembly of FIG. 51B, according to some embodiments.

FIGS. 50A-B illustrate side and front views of a steering column assembly used in the assembly of FIGS. 46 and 48, according to some embodiments. FIGS. 51A-B illustrate side and front views of the steering column assembly used in the assembly of FIGS. 47 and 49, according to some embodiments. FIGS. 52A-B illustrate side and front views of the different steering column assemblies superimposed for comparison of the location of the different steering column assemblies when mounted to the forward frame, according to some embodiments. In a non-limiting example, the lower forward end of both steering columns are secured to the same location on the forward frame assembly 312.

FIGS. 53 and 54 illustrate a top-down view of forward frame, suspension, and engine components in a second configuration (FIG. 53) and a first configuration (FIG. 54), according to some embodiments.

Figure 56A:
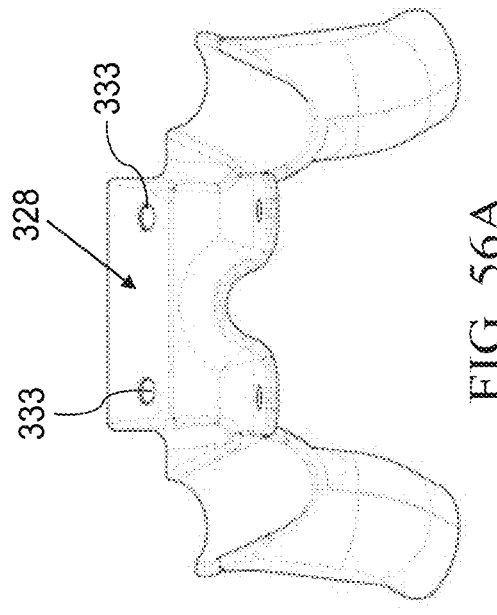
FIG. 56A illustrates a top perspective view of a steering column bracket, according to some embodiments.

FIG. 55 illustrates a top-down view of a forward frame assembly with steering column bracket, according to some embodiments; and FIGS. 56A-C illustrate perspective views of a steering column bracket, according to some embodiments. The steering column bracket may include the one described in U.S. Provisional Patent Application No. 63/344,165 filed on May 20, 2022, and entitled "Snowmobile Frame," the contents of which are incorporated by reference in its entirety.

Figure 57:
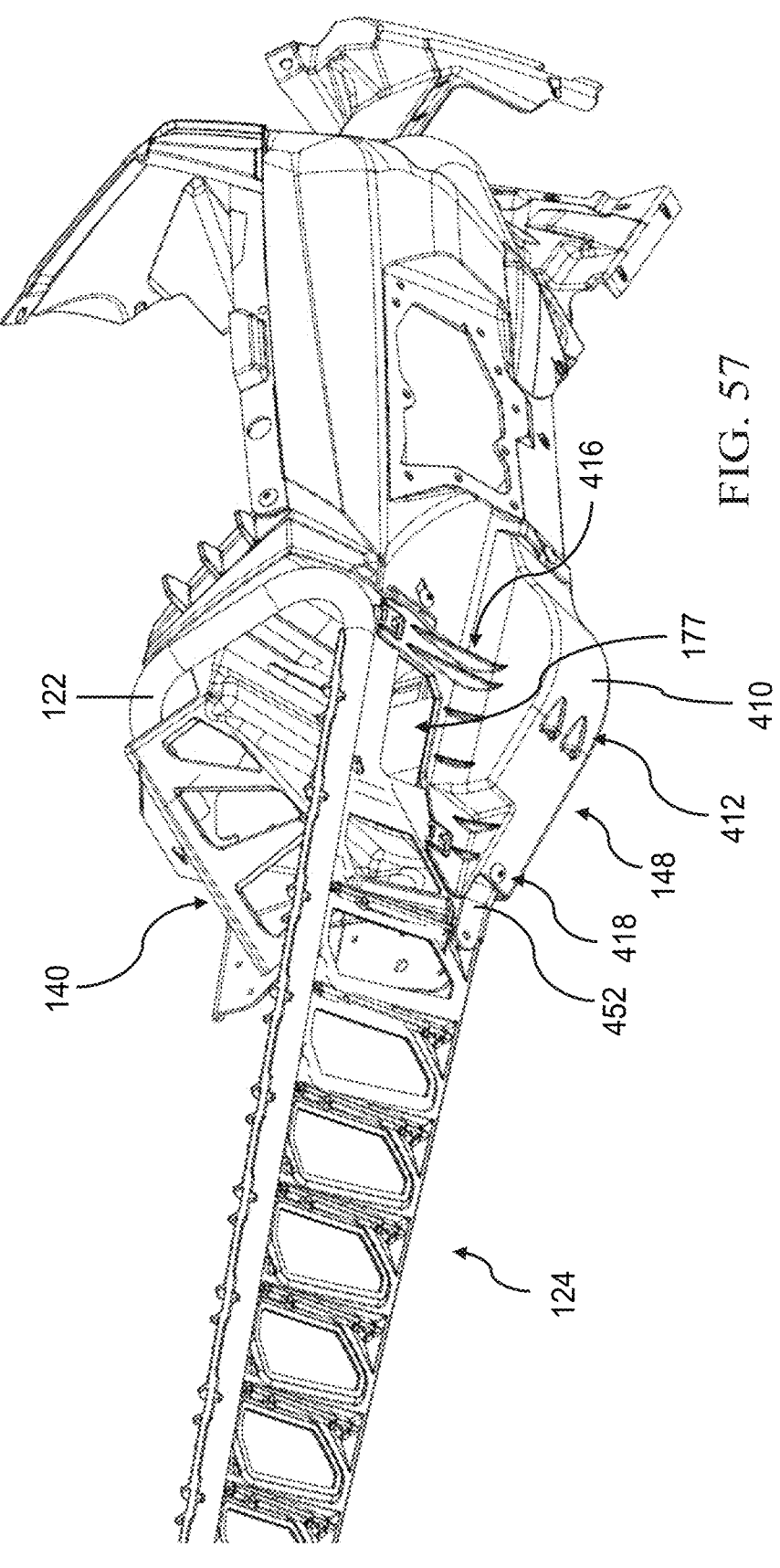
FIG. 57 illustrates a bottom perspective view of an assembly comprising a toe stop, bottom-out protector, running board components, and a body panel, according to some embodiments.

FIG. 57 is a view of a polymeric assembly including one or more of the foot support member 124, the toe stop 140, the bottom out protector 148, a rear kick-up panel 146 (not shown) and a body panel 400 or 402. The polymeric assembly may extend from the front of the vehicle to the bumper 530. Optionally, the polymeric assembly comprises one or more components that are positioned outboard of the side panel 182 of the tunnel 104 and extend rearward from the track drive shaft 352 to a point rearward of the fuel tank 650, and optionally to the bumper 530.

FIG. 58 is a side view of two different running board support tubes 122A, 122B used for two different models for comparison purposes. As shown, the one model (high performance) includes the support tube 122A that extends further outboard from the forward frame and is secured to the suspension assembly at a point higher than the support tube 122B for the other model that does not extend outboard as far from the forward frame.

Figure 63:
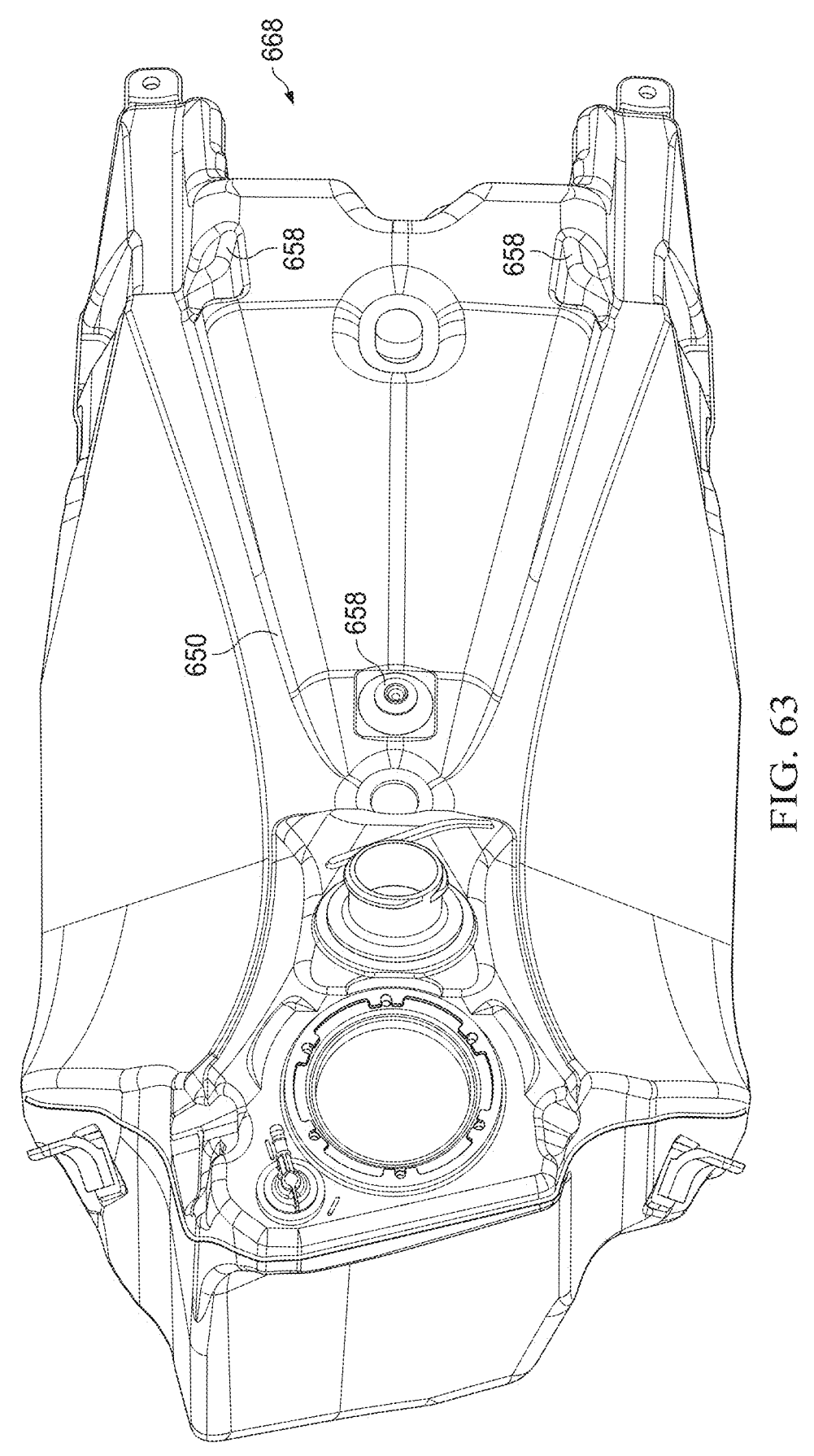
FIG. 63 illustrates a top view of the fuel tank of the seat assembly of FIG. 59, according to some embodiments.
Figure 64:
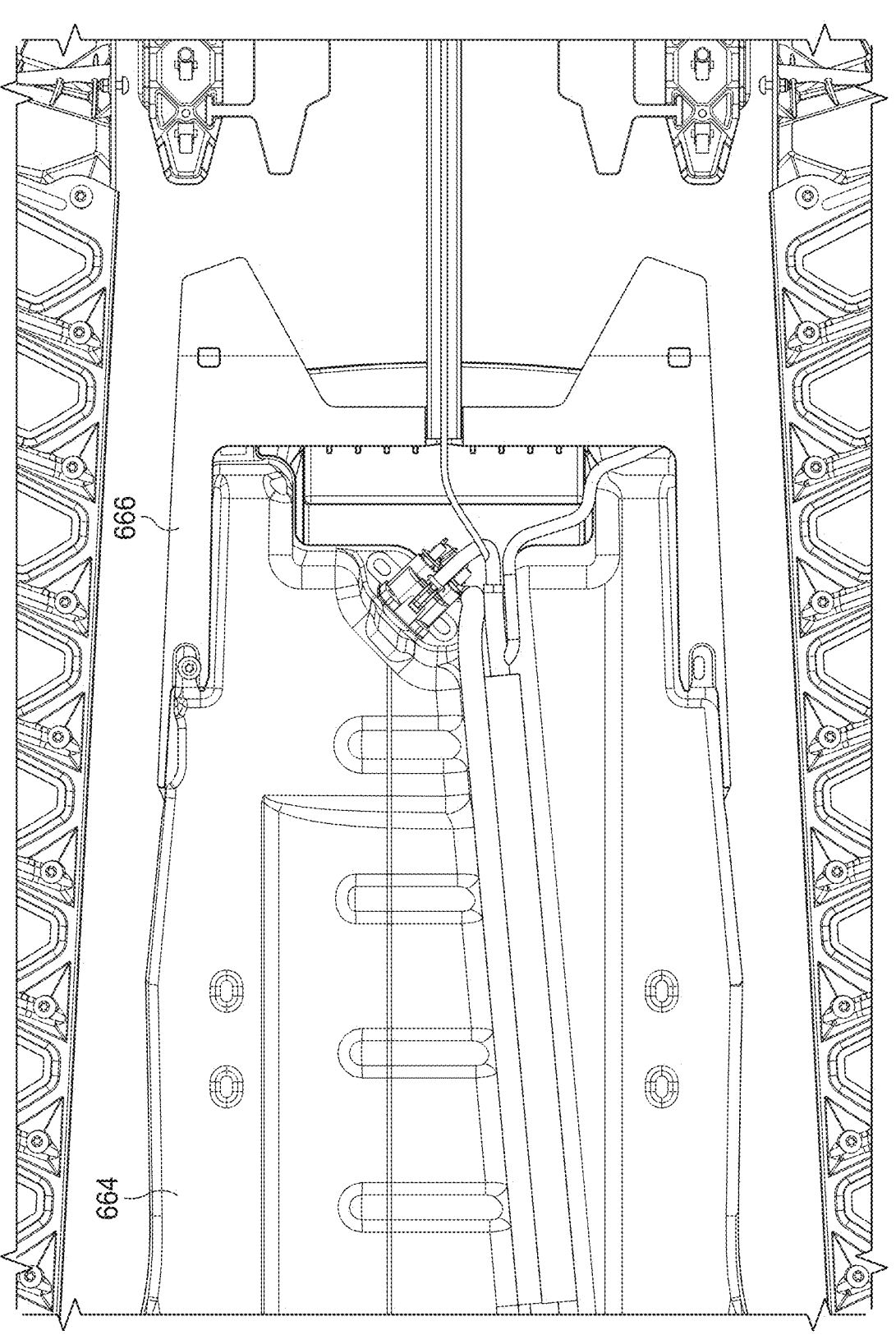
FIG. 64 illustrates a bottom view of the fuel tank and the rear panel of the seat assembly of FIG. 59, according to some embodiments.
Figure 65:
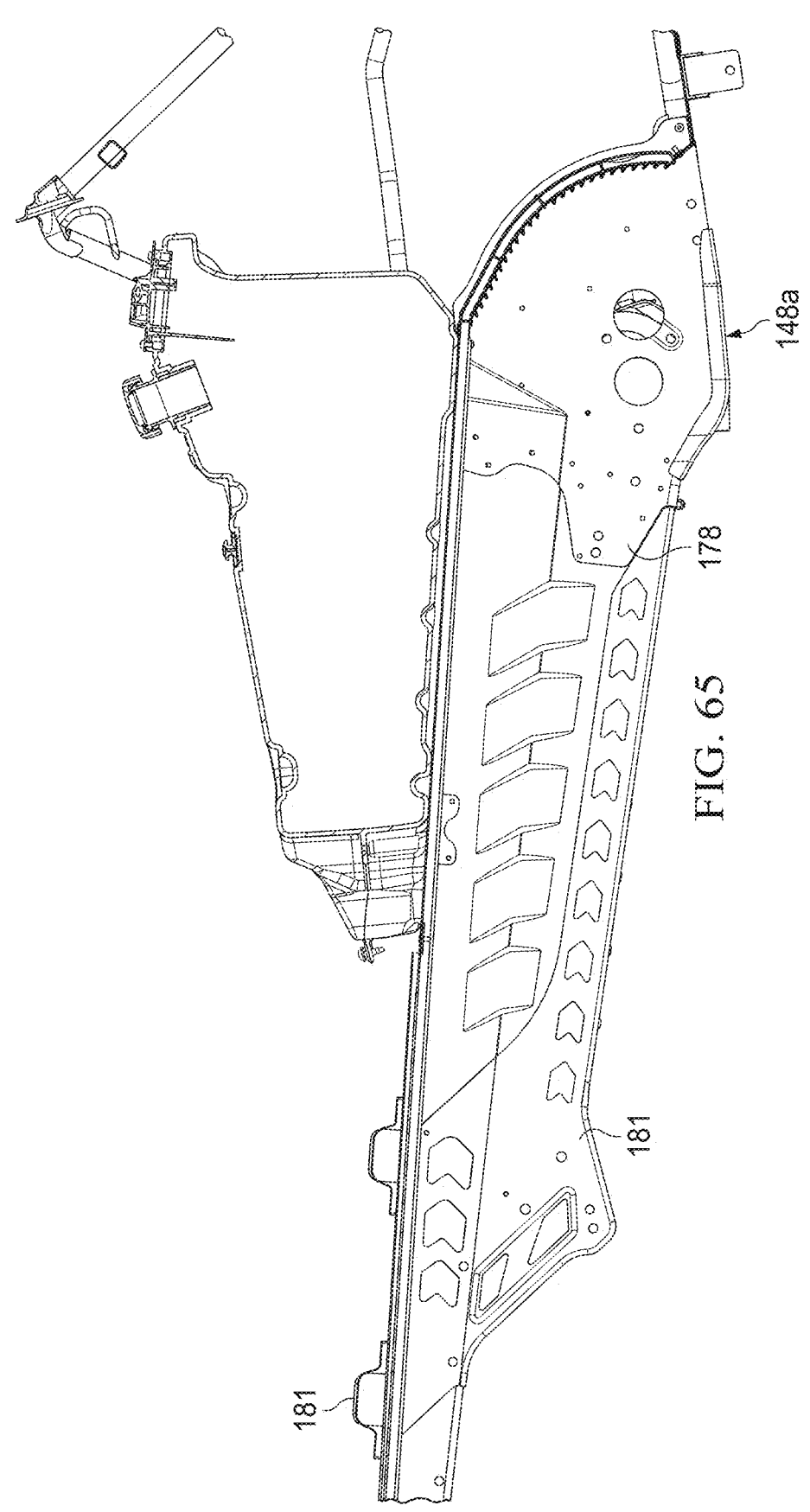
FIG. 65 illustrates a right side cross-sectional view of the fuel tank, the tunnel, the heat exchanger assembly, and the forward frame assembly, according to some embodiments.
Figure 66:
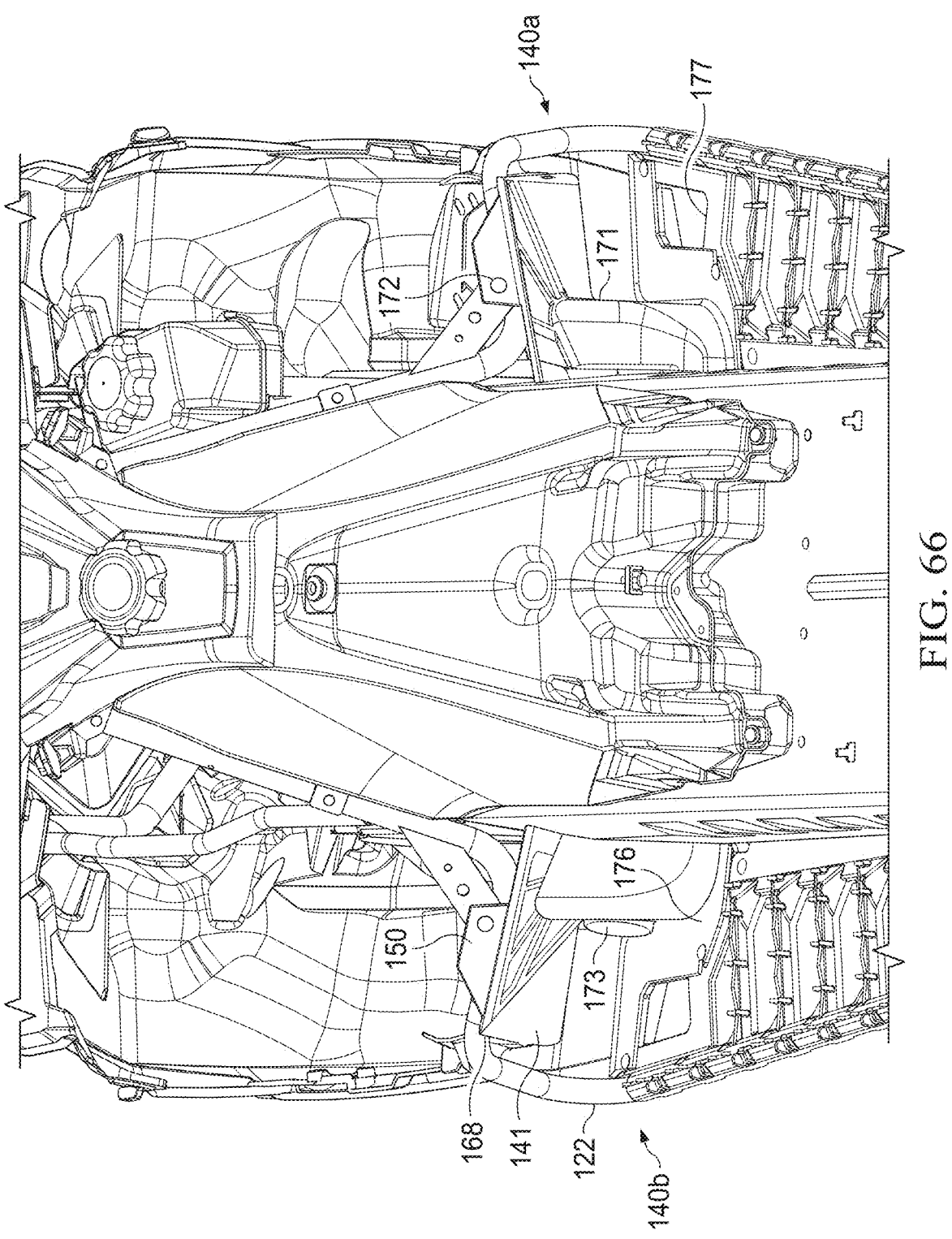
FIG. 66 illustrates a perspective top view of the fuel tank, toe stop, and running board components configured for the first snowmobile of FIG. 1, according to some embodiments.
Figure 67:
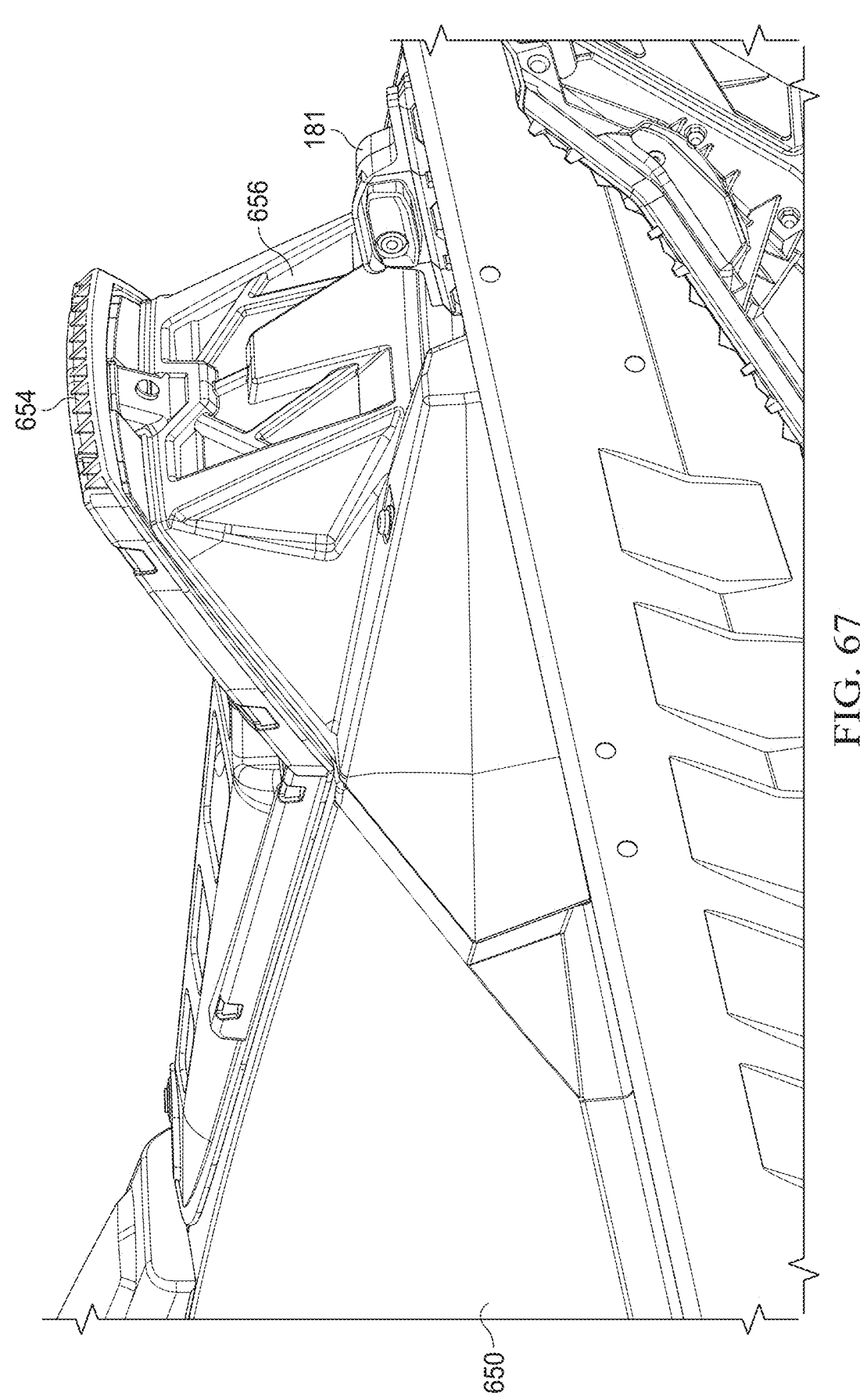
FIG. 67 illustrates an isometric view of the seat assembly, according to some embodiments.
Figure 68:
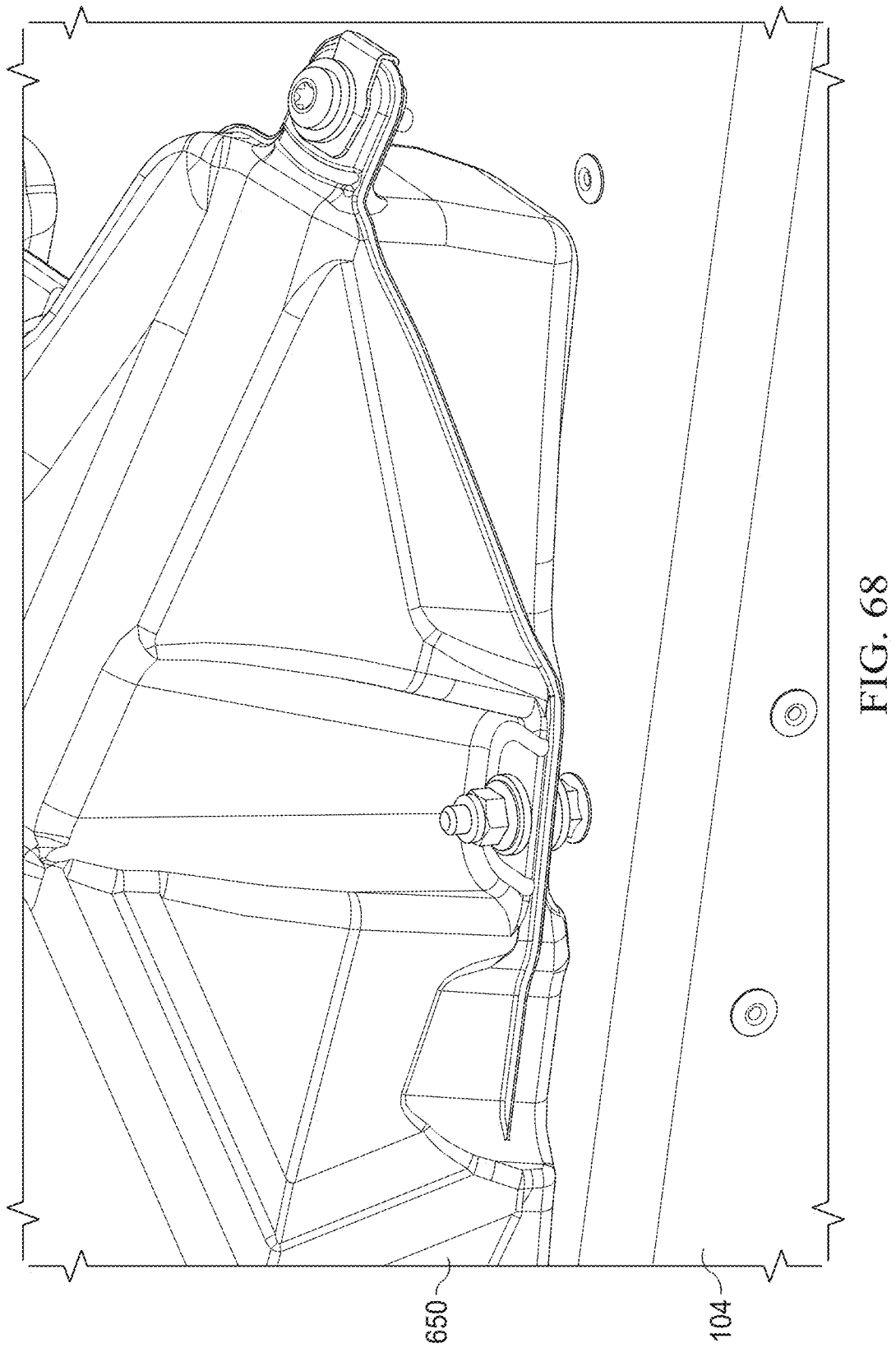
FIG. 68 illustrates an isometric view of the fuel tank of the seat assembly secured to the tunnel, according to some embodiments.

FIGS. 59-68 illustrate a seat support assembly in an illustrative embodiment. The support assembly may include a fuel tank 650 with mounting features 658 for securing a seat or seat frame 652 thereto. A rear panel 656 slidingly engages the fuel tank 650 to define a compartment 668 therebetween that may be used for storage or to house a battery 660 therein. The mounting features 658 may be integral with the fuel tank 650 and may provide a locking feature with the seat frame to provide for more stability both vertically, laterally, and in the forward/rearward directions. The mounting features 658 may be positioned on a raised portion of the fuel tank that may have a triangular shape that is at least partially surrounded by a flat or flangelike surface. A seat fastener feature 662 may be provided on the rear panel 656 for engaging a portion of the seat or the seat frame 652. The underside 664 of the fuel tank 650 may be upwardly recessed along the lower perimeter to slidingly receive extensions 666 of the rear panel 656 therealong so that the extensions 666 of the rear panel 656 are positioned between the underside 664 of the fuel tank 650 and the upper surface of the tunnel. As shown in FIG. 65, a removable accessory mount 181 may be secured to both the tunnel 104 and the support bracket 184. As shown in FIG. 63, the fuel tank 650 may have a convex outer shape and may be almost entirely contained within the rider envelope (all positioned inboard of the upper legs of the front frame member and greater than 95% of the fuel tank volume is positioned inboard of the tunnel side walls, and optionally greater than 97% of the fuel tank volume is positioned inboard of the tunnel side walls, and optionally 99% or greater. The seat assembly may include the one described in U.S. Provisional Patent Application No. 63/350,553 filed on Jun. 9, 2022, and entitled "Snowmobile with Seat and Gas Tank Assembly," U.S. Provisional Patent Application No. 63/404,682 filed on Sep. 8, 2022, and entitled "Snowmobile with Seat Assembly," and U.S. patent application Ser. No. 17/988,111 filed on Nov. 16, 2022, and entitled "Fuel Tank and Seat Assembly for a Vehicle," the contents of each of which are incorporated by reference in its entirety.

Figures 69A, 69B:
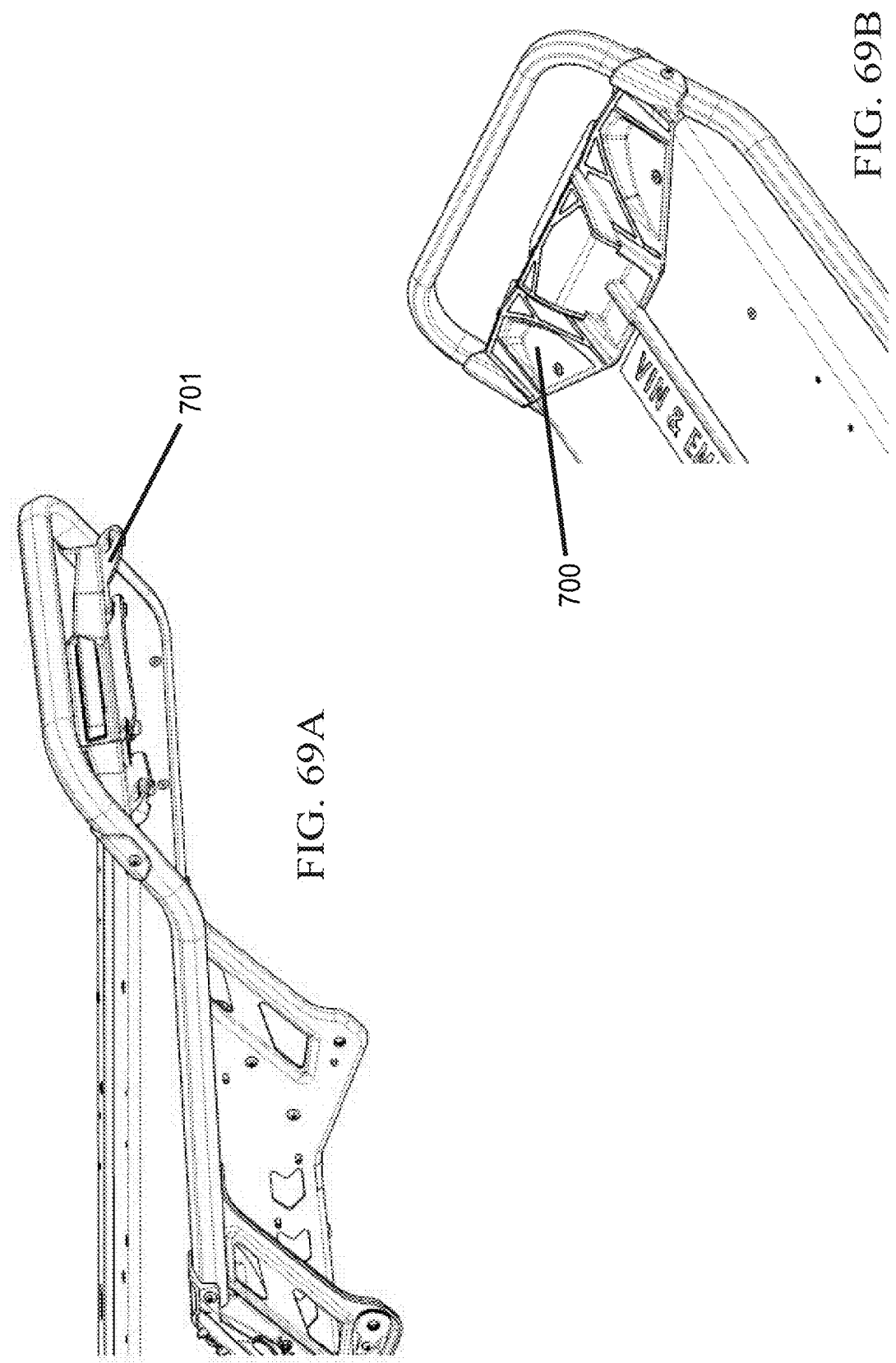
FIG. 69A illustrates an isometric view of a structural composite taillight housing, according to some embodiments.
FIG. 69B illustrates an isometric view of the structural composite taillight housing of FIG. 69A, according to some embodiments.
Figure 70A:
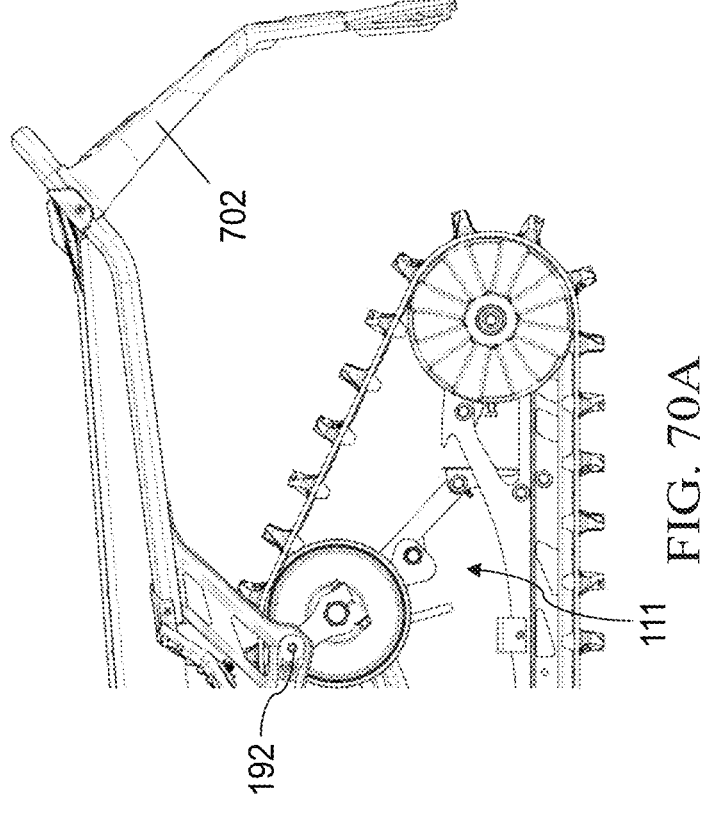
FIG. 70A illustrates a left side view of a snowmobile with a snow flap secured to the structural composite taillight housing of FIG. 69A, according to some embodiments.
Figure 70B:
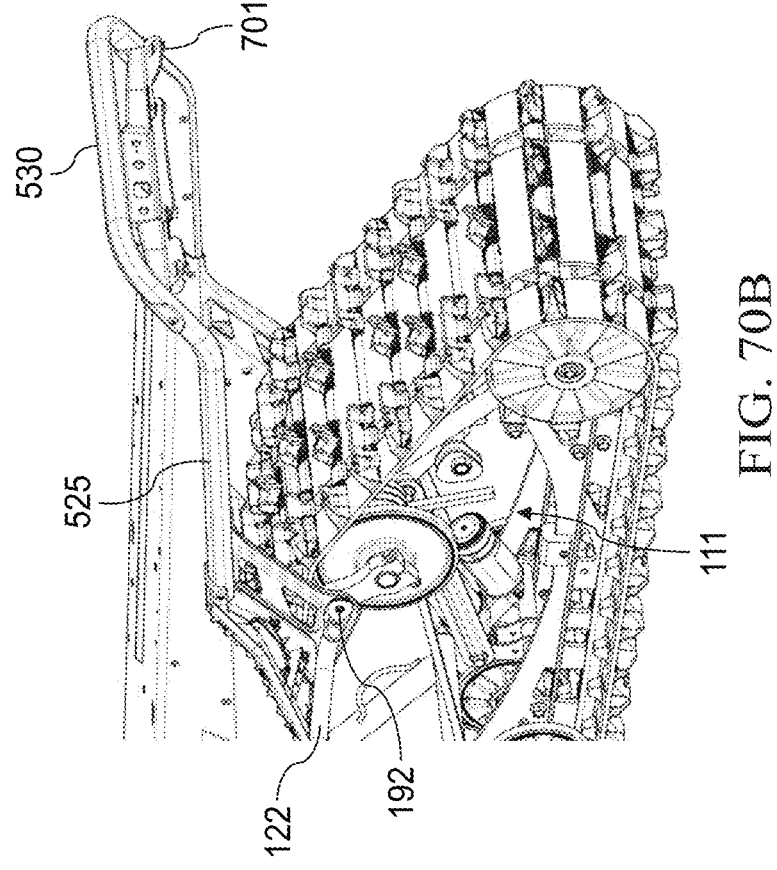
FIG. 70B illustrates an isometric view of a structural composite taillight housing of FIG. 69A with a mounting point, according to some embodiments.

FIGS. 69 and 70 show a structural composite taillight housing 700 that is positioned on the upper surface of the rearward end of the tunnel 104. The composite may comprise a polymeric matrix and a fiber reinforcement. The structural composite taillight housing 700 houses the taillight and provides a structural reinforcement on the upper surface of the rearward end of the tunnel 104 that optionally may allow for thinner gauges of tunnel material and may optionally eliminate internal tunnel reinforcements at the rearward end. The structural composite taillight housing 700 also provides a plurality of mounting points 701 for a snow flap 702 that helps to maintain the snow flap position away from the track and rear suspension components. As shown in FIGS. 69 and 70, the ends of the structural composite taillight housing 700 extend around the sides of the rear bumper or grab bar and may engage the outer sides of the snow flap 702. The structural composite taillight housing and the snow flap may include those described in U.S. Provisional Patent Application No. 63/400,056 filed on Aug. 23, 2022, and entitled "Taillight Housing, Snow Flap and Assembly Thereof," U.S. patent application Ser. No. 17/979,091 filed on November 2, and entitled "Snow Vehicle Heat Exchanger Shield," and U.S. patent application Ser. No. 17/979,066 filed on Nov. 2, 2022, and entitled "Taillight Housing, Snow Flap and Assembly Thereof," the contents of each of which are incorporated by reference in its entirety.

While the disclosed snowmobile has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A rear member of a running board assembly for a snow vehicle, the rear member comprising:
a transition body positionable adjacent a side wall of a tunnel of the snow vehicle, the transition body including a forward end and a rearward end extending upward and rearward therefrom;
a flange extending downward and rearward from the transition body, wherein the flange is positionable adjacent the side wall of the tunnel; and
a bumper arm mount positioned at the rearward end of the transition body, the bumper arm mount engageable with a bumper arm extending from a bumper of the snow vehicle; and
a bracket positioned on an inboard side of the tunnel, wherein the bracket is secured to the flange of the rear member with the side wall positioned therebetween, the bracket is secured to the bumper arm with the side wall positioned therebetween.

2. The rear member of claim 1, wherein the transition body comprises:
a first leg adjacent the side wall of the tunnel, and
a second leg positioned outboard of the first leg at the forward end, the second leg extending upward, rearward and inboard therefrom to adjoin the first leg at the rearward end, wherein the second leg includes a channel shaped to receive a running board support tube at the forward end.

3. The rear member of claim 2, further comprising a cross-member extending between the forward end of the first leg and the forward end of the second leg, wherein the cross-member is securable to the running board assembly of the snow vehicle.

4. The rear member of claim 3, wherein the forward end of the transition body is configured to overlap a rearward end of a foot support member of the running board assembly.

5. The rear member of claim 4, wherein the forward end of the transition body includes a first mounting point configured to couple the rear member to the foot support member.

6. The rear member of claim 5, wherein the flange includes a second mounting point configured to couple the rear member to the tunnel.

7. The rear member of claim 6, wherein the bumper arm mount is configured to receive the bumper arm of a rear bumper, the bumper arm mount configured to couple the rear member to the bumper arm.

8. A snow vehicle comprising:

a tunnel including:

a first end, a second end extending rearward from the first end, and a side wall;

a track positioned in the tunnel;

a rear bumper positioned at the second end of the tunnel, the rear bumper including a bumper arm extending from the rear bumper forward of the second end along the side wall;

a running board positioned along the side wall, the running board including a first end and a second end extending rearward therefrom; and a rear member including:

a first end secured to the second end of the running board;

a second end that extends upward and rearward from the first end of the rear member, the second end of the rear member secured to the bumper arm; and a flange positioned adjacent to the side wall of the tunnel; and a bracket positioned on an inboard side of the tunnel, wherein the bracket is secured to the flange of the rear member with the side wall positioned therebetween, the bracket is secured to the bumper arm with the side wall positioned therebetween.

9. The snow vehicle of claim 8, wherein the rear member includes a first rail adjacent the side wall of the tunnel and a second rail outboard from the first rail.

10. The snow vehicle of claim 9, wherein the flange extends downward from the first rail.

11. The snow vehicle of claim 10, wherein the second rail of the rear member includes a channel shaped to receive a running board support tube at the first end of the rear member.

12. The snow vehicle of claim 11, further comprising a running board bracket mounted to the side wall of the tunnel, wherein the side wall of the tunnel is disposed between the flange of the rear member and the running board bracket.

13. A snow vehicle comprising:

a forward frame;

a tunnel including: a first end secured to the forward frame, a second end extending rearward from the first end, and a side wall;

a track positioned in the tunnel;

a skid frame including a rear suspension operably connected to the tunnel;

a rear bumper positioned at the second end of the tunnel, the rear bumper including a bumper arm extending from the rear bumper forward of the second end along the side wall;

a running board support member including: a first end secured to the forward frame, a second end secured to a rear suspension component, and a length extending between the first end and the second end of the running board support member that is positioned apart from the side wall of the tunnel; and a rear member including a first end positioned on the running board support member, and a second end that extends upward and rearward from the first end of the rear member, the second end of the rear member secured to the bumper arm; and a bracket positioned on an inboard side of the tunnel, wherein the bracket is secured to a flange of the rear member with the side wall positioned therebetween, the bracket is secured to the bumper arm with the side wall positioned therebetween.

14. The snow vehicle of claim 13, further comprising a running board including an inboard side positioned along the side wall, an outboard side engaged with the length of the running board support member, wherein the running board includes a first end and a second end extending rearward therefrom that is secured to the rear member.

15. The snow vehicle of claim 14, wherein the rear member includes an outboard leg that defines a channel, and the running board support member is positioned therein.

16. The snow vehicle of claim 15, wherein the rear member includes an inboard leg positioned adjacent the side wall of the tunnel, the inboard leg including a forward end spaced apart from the channel defined by the outboard leg, and a rearward end extending upward and rearward therefrom, and wherein the outboard leg extends rearward and upward from the channel to intersect the inboard leg at the second end of the rear member.

17. The snow vehicle of claim 16, wherein the second end of the rear member defines a second channel, and the bumper arm is positioned therein.

18. The snow vehicle of claim 17, wherein the running board support member extends downward and rearward from the channel to the rear suspension component.

19. The snow vehicle of claim 18, wherein the side wall of the tunnel includes a lower end including a first portion, a second portion that is higher than the first portion, and a transition portion that extends upward and rearward from the first portion to the second portion, wherein a flange extends rearward from the inboard leg of the rear member and is positioned adjacent the side wall and extends along an edge of the transition portion from the first portion to the second portion.

20. The snow vehicle of claim 13, wherein the bracket is positioned between the rear suspension component and the second end of the running board support member wherein the second end of the running board support member is secured to the rear suspension component.

\* \* \* \* \*